(12) United States Patent
Togino et al.

(10) Patent No.: US 6,704,052 B1
(45) Date of Patent: Mar. 9, 2004

(54) IMAGE PICKUP OPTICAL SYSTEM COMPRISING A PRISM FIXING MEMBER FOR PREVENTING A DETERIORATION IN THE CAPABILITY OF CORRECTING DECENTRATION ABBERATION, AND APPARATUS THEREFORE

(75) Inventors: Takayoshi Togino, Hachioji (JP); Norihiko Aoki, Iino-machi (JP); Akira Tamagawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/307,737

(22) Filed: May 10, 1999

(30) Foreign Application Priority Data

May 22, 1998 (JP) ............................................. 10-141169

(51) Int. Cl.⁷ .......................... G02B 13/16; G02B 5/04; H04N 5/225

(52) U.S. Cl. ........................ 348/340; 348/335; 359/834

(58) Field of Search ............................ 359/831, 833, 359/834, 837, 618, 619, 627, 629, 630, 631, 633, 637, 638; 348/65, 208.99, 208.1, 208.2, 208.3, 208.4, 208.5, 208.6, 208.7, 208.8, 335, 336, 337, 338, 340, 341, 342, 344, 369

(56) References Cited

U.S. PATENT DOCUMENTS

| | | | |
|---|---|---|---|
| 5,706,136 A | | 1/1998 | Okuyama et al. ............ 359/630 |
| 5,749,827 A | * | 5/1998 | Minami ........................ 600/109 |
| 5,751,494 A | * | 5/1998 | Takahashi .................... 359/631 |
| 5,768,025 A | * | 6/1998 | Togino et al. ............... 359/633 |
| 5,815,741 A | * | 9/1998 | Okuyama et al. ............. 396/51 |
| 5,835,276 A | * | 11/1998 | Asai et al. ................... 359/638 |
| 5,847,878 A | | 12/1998 | Togino ........................ 359/630 |
| 5,847,887 A | * | 12/1998 | Ogura et al. ................ 359/822 |
| 5,912,764 A | * | 6/1999 | Togino ........................ 359/367 |
| 5,933,279 A | * | 8/1999 | Yamazaki .................... 359/630 |
| 5,936,773 A | * | 8/1999 | Togino ........................ 359/630 |

(List continued on next page.)

FOREIGN PATENT DOCUMENTS

| | | | | |
|---|---|---|---|---|
| JP | 11352311 A | * | 12/1999 | ............ G02B/5/00 |
| JP | 2000056226 A | * | 2/2000 | ........... G02B/17/08 |
| JP | 200184245 A | * | 6/2000 | .......... H04N/5/225 |

OTHER PUBLICATIONS

Patent Abstracts of Japan, JP 09–073005, Mar. 18, 1987.
Patent Abstracts of Japan, JP 09–222561, Aug. 26, 1997.
Paten Abstracts of Japan, JP 10–068886, Mar. 10, 1998.
Patent Abstracts of Japan, JP 10–068884, Mar. 10, 1998.
Patent Abstracts of Japan, JP 10–020196, Jan. 23, 1998.

*Primary Examiner*—Wendy R. Garber
*Assistant Examiner*—Justin Misleh
(74) *Attorney, Agent, or Firm*—Pillsbury Winthrop LLP

(57) ABSTRACT

The invention relates to an image pickup optical system which can make a sensitive tradeoff between the precision of alignment of a decentration optical prism used as an image formation element for an electronic camera or the like with respect to an image pickup element and ease of fabrication. The invention provides an optical prism 100 comprising three optical surfaces 12 to 14. An entrance surface 14 is suitable for incidence of light from a subject. The incident light is subjected to at least two internal reflections to turn back an optical path. The reflected light leaves the prism through an exit surface 12 to form an image of the subject on an image pickup surface 21 located outside of the prism. At least one of the entrance surface 14 and exit surface 12 is constructed of an optical surface having a combined transmission and internal reflection action. The optical prism is used in combination with a prism frame 30 designed to be well fit therefor. Sides 60L and 60R formed in directions intersecting the directions of the entrance surface 14 and exit surface 12 are provided with protrusions 90L and 90R for mounting the optical prism 100 to the prism frame 30.

21 Claims, 33 Drawing Sheets

U.S. PATENT DOCUMENTS

| | | | | |
|---|---|---|---|---|
| 6,008,948 A | * | 12/1999 | Togino | 359/637 |
| 6,034,823 A | * | 3/2000 | Togino | 359/637 |
| 6,104,539 A | * | 8/2000 | Togino | 359/637 |
| 6,128,144 A | * | 10/2000 | Togino | 359/728 |
| 6,178,052 B1 | * | 1/2001 | Aoki et al. | 359/730 |
| 6,243,208 B1 | * | 6/2001 | Uehara et al. | 359/631 |
| 6,327,094 B1 | * | 12/2001 | Aoki | 359/637 |
| 6,337,772 B2 | * | 1/2002 | Uehara et al. | 359/631 |
| 6,545,810 B1 | * | 4/2003 | Takada et al. | 359/618 |

* cited by examiner

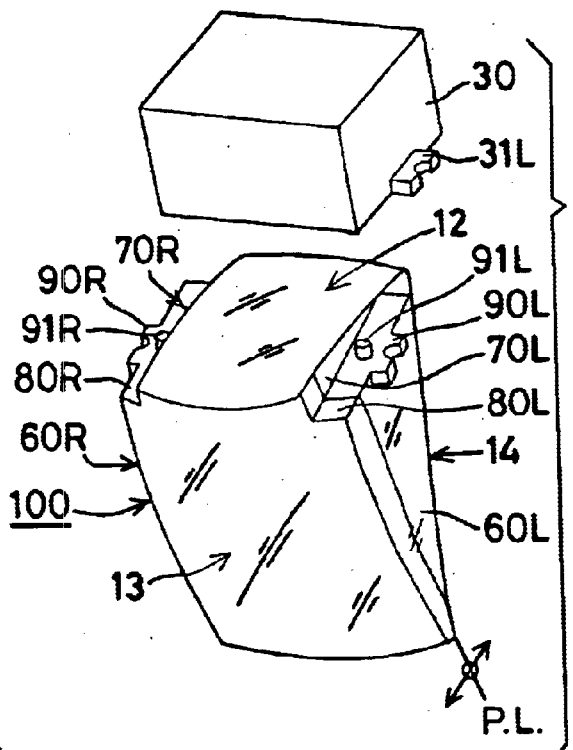
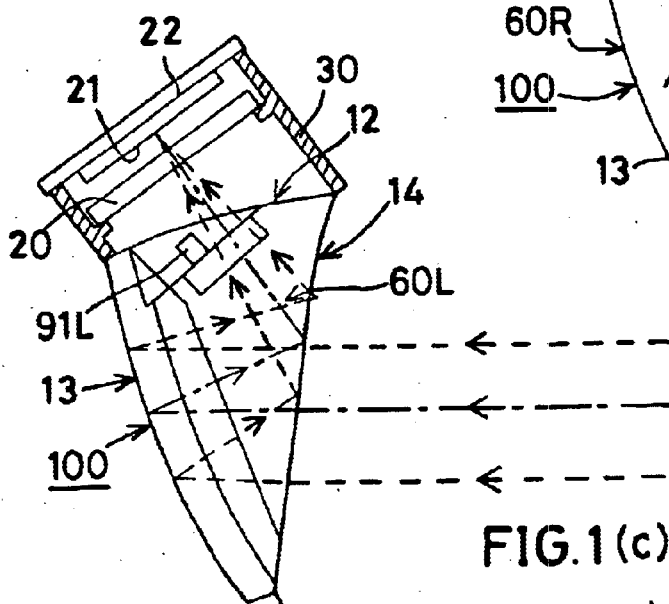
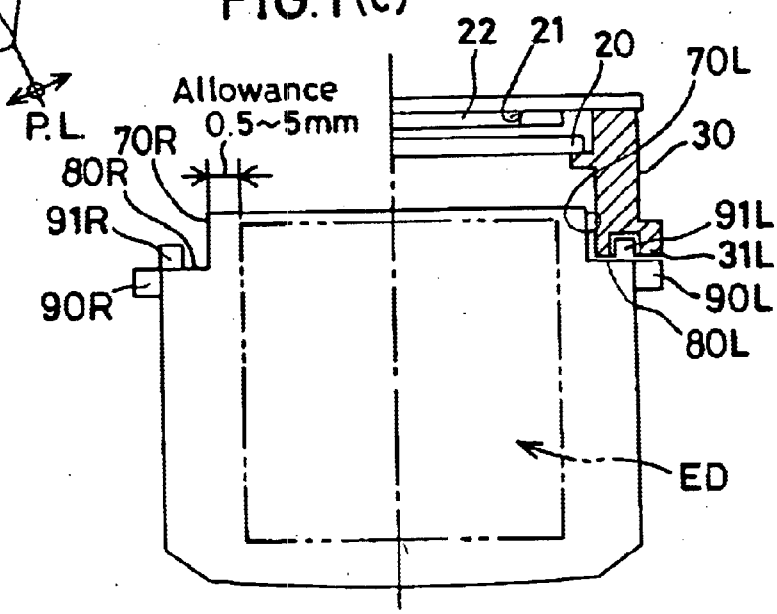
FIG. 1(a)
FIG. 1(b)
FIG. 1(c)

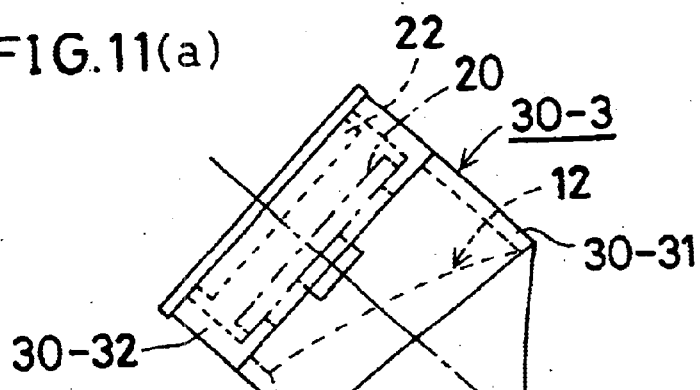
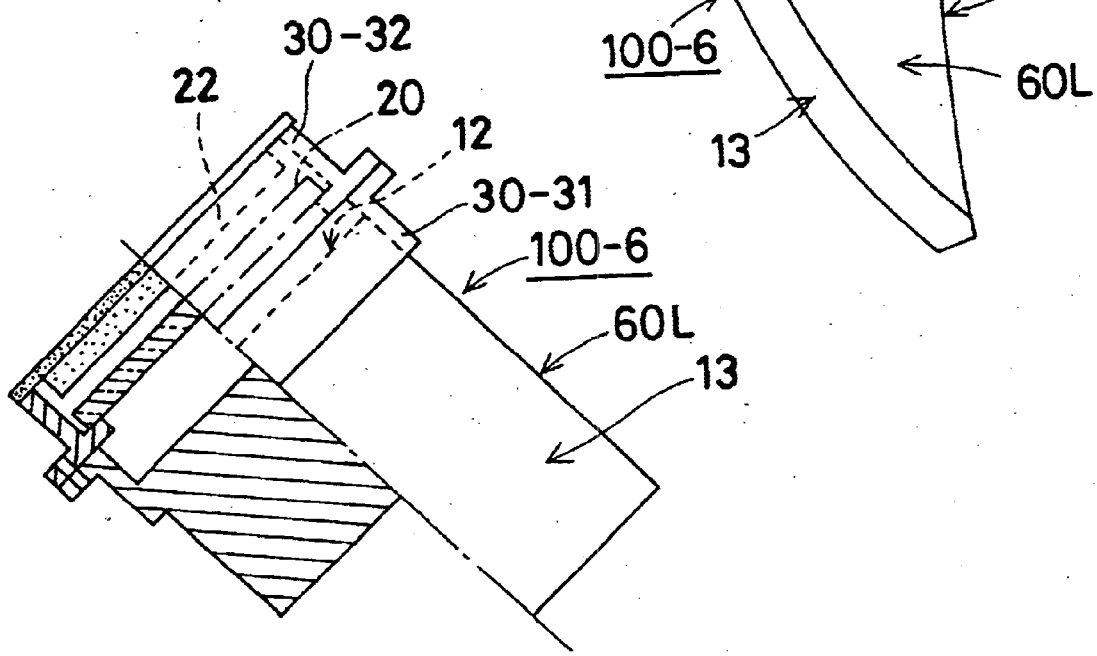

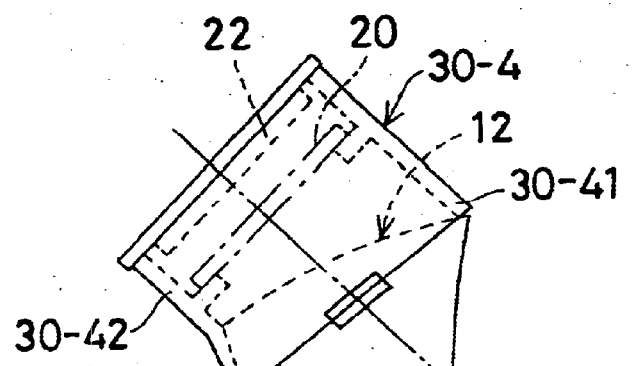
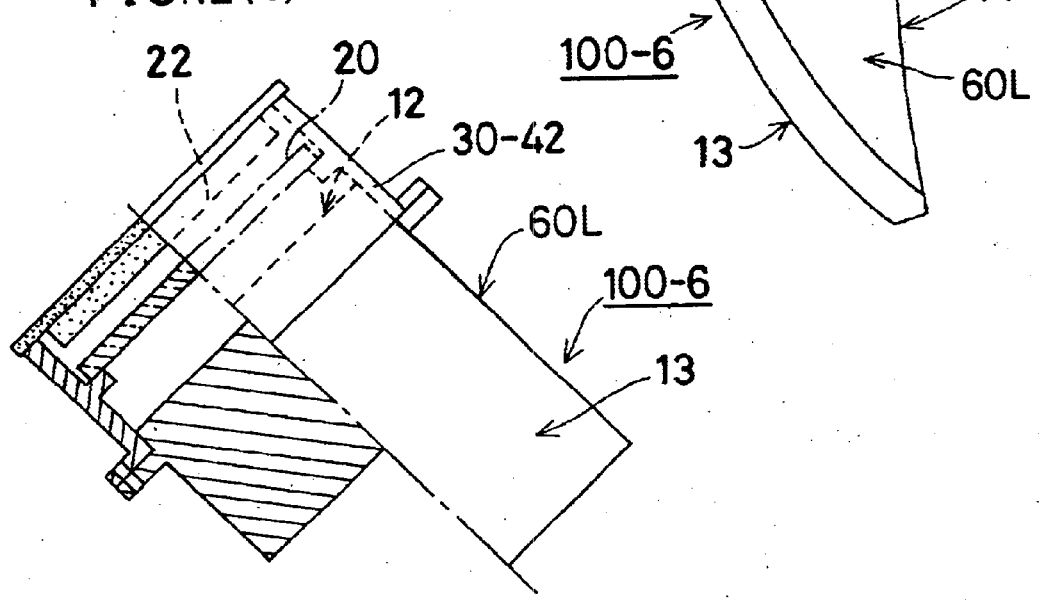

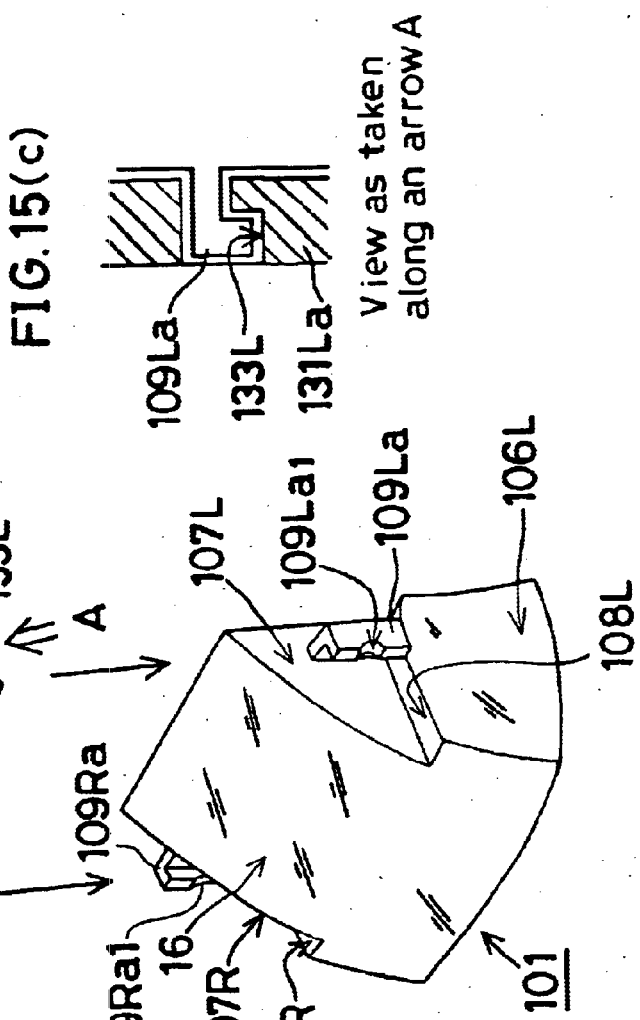
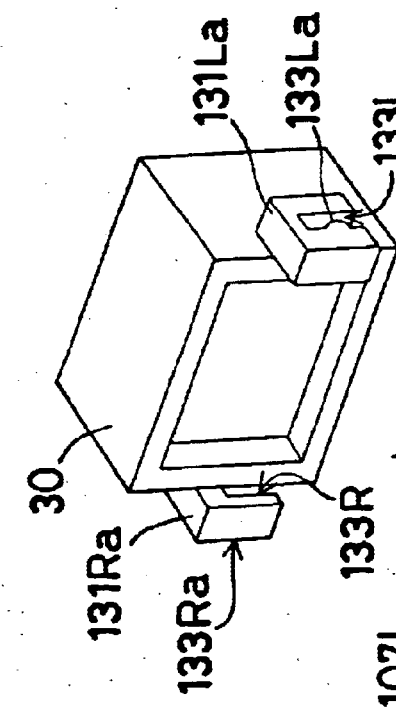
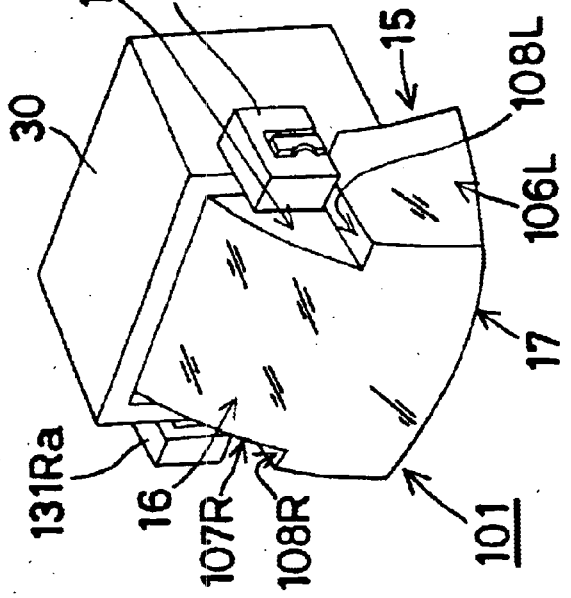

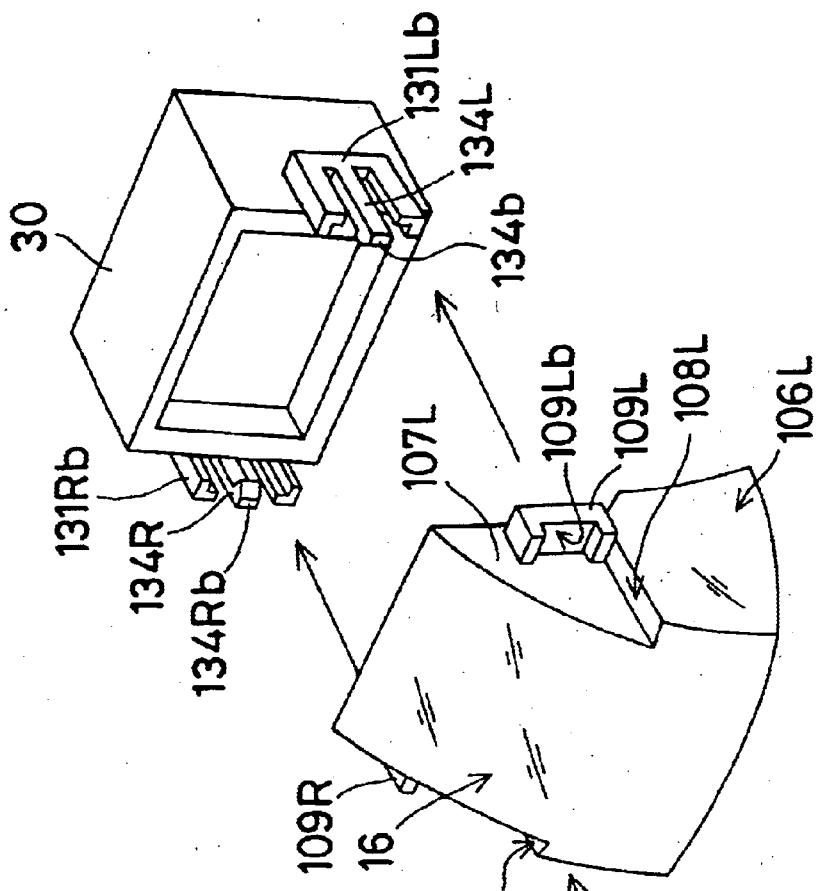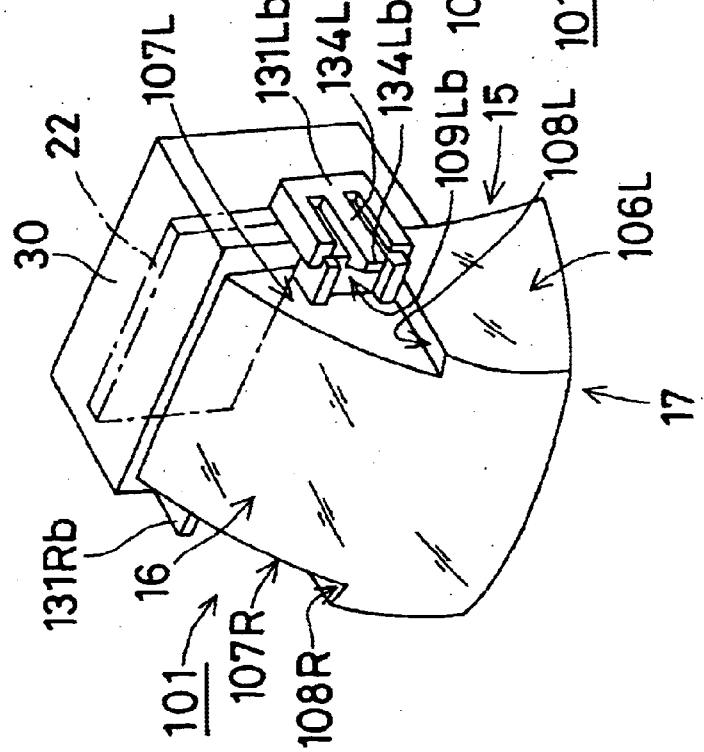

FIG.18(a)
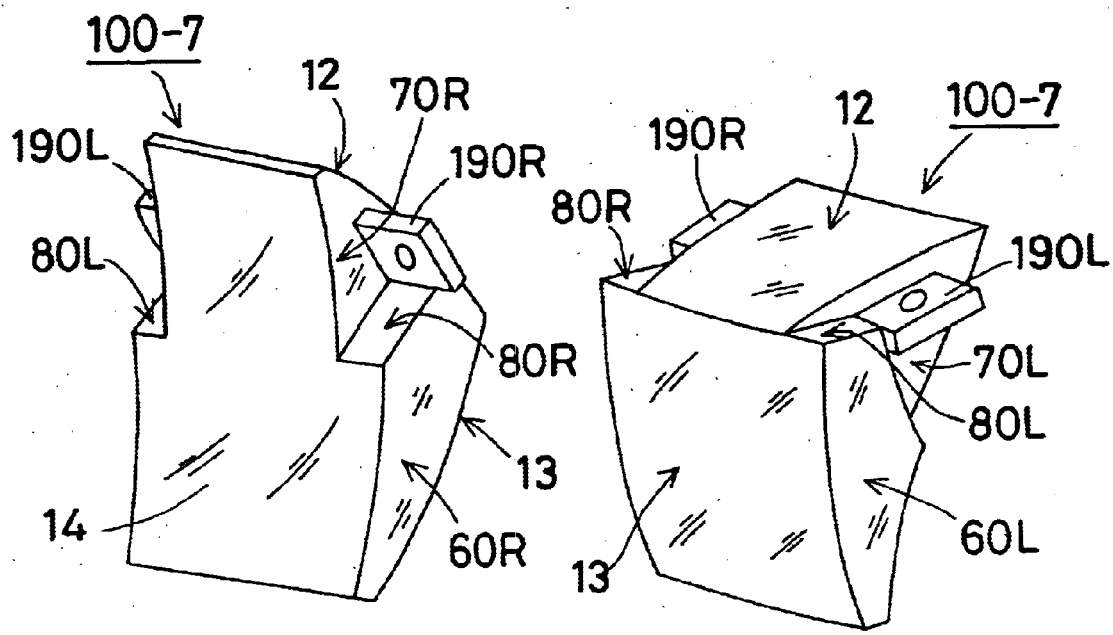
FIG.18(b)
FIG.18(c)
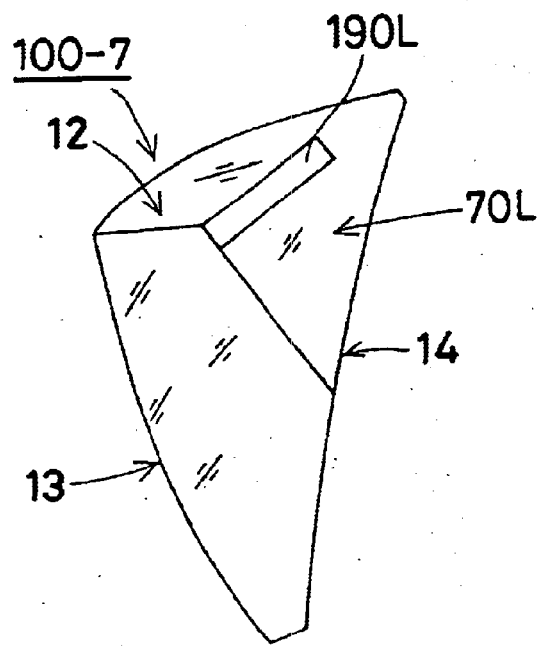

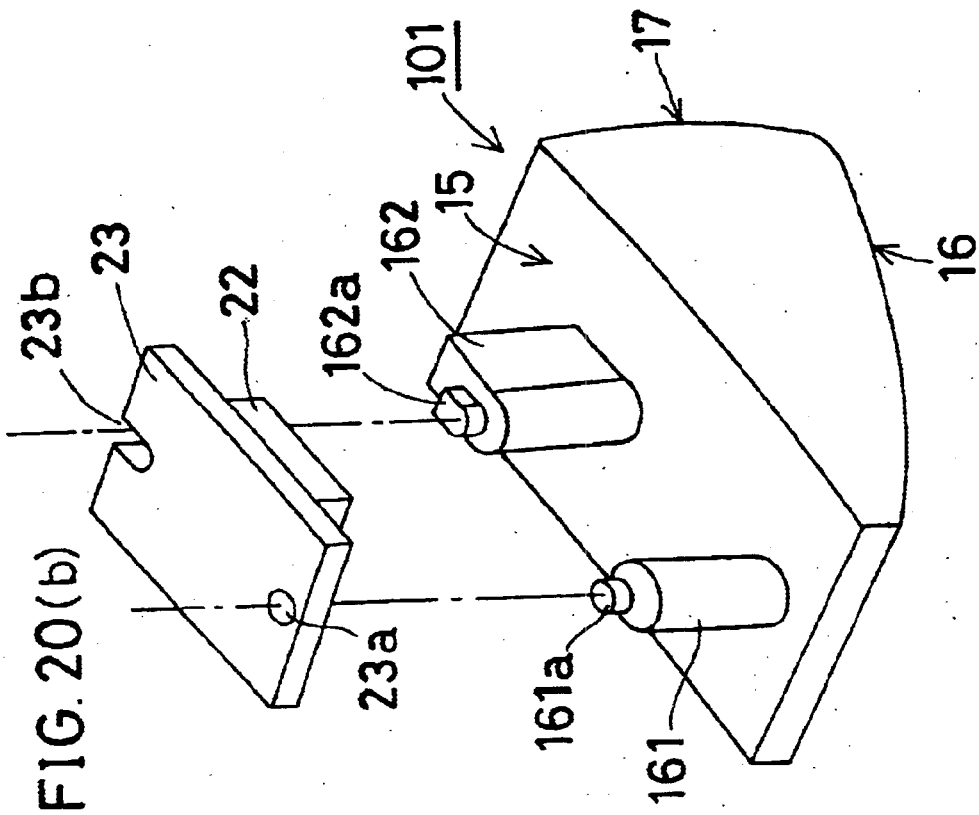
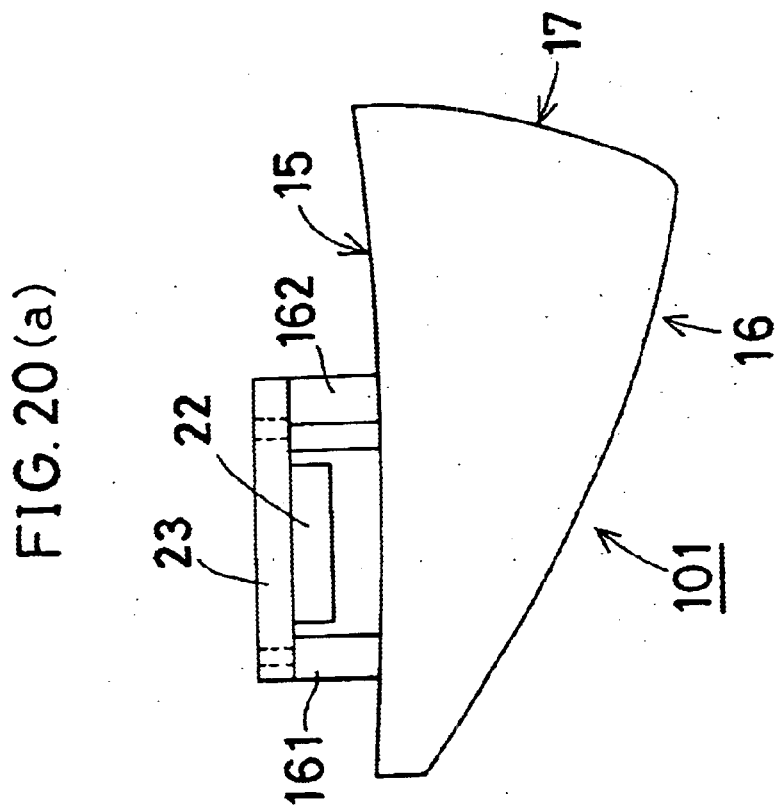

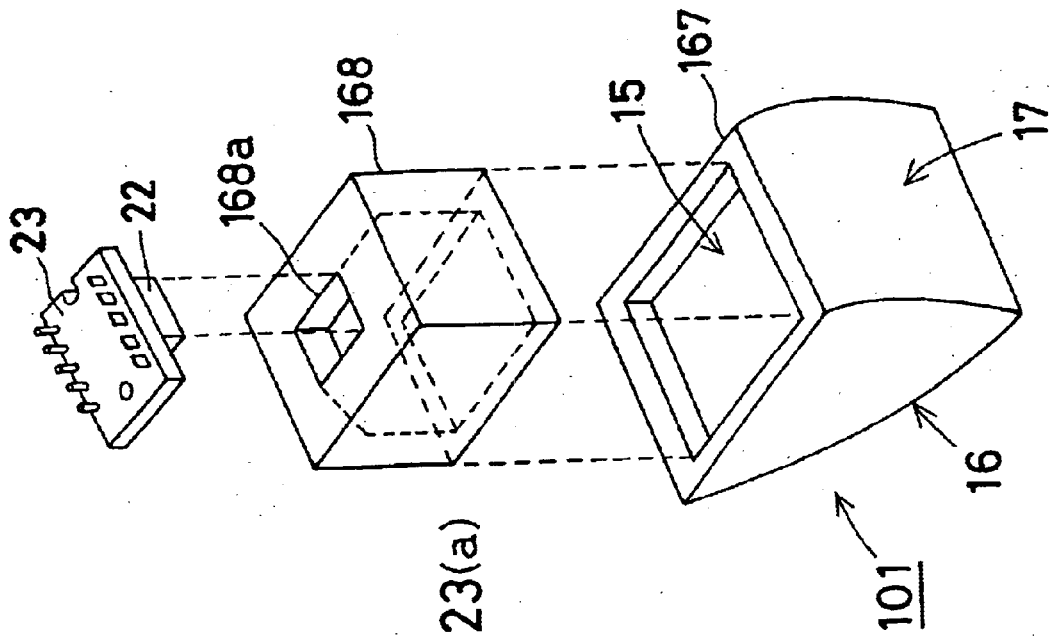
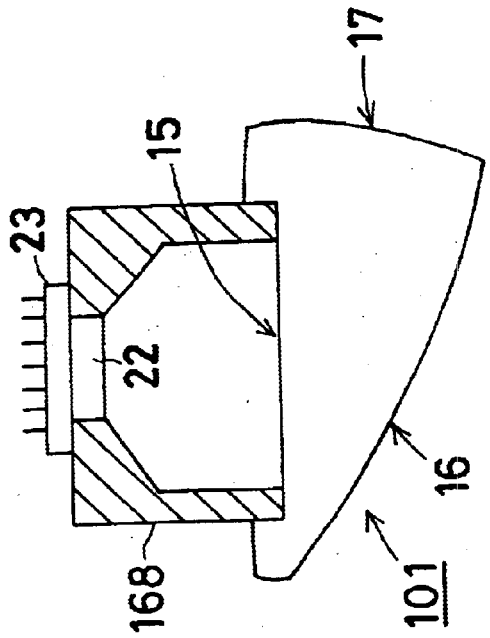
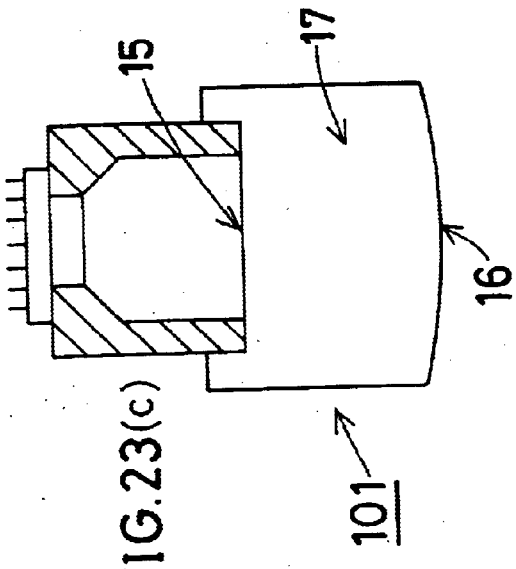
FIG.23(a)
FIG.23(b)
FIG.23(c)

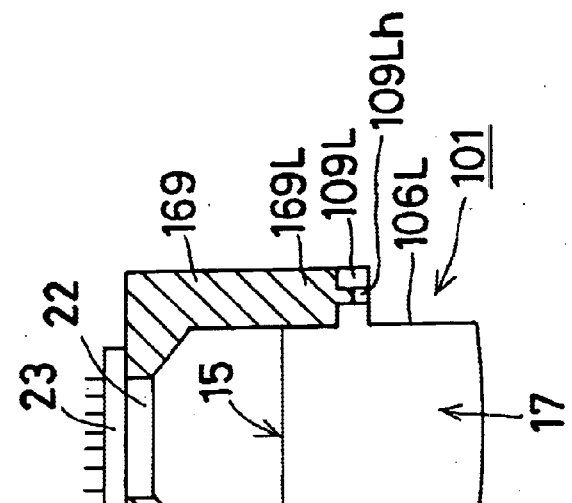
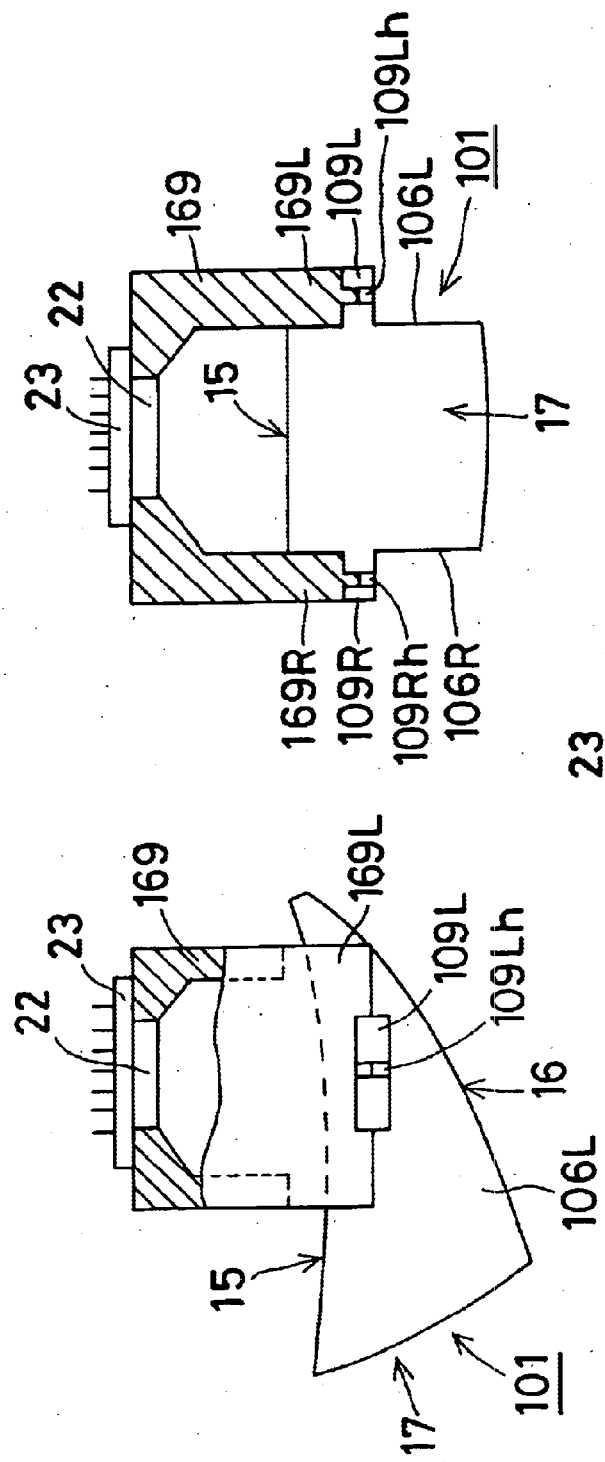
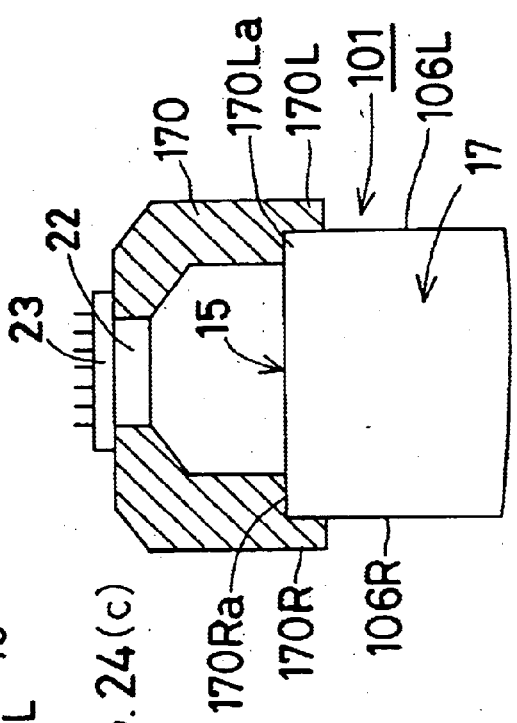

IMAGE PICKUP OPTICAL SYSTEM COMPRISING A PRISM FIXING MEMBER FOR PREVENTING A DETERIORATION IN THE CAPABILITY OF CORRECTING DECENTRATION ABBERATION, AND APPARATUS THEREFORE

BACKGROUND OF THE INVENTION

The present invention relates generally to an image pickup optical system comprising a prism fixing member for preventing a deterioration in the capability of correcting decentration aberration and an apparatus therefor, and more specifically to an internal reflection optical prism having image formation capabilities, to an image plane side of which a prism frame with an image pickup element such as a CCD received therein can be attached with high precision, a prism frame therefor, and an optical assembly comprising said optical prism and said prism frame.

The inventors have already filed Japanese Patent Application No. 9-172168 to come up with using a decentration optical prism comprising at least three optical surfaces, wherein light incident from an entrance surface suitable for the incidence of light from a subject is subjected to at least two internal reflections to turn back an optical path and the reflected light leaves a given exit surface to form an image of the subject, thereby picking up the subject image using an image pickup element such as a CCD located on an image plane of the prism. The inventors have also filed Japanese Patent Application No. 10-77272 to propose to construct an image formation optical system using two such decentration optical prisms, thereby picking up a subject image in the same manner as mentioned above.

To use such an image pickup system to pick up a subject image with resolution as designed and expected, it is required that the optical prism be in high-precision alignment with the image pickup element. A sensible tradeoff between high precision of alignment and easy of fabrication is now a problem awaiting solution.

In recent years, on the other hand, the fabrication of optical prisms by an injection molding process has become common. This injection molding process can cover a fairly wide range of molded articles by use of a slide mechanism.

FIGS. 33(a), 33(b) and 33(c) illustrate schematically a mold having this slide mechanism. FIG. 33(a) is illustrative of how a slider S is injected in a mold cavity C, thereby imparting the shape of the cavity C to an article being molded. FIG. 33(b) is illustrative of how the slider S is ejected from within the mold cavity C to remove out of the mold a molded article formed of plastics, etc. in the mold cavity C. FIG. 33(c) is a view showing the position relation between the slider S and the mold cavity C illustrated in FIG. 33(b), as viewed from another angle.

By use of a mold having such a slide mechanism, various forms of prisms can be molded. Such a mold is known per se, and may be applied to the molding of prisms according to the present invention.

FIGS. 34(a), 34(b) and 34(c) illustrate schematically a mechanism for moving a slider in a mold having a slider mechanism. This slide mechanism is designed in such a manner that as an angular pin AP fitted into a through-hole formed through a slider SL is displaced from within the through-hole to a given relative position, the slider SL is retracted from within a mold cavity C depending on the inclination of the angular pin AP.

FIG. 34(a) shows that the angular pin AP is fitted deep into the through-hole formed through the slider SL while a fixed mold FD is closest to a movable mold MD, so that the slider SL can be inserted into the mold cavity C to construct an intra-cavity configuration corresponding to a molded article of complicated shape.

FIG. 34(b) shows that as the fixed mold FD is relatively spaced away from the movable mold MD, the angular pin AP is pulled out of the through-hole in the slider SL, so that the slider SL is retracted from within the mold cavity C depending on the inclination of the angular pin AP, finally leaving the mold cavity C.

FIG. 34(c) shows that an ejector pin EP is ejected in the FIG. 34(b) state to remove a molded article MM having an undercut portion UC formed by the slider SL.

If an injection molding process is used with such a slide mechanism as mentioned above, it is then possible to fabricate various forms of optical prisms with relative ease yet with high efficiency.

SUMMARY OF THE INVENTION

The situations being like this, an object of the present invention is to provide an image pickup optical system comprising a prism fixing member for preventing a deterioration in the capability of correcting decentration aberration, which optical system can make a reasonable tradeoff between the precision of alignment of an internal reflection decentration optical prism having image formation capabilities, when used as an image formation element for an electronic camera, an electronic endoscope or the like, with respect to an image pickup element and ease of fabrication, and a device using such an image pickup optical system.

According to one aspect of the present invention, the above object is achieved by the provision of an image pickup optical system comprising an image formation optical system for forming an object image, and an image pickup member for receiving said object image formed by said image formation optical system, characterized in that:

said image formation optical system comprises at least one first prism member, said first prism member comprises as optical acting surfaces at least an entrance surface on which a ray bundle strikes, a reflection surface for reflecting said ray bundle within said prism, and an exit surface through which said ray bundle leaves said prism, said reflection surface is constructed in a curved surface form that gives power to said ray bundle, said curved surface being constructed of a rotationally asymmetric curved surface having an action on correction of decentration aberration, and a fixing member for fixing a position relation between at least said first prism and said image pickup member is provided so as to prevent a deterioration in a capability of said rotationally asymmetric curved reflection surface of said first prism of correcting decentration aberration due to a misalignment upon setting.

According to another aspect of the present invention, there is provided an image pickup optical system comprising an image formation optical system for forming an object image, and an image pickup member for receiving said object image formed by said image formation optical system, characterized in that:

said image formation optical system comprises a plurality of optical elements including at least a first prism member, said first prism member comprises as optical acting surfaces at least an entrance surface on which a ray bundle strikes, a reflection surface for reflecting said ray bundle within said prism, and an exit surface through which said ray bundle leaves said prism, said reflection surface is constructed in a curved surface form that gives power to said ray bundle, said curved surface being constructed of a rotationally asymmetric curved surface having an action on correction of decentration aberration, and a fixing member for fixing a position relation between at least said first prism and one other optical element is provided so as to prevent a deterioration in a capability of said rotationally asymmetric curved reflection surface of said first prism of correcting decentration aberration due to a misalignment upon setting.

According to yet another aspect of the present invention, there is provided an image pickup optical system comprising an image formation optical system for forming an object image, and an image pickup member for receiving said object image formed by said image formation optical system, characterized in that:

said image formation optical system comprises a plurality of optical elements including at least a first prism member, said first prism member comprises as optical acting surfaces at least an entrance surface on which a ray bundle strikes, a reflection surface for reflecting said surface within said prism, and an exit surface through which said ray bundle leaves said prism, said reflection surface is constructed in a curved surface form that gives power to said ray bundle, said curved surface being constructed of a rotationally asymmetric curved surface having an action on correction of decentration aberration, and a fixing member for fixing position relations among at least said first prism, one other optical element and said image pickup member is provided so as to prevent a deterioration in a capability of said rotationally asymmetric curved reflection surface of said first prism of correcting decentration aberration due to a misalignment upon setting.

According to the present invention, it is possible to use the above protrusions and recesses or the above prism frame or image pickup element-mounting member, thereby obtaining a prism frame well fit for the optical prism, simplifying image pickup element mount work, and improving the precision of alignment.

It is here to be understood that the present invention includes a prism frame mounted to such an optical prism, combinations of such an optical prism and its prism frame with an image pickup element received therein, and an optical assembly comprising combinations of such optical prisms.

Still other objects and advantages of the invention will in part be obvious and will in part be apparent from the specification.

The invention accordingly comprises the features of construction, combinations of elements, and arrangements of parts which will be exemplified in the construction hereinafter set forth, and the scope of the invention will be indicated in the claims.

BRIEF DESCRIPTION OF THE DRAWINGS

FIG. 1(*a*), 1(*b*) and 1(*c*) illustrate one embodiment of the outside shape of the optical prism according to the present invention.

FIGS. 11(*a*) and 11(*b*) are views illustrative of yet another form of the optical assembly explained with reference to FIGS. 1(*a*), 1(*b*) and 1(*c*).

FIGS. 12(*a*) and 12(*b*) are views illustrative of a further form of the optical assembly explained with reference FIGS. 11(*a*) and 11(*b*).

FIGS. 15(*a*), 15(*b*) and 15(*c*) are schematics illustrative of how the optical prism of FIG. 13 is assembled with an associated prism frame in another manner.

FIGS. 16(*a*) and 16(*b*) are schematics illustrative of how the optical prism of FIG. 13 is assembled with an associated prism frame in yet another manner.

FIGS. 18(*a*), 18(*b*) and 18(*c*) illustrate another embodiment of the present invention.

FIGS. 20(*a*) and 20(*b*) are schematics illustrative of how an image formation optical prism that is another embodiment of the present invention is assembled with an associated CCD substrate.

FIGS. 23(*a*), 23(*b*) and 23(*c*) are schematics illustrative of how an image formation optical prism that is a further embodiment of the present invention is assembled with an associated CCD substrate.

FIGS. 24(a), 24(b) and 24(c) are schematics illustrative of how an image formation optical prism that is a further embodiment of the present invention is assembled with an associated CCD substrate.

DESCRIPTION OF THE PREFERRED EMBODIMENTS

Figure 2A:
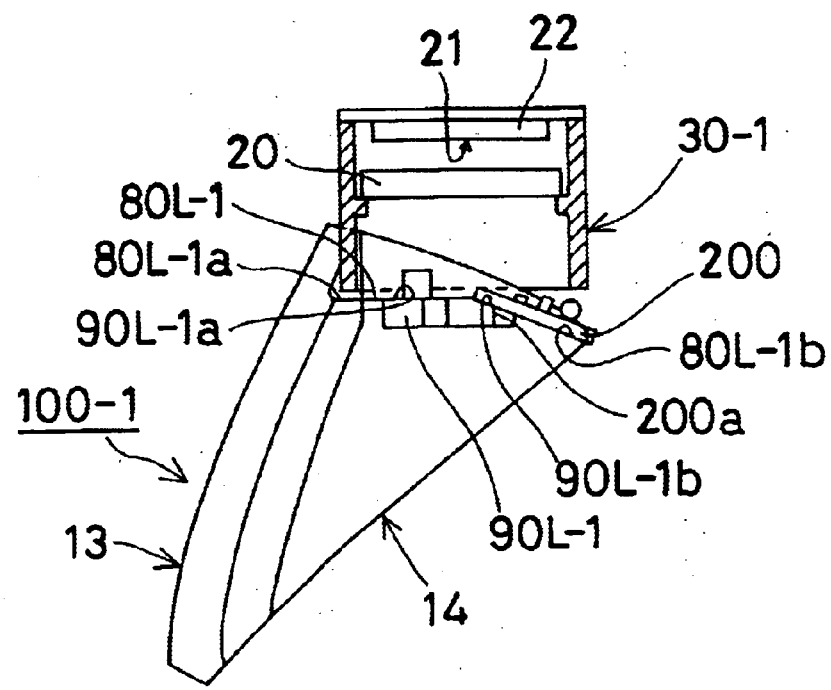
FIGS. 2(*a*) and 2(*b*) illustrate one modification of the embodiment explained with reference to FIGS. 1(*a*), 1(*b*) and 1(*c*).

Embodiments of the optical prism, prism frame and optical assembly of the invention will now be explained in detail with reference to the drawings.

In the embodiments shown in FIGS. 1 to 12, an optical prism 100, e.g., an image formation optical prim 100 shown in FIG. 1(b), is used. The optical prism 100 comprises three optical acting surfaces 12, 13 and 14. The surface 14 is a combined entrance and reflection surface; light rays from an object (or a subject) are entered through the surface 14 into the optical prism 100, the incident light rays are subjected to first internal reflection at the reflection surface 13, and the reflected light is subjected to second internal reflection at the surface 14. The surface 13 is a first surface at which the light rays incident from the combined entrance and reflection surface 14 are internally reflected back to the surface 14. The surface 12 is an exit surface which the light rays subjected to the second reflection at the combined entrance and reflection surface 14 leave upon refraction, thereby forming an object image on an image pickup surface 21 of an image pickup element 22. The three surfaces 12, 13 and 14 are each constructed of a curved surface such as a three-dimensional surface, a spherical surface, an aspherical surface or an anamorphic surface, so that the optical prism 100 can have an image formation positive power (catadioptric power: the reciprocal of focal length). It is then preferred that at least one surface of these three surfaces is constructed of a three-dimensional surface that is symmetric with respect to plane and has only one symmetric plane so as to give power to a ray bundle and make correction for decentration aberration.

FIGS. 1(a), 1(b) and 1(c) show the outside shape of an image formation optical system that is one embodiment of the present invention. While FIGS. 1(a), 1(b) and 1(c) illustrate a two-reflection type optical prism which light rays incident from an entrance surface leave upon two internal reflections, it is to be understood that the present invention is not technically limited thereto. For instance, the present invention may be applied to a three-reflection type image formation optical prism which light rays leave upon three internal reflections, for instance.

FIG. 1(a) is a perspective view of an optical prism and a prism frame for the optical prism according to the first embodiment of the invention, as viewed from above and a rear side thereof in a slanting direction, FIG. 1(b) is a partly sectioned side view of an optical assembly of the prism frame and the optical prism, and FIG. 1(c) is a partly broken away view of the optical assembly as viewed from an entrance surface side thereof.

In particular, paths taken by light rays in the optical prism are shown by broken lines in FIG. 1(b).

Referring here to the drawings, an image formation optical prism 100 comprises three optical acting surfaces 12, 13 and 14. One surface 14 of these surfaces is a combined entrance and reflection surface which, at least a common region defined by a part thereof, functions as a surface through which light rays from an object (or a subject) are entered into the optical prism 100 and functions as a surface at which the incident rays upon first reflection at a reflection surface 13 are subjected to second reflection through total reflection action. The curved surface 13 on the back side of the optical prism 100 is a first surface at which the light rays incident from the combined entrance and reflection surface are reflected back thereto. A surface shown at 12, contiguous to the upper portions of the combined entrance and reflection surface 14 and the reflection surface 13 at ridgelines, is an exit surface which the light rays subjected to the second reflection at the combined entrance and reflection surface leaves upon refraction, thereby forming an object image on an image pickup surface 21 of an image pickup element 22 such as a CCD mounted in a prism frame 30. As shown, the exit surface 12 is opposite to the image pickup element. The exit surface 12, reflection surface 13 and combined entrance and reflection surface 14 are each constructed of a curved surface such as a three-dimensional surface, a spherical surface, an aspherical surface or an anamorphic surface so as to meet the required optical properties. As shown, a low-pass filter 20 for preventing moire fringes, etc. is located between the exit surface (opposite to the image pickup element) 12 and the image pickup surface 21 of the image pickup element 22.

On a left side 60L and a right side 60R formed on the exit surface (opposite to the image pickup element) 12, combined entrance and reflection surface 14 and reflection surface 13 in their intersecting directions there are provided a recess 70L and a recess 70R, respectively, in positions where they are not deterrents to the optical path taken by object light in an effective diameter from the combined entrance and reflection surface 14 to the exit surface 12. As shown in FIG. 1(c), the "effective diameter" refers to the diameter of a region ED surrounded by two-dotted lines.

In the FIG. 1 embodiment, the recesses 70L and 70R are formed by a left step 80L and a right step 80R in such a manner that sides 60L and 60R of an upper block portion of the optical prism 100, the front and rear surfaces of which are constructed of the combined entrance and reflection surface 14 and the surface 12 opposite to the image pickup element, are narrower in width than sides 60L and 60R of a lower block portion of the optical prism 100, the front and rear surfaces of which are constructed of the combined entrance and reflection surface 14 and the reflection surface 13. This site is formed by a slide mechanism of an injection mold, and the effective diameter region ED surrounded by the two-dotted lines is positioned 0.5 to 5.0 mm inwardly of the site. According to this embodiment, therefore, the distortion of the effective region in the optical prism due to the movement of the slide mechanism in the injection molding process is minimized with no deterioration in the performance of the portion making use of the optical properties.

A left protrusion 90L and a right protrusion 90R extend rearwardly from the level positions of the steps 80L and 80R defining the left recess 60L and right recess 60R, so that the optical prism 100 can be mounted in the prism frame 30. In this embodiment, these left and right protrusions 90L and 90R are formed making use of the slide mechanism used with the injection molding process for molding the optical prism 100. Corresponding to the protrusions 90L and 90R on the optical prism 100, the prism frame 30, too, are provided with a left protrusion 31L and a right protrusion 31R (not shown). The optical prism 100 is joined to the prism frame 30 while the protrusions 90L and 90R on the optical prism 100 are in alignment with the protrusions 31L and 31R on the prism frame 30. At sites on the left and right steps 80L and 80R that define the protrusions 90L and 90R there are provided a left boss 91L and a right boss 91R for alignment with the prism frame 30.

By engaging the bosses 91L and 91R within associated recesses in the prism frame 30, it is possible to improve the precision of alignment of the optical prism 100 with the prism frame 30.

As can be seen from FIG. 1(c), etc., lower end portions of the prism frame 30, on which the optical prism 100 is to be mounted, are in a step-1like form defined by the recesses 70L and 70R or the left and right steps 80L and 80R. It is thus easy to ensure the precision of mounting of the optical prism 100 to the prism frame 30.

It is here to be noted that a line shown symbolically at P.L. in FIG. 1(a), and 1(b) is a mold parting line in the injection molding of the optical prism 100.

According to the above embodiment, portions of the optical prism 100 outside of the region making effective use of the optical properties can be minimized so that the size of the optical prism can be reduced to the limit.

Figure 2B:
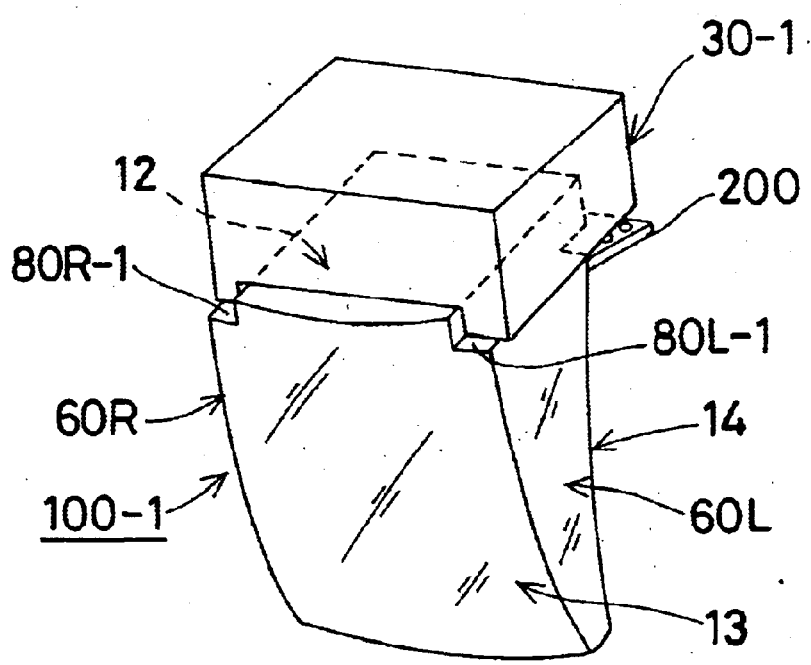

FIGS. 2(a) and 2(b) are views illustrative of one modification of the embodiment explained with reference to FIGS. 1(a), 1(b) and 1(c). FIG. 2(a) is a partly sectioned side view of an optical assembly wherein an optical prism 100-1 and a prism frame 30-1 are assembled together, and FIG. 2(b) is a perspective view of the optical assembly of FIG. 2(a), as viewed from above and a rear side thereof in a slanting direction. The same parts as in FIG. 1 are indicated as the same reference numerals, and so are not explained in detail.

In the FIG. 2 embodiment, a protrusion 90L-1 formed by making use of the slide mechanism as mentioned above (90R-1 are not shown in FIG. 2) is provided with a plurality of mounting faces 90L-1a and 90L-1b which can be used to mount given members thereon and adjoin to each other in varying angles of inclination with the respect to the horizontal (90R-1a and 90R-1b are not shown in FIG. 2). Likewise, a step 80L-1 corresponding to the step 80L in FIG. 1 is provided with a plurality of mounting faces 80L-1a and 80L-1b adjoining to each other in varying angles of inclination with respect to the horizontal (80R-1 corresponding to 80R in FIG. 1 is not shown in FIG. 2).

According to the above modified embodiment, a plurality of mounting faces can be used to mount various associated members thereon, thereby ensuring the precision of alignment upon mounting and allowing the optical prism 100-1 to have hybrid functions if required.

In FIG. 2, for instance, a printed wiring board 200 with electronic elements mounted thereon can be properly mounted in place making use of the second mounting faces 90L-1b (90R-1b) as by a screw 200a while the precision of alignment thereof (the angle of inclination, etc.) is ensured. With this, a prism frame 30-1 can be stably mounted in place making use of the first mount surface 90L-1a (90R-1a) while the precision of alignment upon mounting is ensured.

Figure 3A:
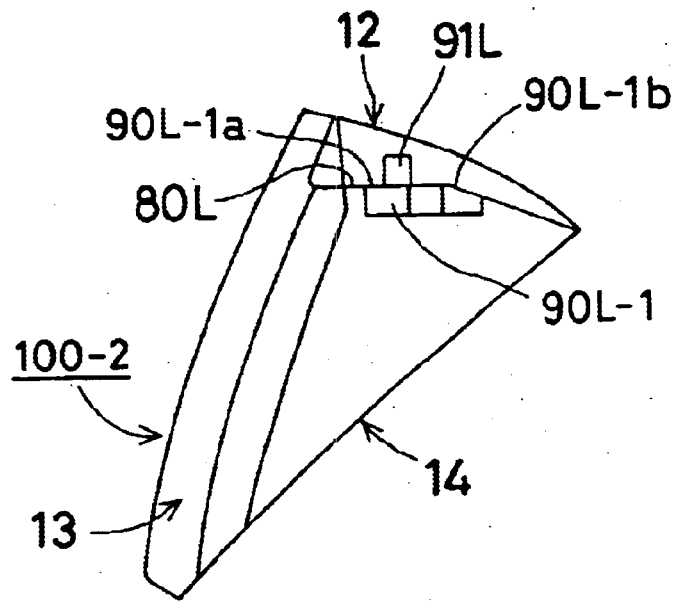
FIG. 3(*a*) and 3(*b*) illustrate another modification of the embodiment explained with reference to FIGS. 1(*a*), 1(*b*) and 1(*c*).
Figure 3B:
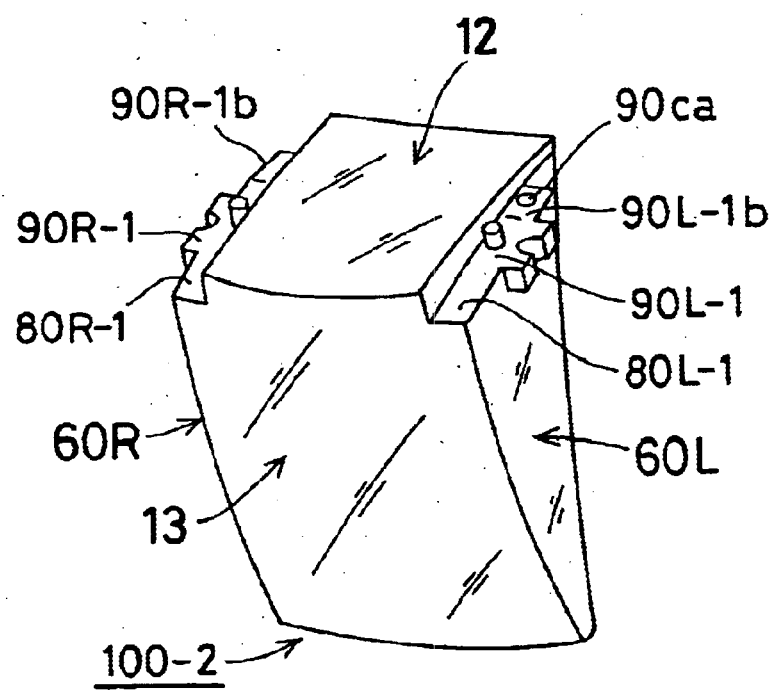

FIGS. 3(a) and 3(b) are views illustrative of another modification of the optical prism explained with reference to FIG. 1. FIG. 3(a) is a side view of an optical prism 100-2, and FIG. 3(b) is a perspective view of the optical prism of FIG. 3(a) as viewed from above and a rear side thereof in a slanting direction. In FIG. 3, the same parts as in FIGS. 1 and 2 are indicated by the same reference numerals.

In the FIG. 3 embodiment, the left and right protrusions 90L-1 and 90R-1 formed making use of the slide mechanism in the injection molding of the optical prism are provided with a plurality of mounting faces 90L-1a and 90L-1b and a plurality of mounting faces 90R-1a and 90R-1b, which can be used to mount given members thereon and adjoin to each other at varying angles of inclination with respect to the horizontal. Likewise, a left step 80L-1 corresponding to the step 80L in the FIG. 1 embodiment (a right step 80R-1 corresponding to the step 80R is not shown in FIG. 3) is provided with a plurality of mounting faces 80L-1a and 80L-1b (80R-1a and 80R-1b are not shown in FIG. 3) adjoining to each other at varying angles of inclination with respect to the horizontal.

Especially in the FIG. 3 embodiment, cavity No. 90ca of the mold used for the fabrication of the optical prism is engraved in a given surface of these mounting faces (e.g., 90L-1b).

According to the above embodiment wherein the cavity No. of the mold used for the fabrication of the optical prism 100-2 is engraved on a given surface of the mounting faces, it is easy to gain history control of said optical prism in production management, quality management, etc.

Figure 4:
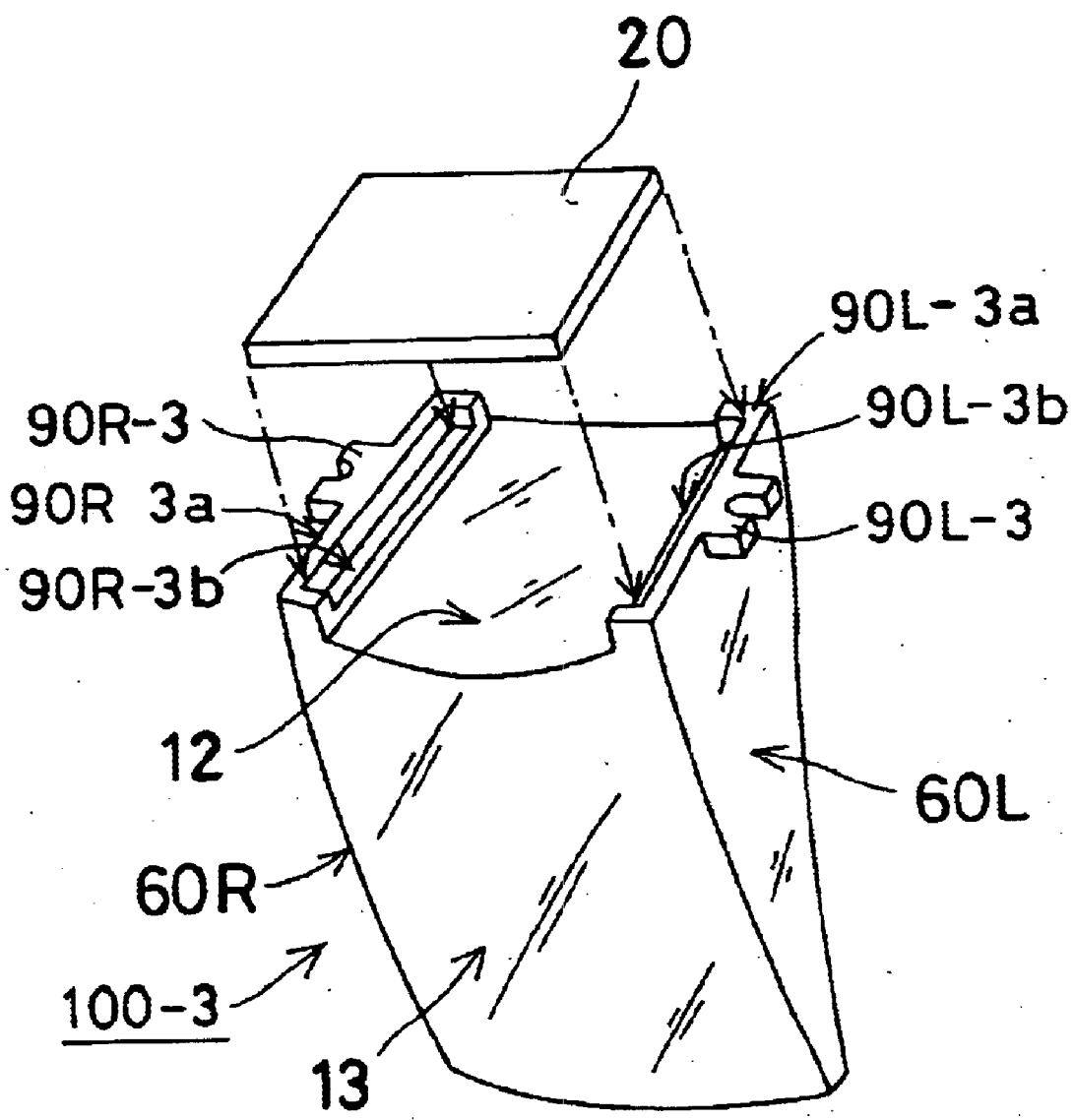
FIG. 4 is a perspective view of another embodiment of the optical prism explained with reference to FIGS. 1(*a*), 1(*b*) and 1(*c*), as viewed from above and the front side thereof in a slanting direction.

FIG. 4 is a perspective view of yet another modification of the optical prism explained with reference to FIG. 1, as viewed from above and a rear side thereof in a slanting direction. In FIG. 4, the same parts as in FIGS. 1, 2 and 3 are indicated by the same reference numerals.

In the FIG. 4 embodiment, at the same level positions as the upper surfaces of the left and right protrusions 90L-3 and 90R-3 formed making use of the slide mechanism in the injection molding of the optical prism, there are provided left and right surfaces 90L-3a and 90R-3a which extend parallel with each other in a fore-and-aft direction. At positions recessed from the surfaces 90L-3a and 90R-3a in a step form having a given depth (equal to the thickness of the low-pass filter 20), too, there are provided left and right surfaces 90L-3b and 90R-3b which extend parallel with each other in the fore-and-aft direction.

These left and right surfaces 90L-3b and 90R-3b are used as surfaces for mounting the low-pass filter 20 thereon.

Figure 5:
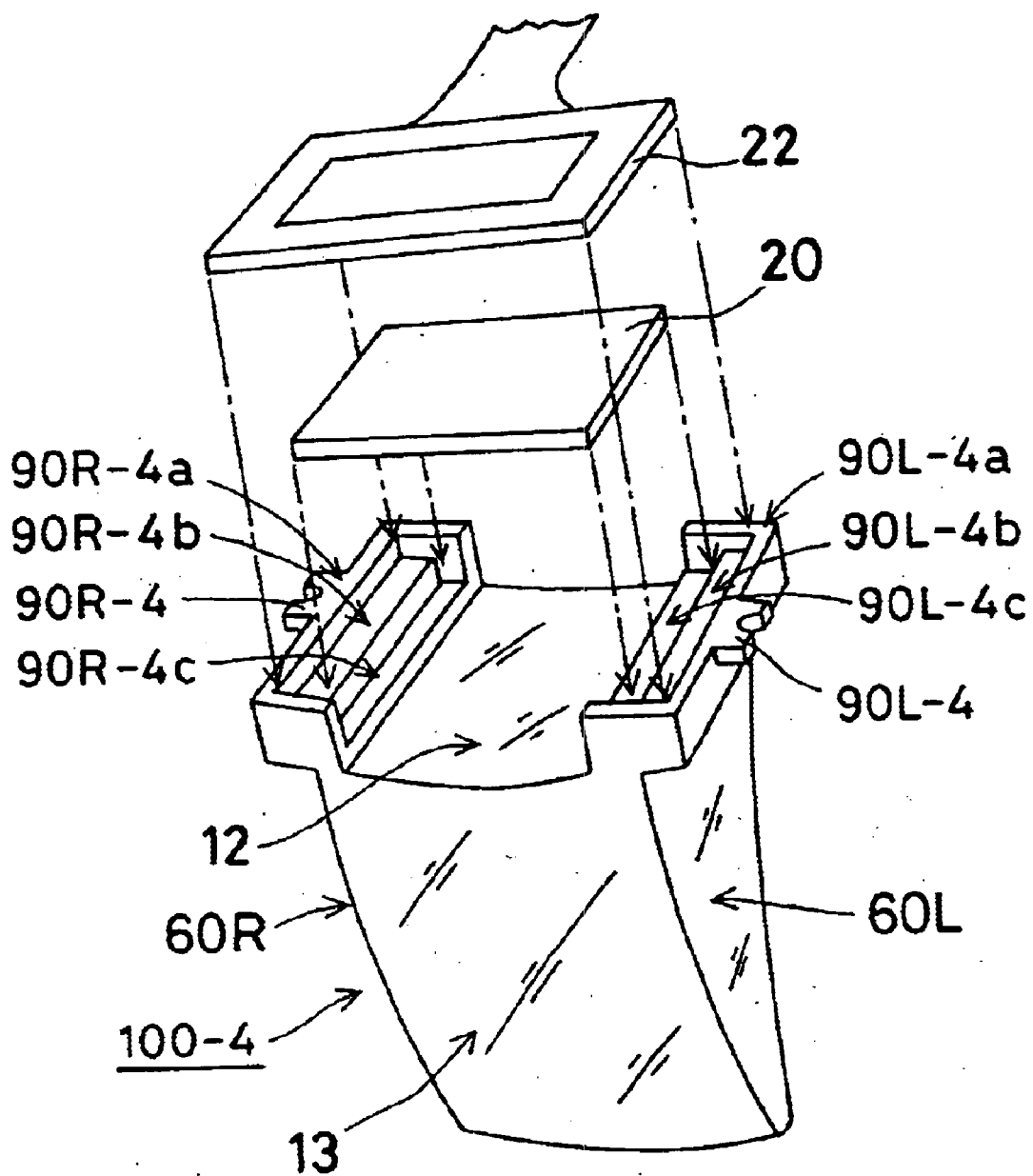
FIG. 5 is a perspective view of one modification of the optical prism explained with reference to FIG. 4, as viewed from above and the front side thereof in a slanting direction.

FIG. 5 is a perspective view of a further embodiment of the optical prism explained with reference to FIG. 4, as viewed from above and a rear side thereof in a slanting direction. The FIG. 5 embodiment is similar to the FIG. 4 embodiment in many respects. However, the FIG. 4 embodiment is characterized in that the left and right surfaces 90L-3b and 90R-3b are in a one-stepped recess form whereas the FIG. 5 embodiment is characterized by using a two-stepped recess form.

In the FIG. 5 embodiment, at the same level positions as the upper surfaces of the left and right protrusions 90L-4 and 90R-4 formed making use of the slide mechanism in the injection molding of the optical prism, there are provided left and right surfaces 90L-4a and 90R-4a which extend parallel with each other in a fore-and-aft direction. At positions recessed from the surfaces 90L-4a and 90R-4a in a step form having a given depth (equal to the thickness of a CCD 22), too, there are provided left and right surfaces 90L-4b and 90R-4b which extend parallel with each other in the fore-and-aft direction. Further, at positions recessed from the left and right surface 90L-4b and 90R-4b in an additional one-stepped recess form having a given depth (equal to or larger than a low-pass filter 20), there are provided left and right surfaces 90L-4c and 90R-4c which extend parallel with each other in the fore-and-aft direction.

The embodiment of FIG. 4 or 5 enables easy mounting of the CCD 22 and low-pass filter 20 compatible with the optical prism according to the invention or other filters or accessories if required.

Figure 6A:
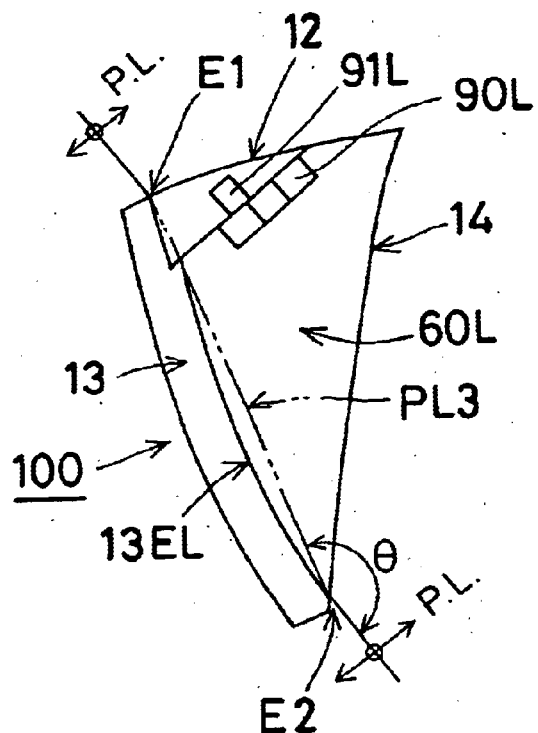
FIGS. 6(*a*) and 6(*b*) are views illustrative of the setting of the optical prism parting line explained with reference to FIGS. 1(*a*), 1(*b*) and 1(*c*).
Figure 6B:
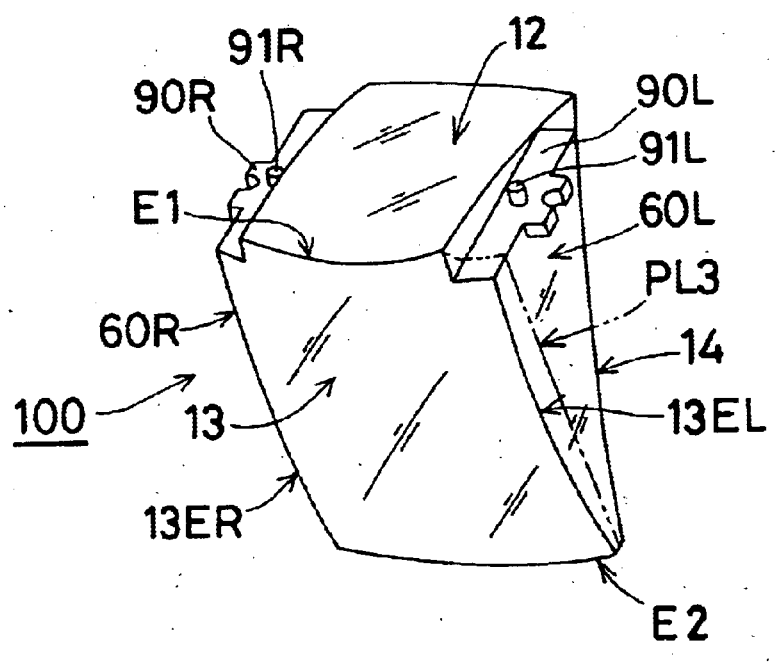

FIGS. 6(a) and 6(b) are views illustrative of the setting of the parting line P.L. for the optical prism 100 explained with reference to FIG. 1. FIG. 6(a) is a side view of the optical prism 100, and FIG. 6(b) is a perspective view of the optical prism 100 of FIG. 6(a) as viewed from above and a rear side thereof in a slanting direction.

As already explained with reference to FIG. 1, this prism 100 is fabricated by an injection molding process. The surface 12 of the prism 100 opposite to the image pickup element and the reflection surface 13 come in contact with each other at one ridgeline while the combined entrance and reflection surface 14 and the reflection surface 13 come in contact with each other at another ridgeline. It is to be understood that the term "ridgeline" is not a mathematically strictly defined term, and rather refers to an edge defined by two planar portions, for instance, those of the order of the size shown in these drawings. This shall apply hereinafter.

A mold parting line PL3 for injection molding is set along a virtual plane generally including two ridgelines E1 and E2 lying at positions that do not adjoin to each other and are opposite to each other as mentioned above. As shown, the molding parting line PL3 is spaced slightly away from both edges 13EL and 13ER of the reflection surface 13 formed by contact of the reflection surface 13 with left and right sides 60L and 60R, and extend forwardly in an arch manner.

Given the mold parting line PL3 set as in FIG. 6, the mold parting line is easily determined for the fabrication of the optical prism 100 by an injection molding process.

The mold parting line PL3 explained with reference to FIG. 6 is set at an angle θ with respect to the reference mold parting line P.L. In this embodiment, however, it is preferable that this angle θ is selected from the degree represented by a natural number. This makes it easy to set the accuracy of the mold used for injection molding for confirmation, and enables an optical prism to be easily fabricated with high accuracy.

Figure 7A:
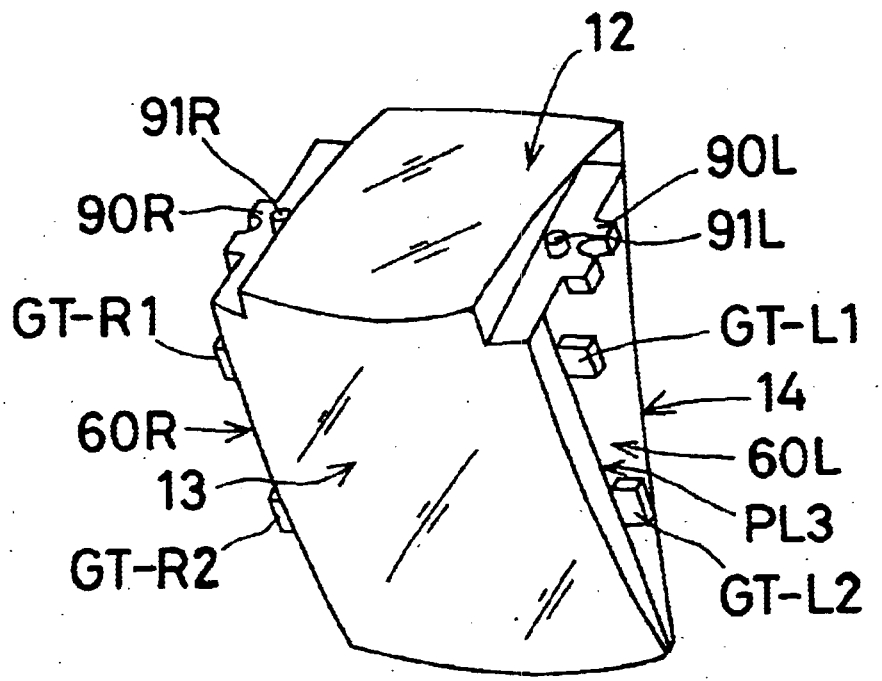
FIGS. 7(*a*) and 7(*b*) are views illustrative of the setting of a gate used in fabricating the optical prisms explained with reference to FIGS. 1(*a*), 1(*b*) and 1(*c*) and FIGS. 6(*a*) and 6(*b*).
Figure 7B:
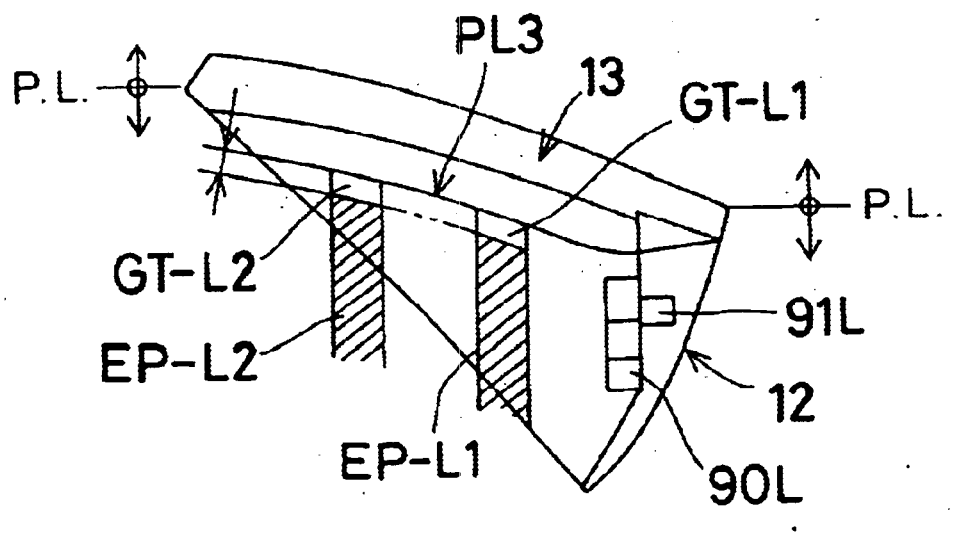

FIGS. 7(a) and 7(b) are views illustrative of the setting of a gate when the optical prism 100 explained with reference to FIG. 6 is fabricated by an injection molding process. FIG. 7(a) is a perspective view of the optical prism 100, as viewed from above and a rear side thereof in a slanting direction, and FIG. 7(b) is a side view of the optical prism 100 shown in FIG. 7(a). In FIG. 7, the same parts as in FIG. 6 are indicated by the same reference numerals.

As shown in FIG. 7(a), there are provided a resin-pouring gate GT-L1 used when the optical prism is fabricated by an injection molding process using a mold parted along the molding parting line PL3 on the left side 60L into upper and lower parts with a suitable space between them, and an ejection overflow GT-L2. On the right side 60R, too, ejection overflows GT-R1 and GT-R2 are provided while they are vertically located with a suitable space between them along the mold parting line. The gate GT-L1 and ejection overflow GT-L2 on the left side 60L are ejected by the associated ejector pins EP-L1 and EP-L2, respectively, upon removal of them from the mold. The same also holds for the ejection overflows GT-R1 and GT-R2. In other words, these gate GT-L1 and ejection overflows GT-L2, GT-R1 and GT-R2 serve as convex portions (pressure-receiving portions) for receiving pressures from a functioning portion for pouring resin in the mold in the injection molding process and the ejector pins for ejecting the resin out of the mold.

In particular, the gate GT-L1 and ejection overflows GT-L2, GT-R1 and GT-R2 are located equidistantly from the center of gravity of ejection pressures from the associated ejector pins EP-L1 and EP-L2 (and EP-R1 and EP-R2 not shown), and are formed with a uniform thickness.

According to the arrangement explained with reference to FIG. 7, the resin can be easily and surely ejected out of the mold, so that the optical prism can be fabricated by the injection molding process with high processing efficiency.

Figure 8A:
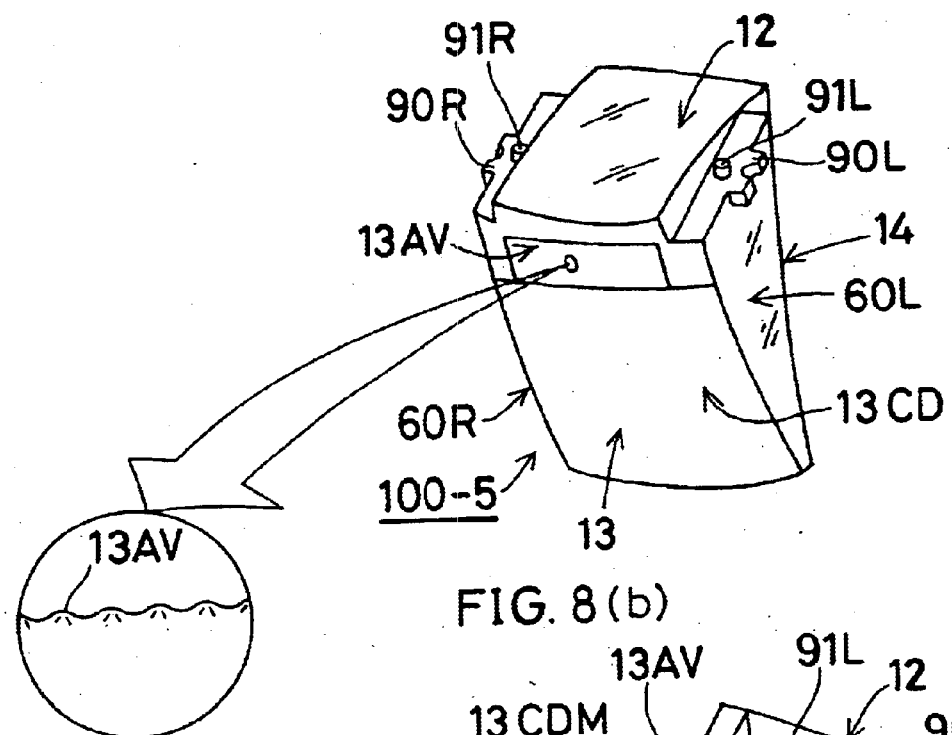
FIGS. 8(*a*), 8(*b*) and 8(*c*) illustrate a further modification of the optical prism explained with reference to FIGS. 1(*a*), 1(*b*) and 1(*c*).
Figure 8B:
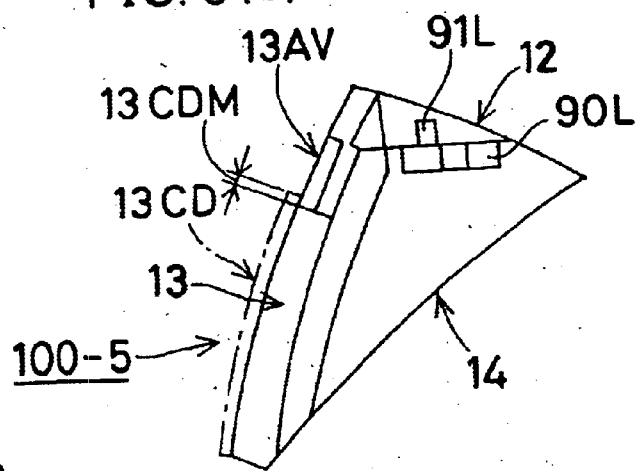
Figure 8C:
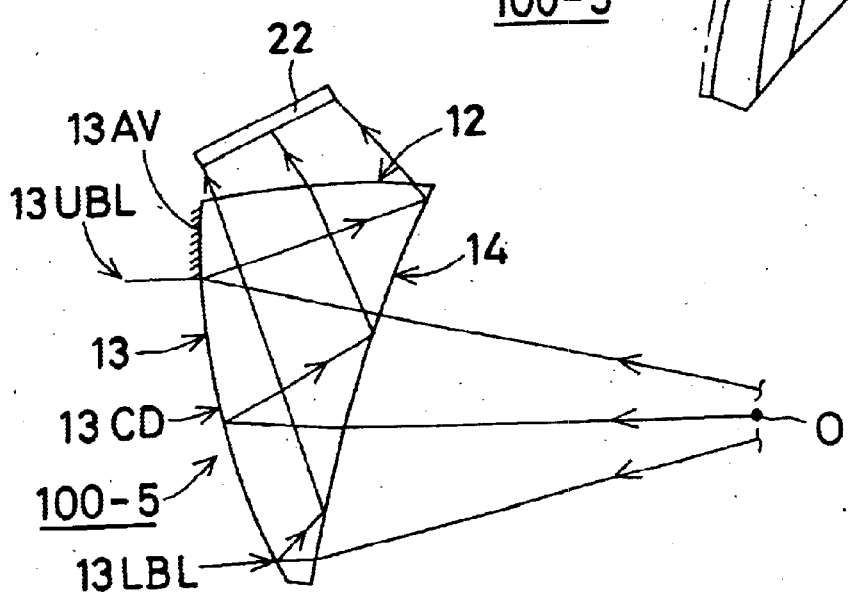

FIGS. 8(a), 8(b) and 8(c) are views illustrative of an yet further modification of the optical prism explained with reference to FIG. 1. FIG. 8(a) is a perspective view of an optical prism 100-5 as viewed from above and a rear side thereof in a slanting direction, FIG. 8(b) is a side view of the optical prism 100-5 of FIG. 8(a), and FIG. 8(c) is a conceptual rendering illustrative of the optical properties of the optical prism 100-5 shown in FIGS. 8(a) and 8(b). In FIG. 8, the same parts as in FIG. 1, etc. are indicated by the same reference numerals.

In the optical prism 100-5 of FIG. 8, a reflection surface 13 is provided with a region 13CD multi-coated substantially all over an effective agent making use of optical properties. An upper specific portion of the multi-coated region 13CD is satin-finished to obtain a satin-finished portion 13AV so as to prevent ghosts in picking up a subject image using this optical prism 100-5. The boundary between the multi-coated region 13CD and the satin-finished portion 13AV is provided with a coating margin 13CDM of given width (e.g., up to 1 mm) so as to perform proper multi-coating treatment. Due to the provision of the coating margin 13CDM, multi-coating can be easily performed without recourse of an awkward step of forming a film on the boundary site between a specific surface and the optical surface.

The satin-finished portion 13AV is positioned at an angle with respect to the multi-coated region 13CD to construct a portion different in definition from the multi-coated region 13CD, thereby achieving the effect on prevention of ghosts.

In the optical prism 100-5 of the above construction, light rays leaving a subject 0 propagate toward the CCD 22 upon reflection between an upper outermost ray line 13UBL defined by the boundary between the multi-coating region 13CD on the reflection surface 13 and the satin-finished portion 13AV on the reflection surface 13 and a lower outermost ray line 13LBL defining the lower limit of the effective range on the multi-coated region 13CD, as can be seen from FIG. 8(c) that is a conceptual rendering illustrative of the optical properties of the optical prism 100-5. At this time, the entrance of ghost light in an image pickup surface 21 of the CCD 22 is prevented by the action of the satin-finished portion 13AV.

Figure 9B:
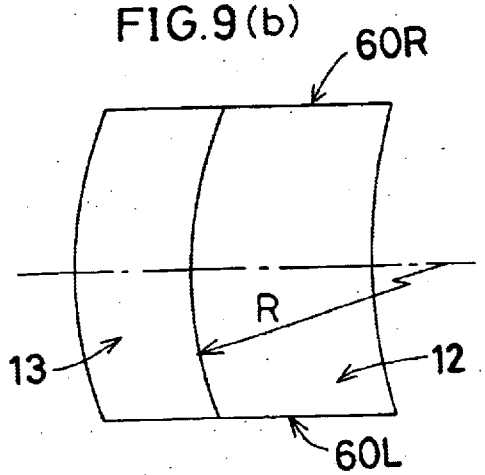
FIGS. 9(*a*), 9(*b*), 9(*c*) and 9(*d*) illustrate schematically the features of the outside shape of the optical prism explained with reference to FIGS. 1(*a*), 1(*b*) and 1(*c*).
Figure 9A:
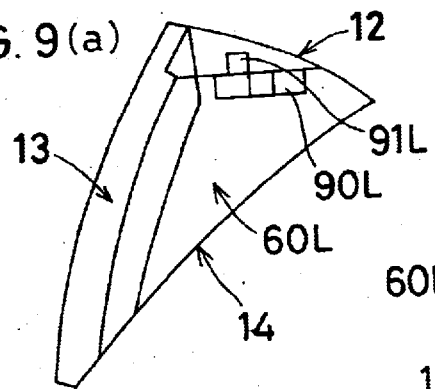
Figure 9C:
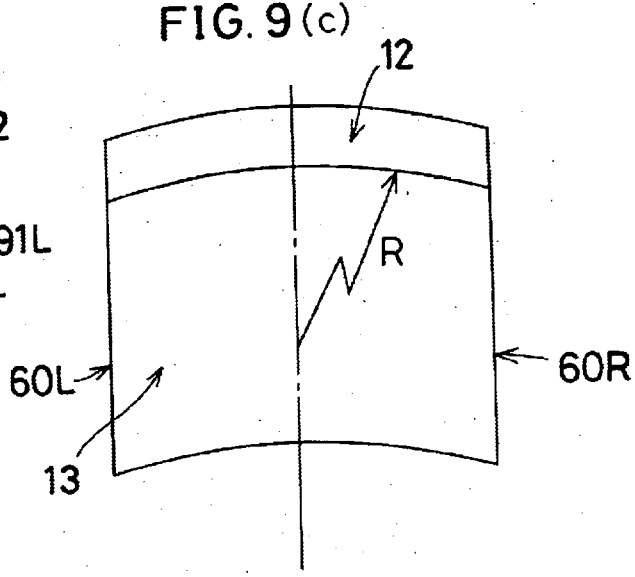
Figure 9D:
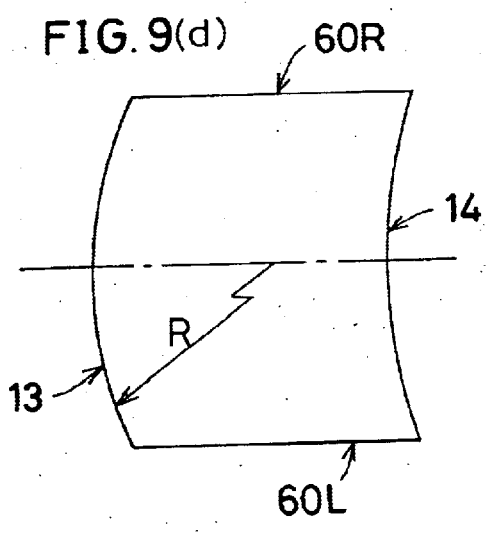

FIGS. 9(a), 9(b), 9(c) and 9(d) are schematics illustrative of the features of the outside shape of the optical prism explained with reference to FIG. 1. FIG. 9(a) is a side view of an optical prism 100, FIG. 9(b) is a view of the optical prism of FIG. 9(a) as viewed from above, FIG. 9(c) is a view of the optical prism as viewed from the rear side thereof, and FIG. 9(d) is a view of the optical prism as viewed from below. In FIG. 9, the same parts as in FIG. 1, etc. are indicated by the same reference numerals.

As can be seen from FIG. 9, optical surfaces such as an exit surface 12, a reflection surface 13 and a combined entrance and reflection surface 14 are molded in a curved surface form wherein a ridgeline defined by two adjoining surfaces thereof makes a curved line (having a curvature R). This makes it easy to construct a mold for the fabrication of the optical prism by an injection molding process. Further, the optical prism is formed in such a manner that at least two opposite surfaces of such optical surfaces are substantially equal to each other in terms of size in a widthwise direction intersecting an optical axis of the optical prism. This makes it easy to estimate the quality of the optical prism on an outer diameter basis.

Figure 10:
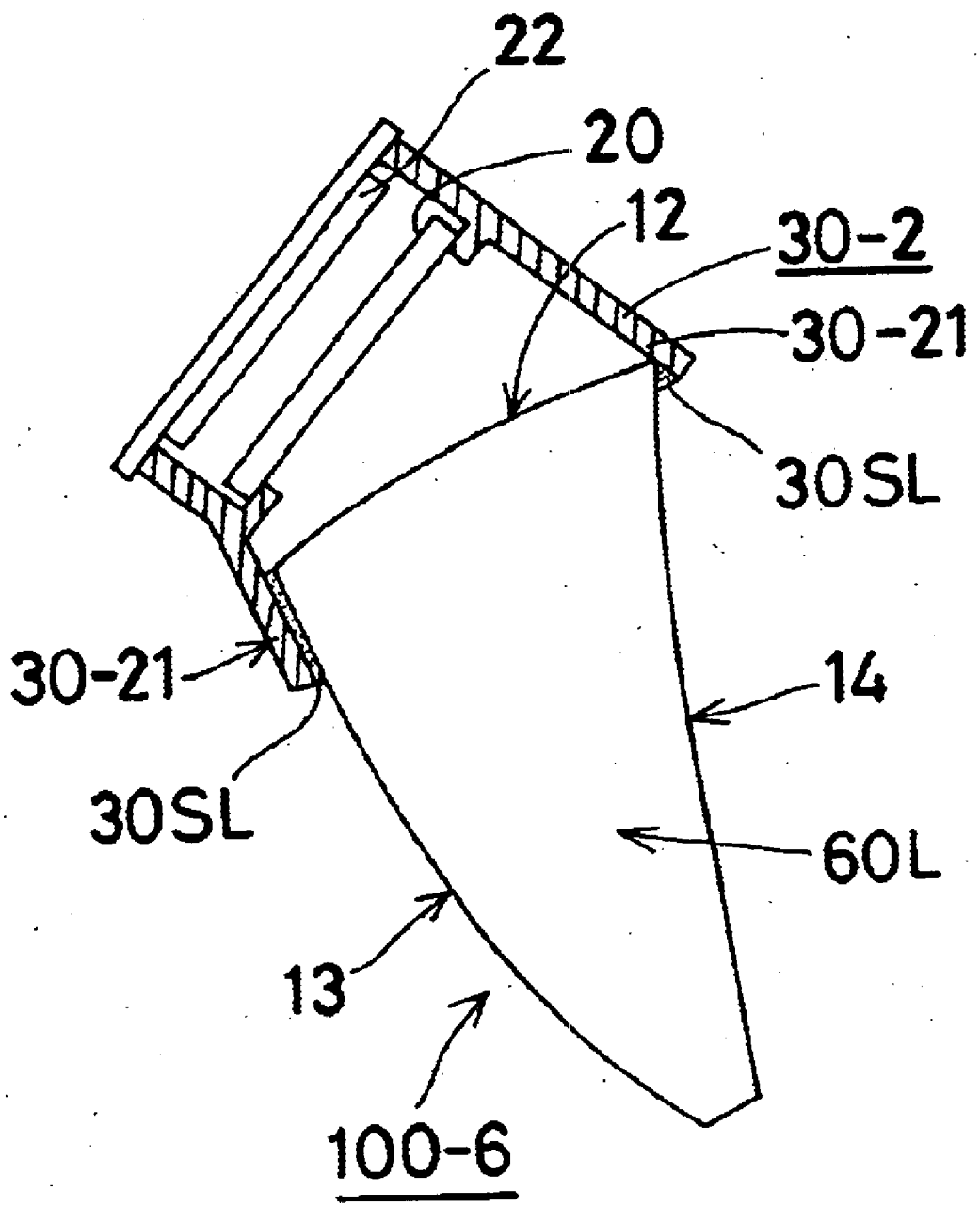
FIG. 10 is a view illustrative of another form of the optical prism explained with reference to FIGS. 1(*a*), 1(*b*) and 1(*c*).

FIG. 10 is a view illustrative of another embodiment of the optical assembly explained with reference to FIG. 1. In FIG. 10, the same parts as in FIGS. 1 and 6 are indicated by the same reference numerals.

A prism frame 30-2 of FIG. 10 is used in combination with an optical prism 100-6; it supports therein a CCD serving as an image pickup element 22 and an associated low-pass filter 20, and includes a lower skirt portion 30-21 for receiving the vertex of an exit surface 12 of the optical prism 100-6.

In the FIG. 10 optical assembly, a sealing agent 30SL is filled in a site at which the inner surface of the skirt portion 30-21 of the prism frame 30-2 is contiguous to the vertex of the optical prism 100-6. For the sealing agent 30SL in this case, a bonding agent having a function of joining together the prism frame 30-2 and the optical prism 100-6 is selected. This bonding agent has also an attribute of reducing reflection of light.

In the FIG. 10 optical assembly, it is easy to set up a closed space on the side of the exit surface 12 of the optical prism 100-6, so that the possibility of depositing dust particles on the side of the exit surface 12 can be substantially eliminated, thereby keeping its optical properties in good condition.

The bonding agent or the sealing agent 30SL has an attribute of reducing reflection of light, so that reflection of light on the side of the entrance surface 12 of the optical prism 100-6 can be substantially eliminated.

FIGS. 11(a) and 11(b) are views illustrative of yet another embodiment of the optical assembly explained with reference to FIGS. 1 and 10. FIG. 11(a) is a side view of the optical assembly, and FIG. 11(b) is a partly sectioned view of the optical assembly of FIG. 11(a). AS in FIG. 11, the same parts as in FIGS. 1 and 10 are indicated by the same reference numerals.

As in the foregoing embodiment, a prism frame 30-3 shown in FIG. 11 is used in combination with an optical prism 100-6; it supports therein a CCD serving as an image pickup element 22 and an associated low-pass filter 20, and includes a lower skirt portion 30-31 for receiving the vertex of an exit surface 12 of the optical prism 30-31.

In the FIG. 11 optical assembly, the prism frame 30-3 comprises the lower skirt portion 30-31 and a side wall portion 30-32 located above the lower skirt portion 30-31 for cutting off extraneous light while it supports the low-pass filter 20 and the image pickup element 22. These skirt portion 30-31 and side wall portion 30-32 are a shielding or cutting-off member that cooperates with the low-pass filter 20 and the exit surface 12 of the optical prism 100-6 to set up a substantially closed space. In other words, the cutting-off member is formed by the skirt portion 30-31 extending upwardly from the optical prism 100-6, the side wall portion 30-32 extending from the prism frame 30-3 and a flange portion for joining them together.

According to the FIG. 11 embodiment wherein the closed space is set up on the side of the exit surface 12 of the optical prism, there is little or no fear of depositing dust particles on the exit surface 12, so that the optical properties thereof can be kept in good condition.

FIGS. 12(a) and 12(b) are views illustrative of a further embodiment of the optical assembly explained with reference to FIG. 11. FIG. 12(a) is a side view of the optical assembly, and FIG. 12(b) is a partly sectioned view of the optical assembly of FIG. 12(a). In FIG. 12, the same parts as in FIGS. 1, 10 and 11 are indicated by the same reference numerals.

As in the foregoing embodiments, a prism frame 30-4 is used in combination with an optical prism 100-6; it supports therein a CCD working as an image pickup element 22 and an associated low-pass filter 20, and includes a lower skirt portion 30-41 for receiving the vertex of an entrance surface 12 of the optical prism 100-6.

In the prism frame 30-4 of the FIG. 12 optical assembly, the lower skirt portion 30-41 and a side wall portion 30-42 positioned above the lower skirt portion 30-41 for cutting off extraneous light while it supports the low-pass filter 20 and CCD 22 are seamlessly contiguous to each other to form a cutting-off member that cooperates with the low-pass filter 20 and an exit surface 12 of the optical prism 100-6 to set up a substantially closed space. In other words, the cutting-off member extends downwardly from the prism frame 30-3, and is joined to a flange portion that is a convex portion of the optical prism 100-6.

In the FIG. 12 embodiment, too, the exit surface 12 is unsusceptible to deposition of dust particles thereon, so that the optical properties thereof can be kept in condition.

Figure 13:
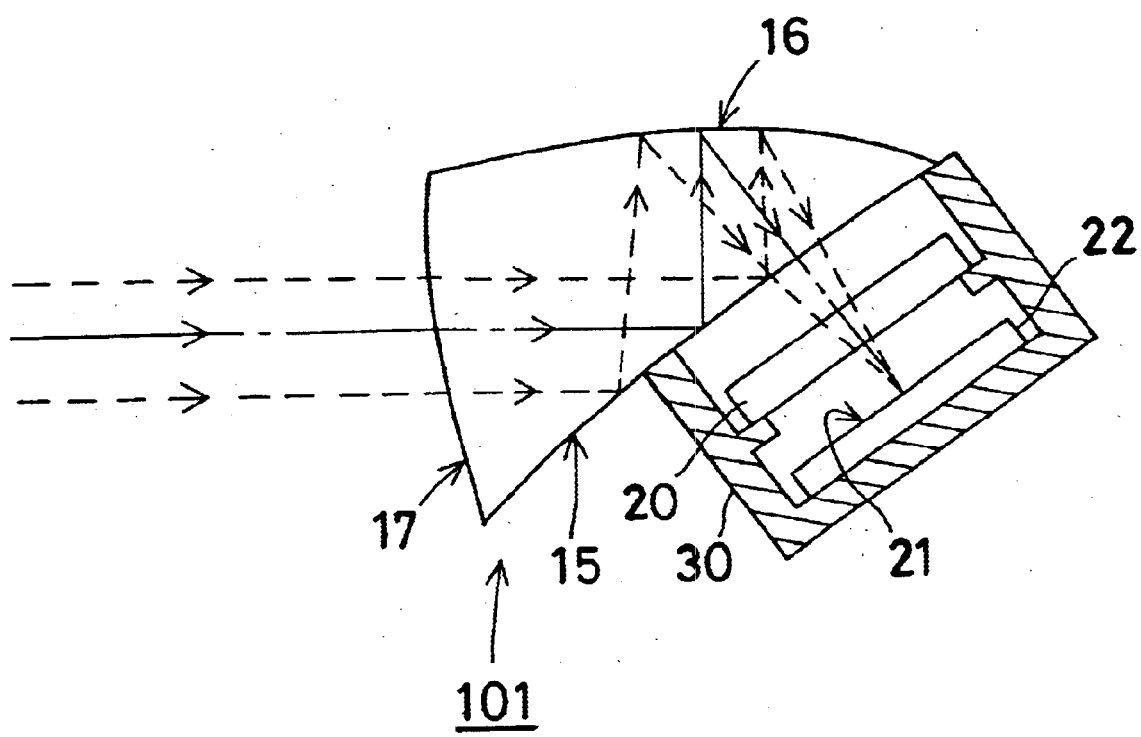
FIG. 13 is a sectional side schematic of an optical assembly comprising a combination of another type of image formation optical prism with a prism frame.

In the embodiments shown in FIGS. 14 to 19, an image formation optical prism 101 different in type from that in the FIGS. 1 to 12 embodiments is used. As can be seen from FIG. 13 that is a sectioned side schematic illustrative of an optical assembly comprising a combination of a prism frame 30 with the optical prism 101, the optical prism 101 comprises three optical acting surfaces 15, 16 and 17. The surface 17 is an entrance surface through which light rays are entered from an object (a subject) into the optical prism 101, the surface 15 is a combined reflection and exit surface consisting of a reflection surface at which the light rays incident from the entrance surface 17 are first internally reflected toward an opposite (reflection) surface 16 and an exit surface through which the light rays subjected to second reflection at the reflection surface 16 leaves upon refraction, thereby forming an image of the object on an image pickup surface 21 of an image pickup element 22, and the surface 16 is a combined reflection and exit surface at which the first reflected light rays are again reflected toward the combined reflection and exit surface 15. The three surfaces 15, 16 and 17 are each constructed of a curved surface such as a three-dimensional surface, a spherical surface, an aspherical surface, and an anamorphic surface, so that the optical prism 101 can have positive image-formation power (catadioptric power: the reciprocal of focal length). It is then preferable that at least one surface of the three surfaces is constructed of a three-dimensional surface symmetric with respect to plane, which has only one symmetrical plane to give power to a ray bundle and make correction of decentration aberration.

Figure 14B:
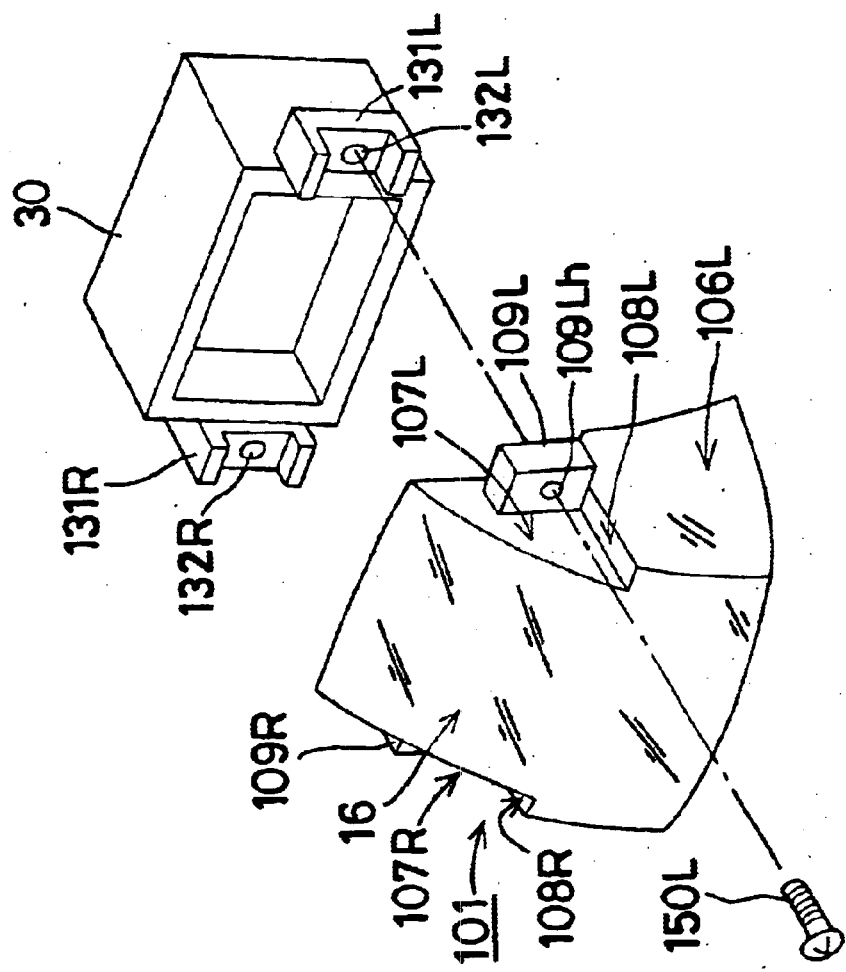
FIGS. 14(*a*) and 14 (*b*) are schematics illustrative of how the optical prism of FIG. 13 is assembled with an associated prism frame in one manner.
Figure 14A:
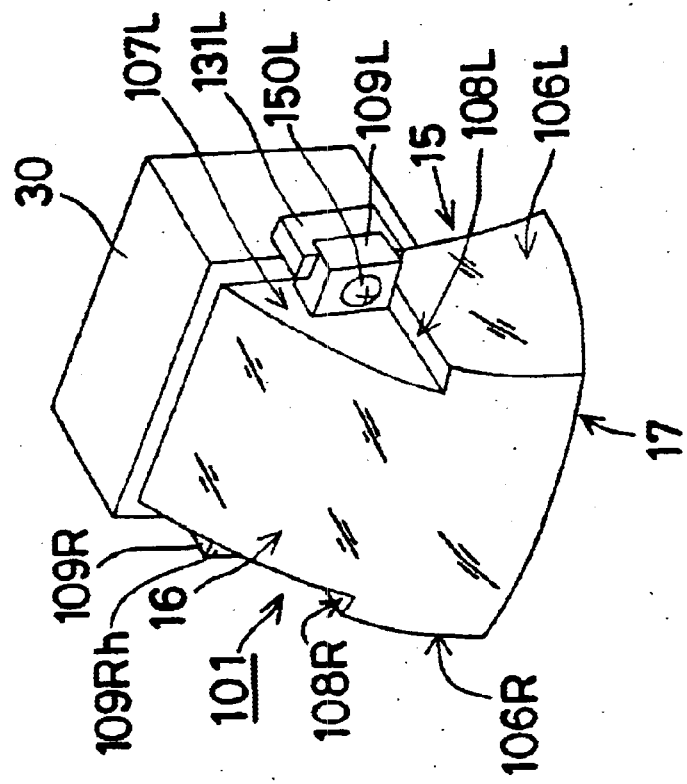

FIGS. 14(a) and 14(b) are schematics illustrative of how the image formation optical prism 101 and an associated prism frame 30 are assembled together. FIG. 14(a) is a schematic illustrative of the optical prism assembled together with the prism frame 30, and FIG. 14(b) is an exploded schematic of the optical prism 101 and the prism frame 30.

On a left side 106L and a right side 106R formed in directions intersecting the directions of the entrance surface 17, reflection surface 16 and combined reflection and exit surface 15 there are provided with recesses 107L and 107R, respectively, in positions where they are not deterrents to an optical path taken by incident light in an effective diameter from the entrance surface 17 to the combined reflection and exit surface 15. In the FIG. 14 embodiment, these recesses 107L and 107R are narrowed by left and right steps 108L and 108R formed by an upper block of the optical prism 101 the front and rear surfaces of which are constructed of the reflection surface 16 and combined reflection and exit surfaces 15, respectively, and a lower block of the optical prism 101 the front and rear surfaces of which are constructed of the entrance surface 17 and combined reflection and exit surface 15, respectively.

Protrusions 109L and 109R bulge outwardly from the left and right sides within the recesses 107L and 107R, respectively.

As can be appreciated from the explanation made with reference to FIG. 14, the entrance surface 17, combined reflection and emit surface 15 and reflection surface 16 are each formed into a substantially quadrilateral shape defined by ridgelines on the periphery thereof. It is thus easy to ensure the precision upon processing of a mold used for the fabrication of the optical prism 101 by an injection molding process and, hence, the precision upon processing of the optical prism per se.

As shown in FIG. 14, the prism frame 30 is in a hollow rectangular frame. As shown in section in FIG. 13, a CCD serving as an image pickup element 22 and an associated low-pass filter 20 are supported in the prism frame 30, and optical element-mounting portions 131L and 131R are formed on the sides of left and right members extending in a fore-and-aft direction. Further, these mounting portions are provided with threaded holes 132L and 132R through substantial centers of the mounting portions 131L and 131R in the fore-and-aft direction. On the other hand, the protrusions 109L and 109R are provided with fore-and-aft through-holes 109L*h* and 109R*h* (not shows) in positions corresponding to the threaded holes 132L and 132R. Screws 150L and 150R (not shown) are screwed through the through-holes 109L*h* and threaded hole 132L and the through-hole 109R*h* and threaded hole 132R to join together the protrusions 109L and 109R on the optical prism 101 and the optical element-mounting portions 131L and 131R for relative alignment of the associated members. As shown, the optical element-mounting portions 131L and 131R are provided with recesses corresponding to the protrusions 109L and 109R on the optical prism 101. By engaging the protrusions 109L and 109R tightly within these recesses, alignment is achieved in every direction, i.e., in the fore-and-aft, horizontal and vertical directions.

FIGS. 15(a), 15(b) and 15(c) are schematics illustrative of how an optical prism 101 similar to that shown in FIG. 14 and an associated prism frame 30 are assembled together.

FIG. 15(a) is a schematic of the optical prism 101 assembled with the prism frame 30, FIG. 15(b) is an exploded schematic of the optical prism 101 and prism frame 30, and FIG. 15(c) is a partly enlarged schematic of FIG. 15(b) as taken along a line indicated by an arrow A.

In FIG. 15, the same parts as in FIG. 14 are indicated by the same reference numerals, and so are not explained in detail.

As shown, a CCD acting as an image pickup element 22 and an associated low-pass filter 20 are supported in the prism frame 30 that is in a hollow rectangular frame form. Optical element-mounting portions 131L*a* and 131R*a* are provided on the sides of left and right vertical members of the prism frame 30. The mounting portions 131L*a* and 131R*a* are provided with vertical engaging grooves 133L and 133R extending upwardly from the bottoms thereof. These grooves are provided with protuberances 133L*a* and 133R*a* that provide alignment click mechanisms at medium level positions in a vertical direction.

On the other hand, protrusions 109L*a* and 109R*a* formed on recesses 107L and 107R on the optical prism 101 conform in shape to the engaging grooves 133L and 133R, and are provided with indents 109L*a*1 and 109R*a*1 at vertically medium level positions thereof and corresponding to the protuberances 133L*a* and 133R*a* that provide the alignment click mechanisms. When the protrusions 109L and 109R on the optical prism 101 are properly engaged within the engaging grooves 133L and 133R in the optical element-mounting portions 131L*a* and 131R*a*, the protuberances 133L*a* and 133R*a* functioning as the alignment click mechanisms are tightly and resiliently engaged within the indents 109L*a*1 and 109R*a*1 in the protrusions 109L*a* and 109R*a* on the optical prism 101, thereby ensuring alignment in every direction, i.e., in the fore-and-aft, horizontal and vertical directions. Accordingly, the optical prism and prism frame can be easily assembled together without recourse to screws or the like. FIG. 15(c) is a partly enlarged schematic of FIG. 15(b) as taken along the line indicated by the arrow. From this one can have an understanding of how the protrusion 109L*a* on the optical prism 101, which is in an L-shaped form as viewed from above and below in the vertical direction, is engaged within the engaging groove 133L that conforms in shape thereto and is provided in the optical element-mounting portion 131L*a*.

As can be appreciated from the explanation made with reference to the drawings and what is illustrated therein, each of the protrusions 109L, 109R, 109L*a* and 109R*a* has one or more planar portions, a given one of which is substantially parallel or vertical to an image pickup-mounting surface of the prism frame 30 that is a frame member. It is thus easy to ensure the precision of alignment of relative positions of the optical prism and image pickup element.

The alignment portion for alignment of the above relative positions comprises an engaging protrusion or recess corresponding to an engaging recess or protrusion formed on the frame member (prism frame 30), and said engaging protrusion or recess comprises a bulging-out or indent portion for limiting the disengagement thereof from the associated engaging recess or protrusion on the frame member (prism frame 30) at least in a specific direction. It is thus easy to gain the precision of alignment of the relative positions of the optical prism and image pickup element, and assemble them together.

The aforesaid bulging-out or indent portion may be provided in the form of a dovetail or dovetail groove corresponding to a dovetail groove or dovetail formed as the engaging recess or protrusion on the frame member (prism frame 30). Even with this dovetail arrangement, it is easy to gain the precision of alignment of the relative positions of the optical prism and image pickup element, and assemble them together.

FIGS. 16(a) and 16(b) are schematics illustrative of how an optical prism 101 similar to those of FIGS. 14 and 15 is assembled together with an associated prism frame 30.

FIG. 16(a) is a schematic of the optical prism 101 assembled together with the prism frame 30, and FIG. 16(b) is an exploded schematic of the optical prism 101 and prism frame 30.

In FIG. 16, the same parts as in FIGS. 14 and 15 are indicated by the same reference numerals, and so are not explained in detail.

As shown, a CCD operating as an image pickup element 22 and an associated low-pass filter 20 are supported in the prism frame 30 that is in a hollow rectangular frame form. Optical element-mounting portions 131L$a$ and 131R$b$ bulge out of the sides of left and right vertical members of the prism frame 30. These mounting portions 131L$b$ and 131R$b$ are provided with two parallel slits extending rearwardly from their front ends to define resilient pieces 134L and 134R. On the insides of the resilient pieces 134L and 134R in the vicinities of their front ends, there are provided engaging protuberances 134L$b$ and 134R$b$.

On the other hand, protrusions 109L$a$ and 109R$a$ formed on recesses 107L and 107R in the optical prism 101 conform in shape to the optical element-mounting portions 131L$b$ and 131R$b$, and are provided with indents 109L$b$ and 109R$b$ corresponding to the engaging protuberances 134L$b$ and 134R$b$ at vertically medium level positions of the fronts of the protrusions 109L and 109R. By resilient and tight engagement of the engaging protuberances 134L$b$ and 134R$b$ on the optical element-mounting portions 131L$b$ and 131R$b$ within the indents 109L$b$ and 109R$b$ in the protrusions 109L$a$ and 109R$a$, it is possible to ensure alignment in every direction, i.e., in the fore-and-aft, horizontal and vertical directions. This makes it easy to assemble together the optical prism and prism frame without recourse to screws or the like.

Figure 17B:
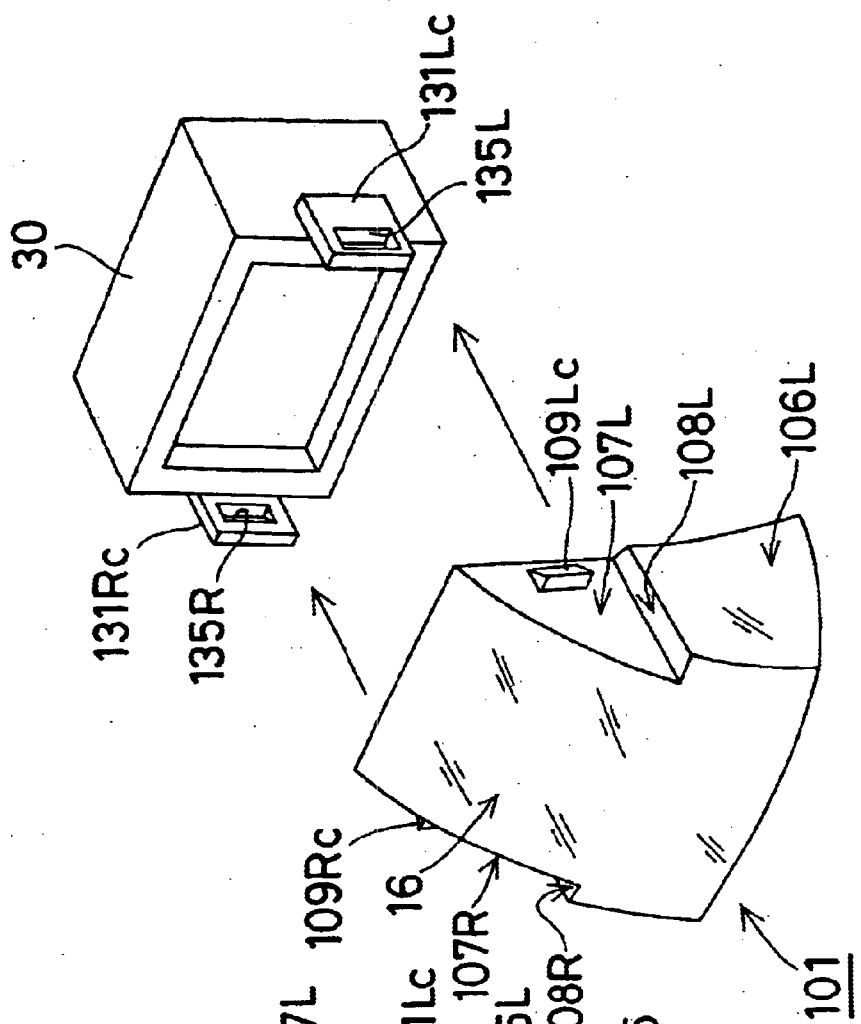
FIGS. 17(*a*) and 17(*b*) are schematics illustrative of how the optical prism of FIG. 13 is assembled with an associated prism frame in a further manner.
Figure 17A:
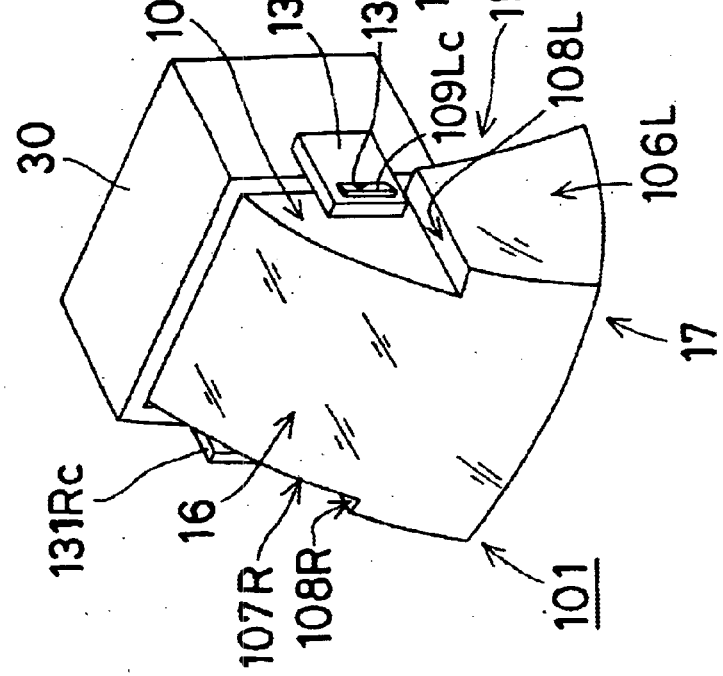

FIGS. 17(a) and 17(b) are schematics illustrative of how an optical prism 101 similar to those of FIGS. 14 to 16 is assembled together with an associated prism frame 30.

FIG. 17(a) is a schematic of the optical prism 101 assembled together with the prism frame 30, and FIG. 17(b) is an exploded schematic of the optical prism 101 and prism frame 30.

In FIG. 17, the same parts as in FIGS. 14 to 16 are indicated by the same reference numerals, and so are not explained in detail.

As shown, a CCD operating as an image pickup element 22 and an associated low-pass filter 20 are supported in the prism frame 30 that is in a hollow rectangular frame form. Optical element-mounting portions 131L$c$ and 131R$c$ bulge out of the sides of left and right vertical members of the prism frame 30. The mounting portions 131L$c$ and 131R$c$ are provided with rectangular slots 135L and 135R in positions in the vicinities of their front ends. These optical element-mounting portions 131L$c$ and 131R$c$ are resiliently joined to the left and right vertical members of the prism frame 30. Alternatively, they may be formed of resilient members.

On the other hand, protrusions 109L$c$ and 109R$c$ formed on recesses 107L and 107R in the optical prism 101 conform in shape to the engaging rectangular slots 135L and 135R in the optical element-mounting portions 131L and 131R. By resilient and tight engagement of the protrusions 109L$c$ and 109R$c$ on the optical prism 101 within the engaging rectangular slots 135L and 135R in the optical element-mounting portions 131L$c$ and 131R$c$ of the prism frame 30, it is possible to ensure alignment in every direction, i.e., in the fore-and-aft, horizontal and vertical directions. Thus, the optical prism and prism frame can be easily assembled together without recourse to screws or the like.

In the embodiments shown in FIGS. 16 and 17, the protrusions 109L$a$ and 109R$a$, and 109L$c$ and 109R$c$ function as alignment portions. These alignment portions are provided with receiving faces for receiving resilient force produced by abutment against the resilient pieces 134L and 134R formed on the prism frame member (prism frame 30) or the optical element-mounting portions 131L$b$ and 131R$b$, so that changes in the relative positions of the alignment portions by resilient force due to self-elastic deformation can be reduced. Thus, the precision of alignment of the relative positions of the optical prism and prism frame can be easily ensured so that they can be easily assembled together.

FIGS. 18 and 19 illustrate a further embodiment of the present invention. In this embodiment, an optical prism 100-7 such as one shown in FIG. 1(b) is attached to a prism frame 30 such as one shown in FIG. 14 by means of a mounting mechanism.

Figure 19B:
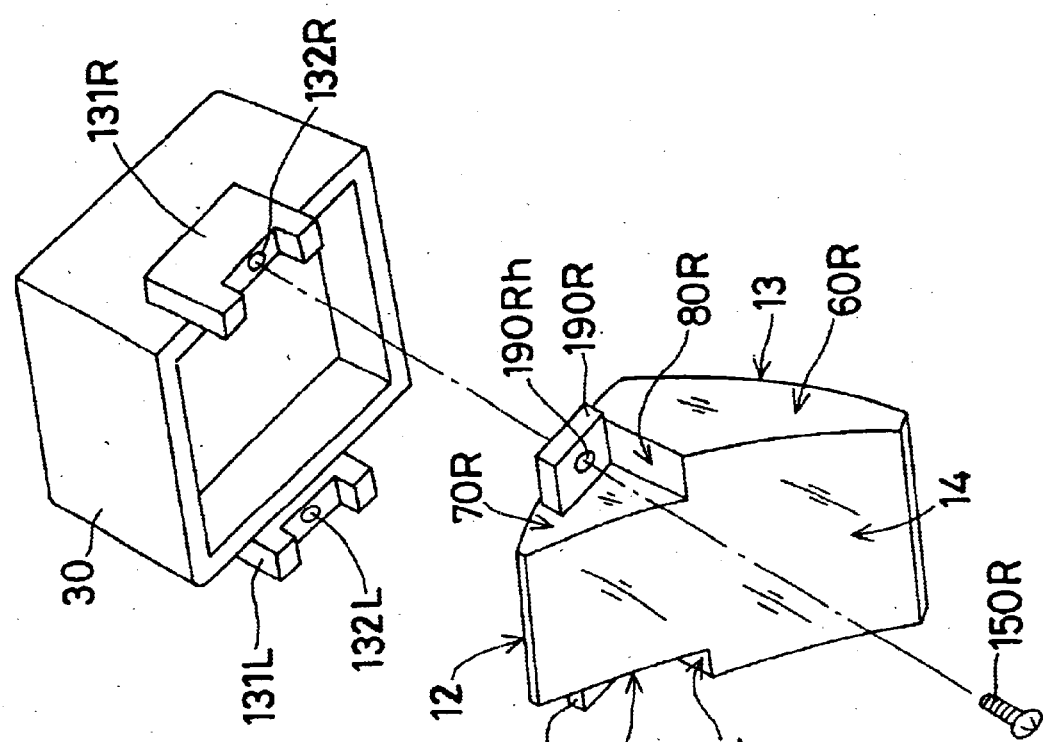
FIGS. 19(*a*) and 19(*b*) are schematics illustrative of how an optical prism similar to that shown in FIGS. 18(*a*), 18(*b*) and 18(*c*) is assembled with an associated prism frame.
Figure 19A:
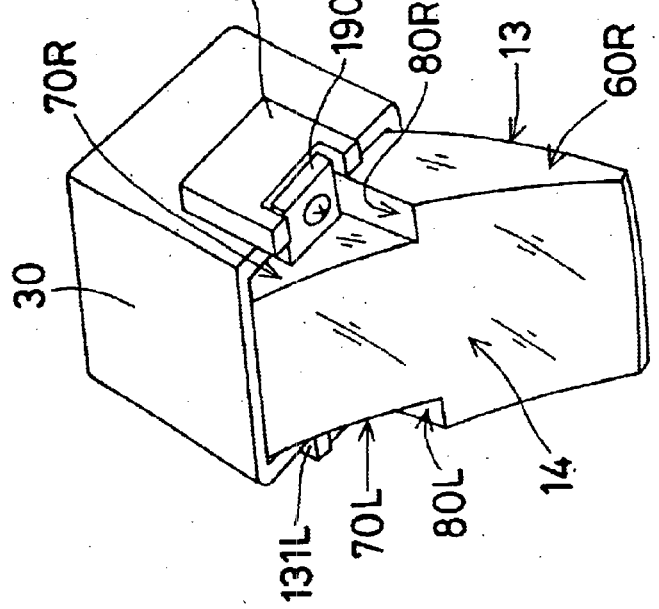

FIG. 18(a) is a perspective view that mainly illustrates an entrance surface (front side) of the optical prism 100-7 as viewed from above and the front side in a slanting direction, FIG. 18(b) is a perspective view illustrative of an exit surface and a reflection surface (rear side) of the optical prism 100-7 as viewed from above and the rear side in a slanting direction, and FIG. 18(c) is a side view of the optical prism 100-7 as viewed in a widthwise direction thereof. FIG. 19(a) and 19(b) are schematics illustrative of how the optical prism 100-7 of FIG. 18 is assembled together with an associated prism frame 30. FIG. 19(a) is a schematic illustrative of how the optical prism 100-7 and prism frame 30 are assembled together, and FIG. 19(b) is an exploded schematic of the optical prism 100-7 and prism frame 30. In FIGS. 18 and 19, the same parts as in FIGS. 1 and 14 are indicated by the same reference numerals, and so detailed explanations thereof are here omitted.

As shown in FIG. 19, a CCD serving as an image pickup element 22 and an associated low-pass filter 20 are supported in the prism frame 30 that is in a hollow rectangular frame form. Optical element-mounting portions 131L and 131R bulge out of the sides of left and right vertical members of the frame 30, and are provided in their substantial centers with threaded holes 132L and 132R extending in a fore-and-aft direction. On the other hand, protrusions 190L and 190R formed on recesses 70L and 70R in the optical prism 100-7 are provided with through-holes 190L$h$ (not shown) and 190R*h* extending in the fore-and-aft direction, which through-holes correspond to the threaded holes 132L and 132R. Screws 150L (not show) and 150R are inserted through the through-hole 190L*h* and threaded hole 132L and the through-hole 190R*h* and threaded hole 132R to join the protrusions 190L and 190R on the optical prism 100-7 to the optical element-mounting portions 131L and 131R of the prism frame 30, so that the relative positions of these members can be in alignment with each other. As shown, the optical element-mounting portions 131L and 131R are provided with indents in association with the protrusions 190L and 190R on the optical prism 100-7. By tight engagement of the protrusions 190L and 190R within these indents, it is possible to gain alignment in every direction, i.e., in the fore-and-aft, horizontal and vertical directions.

In the instant embodiment, the prism frame with the image pickup element, etc. supported therein is attached to the optical prism by means of the protrusions or recesses formed on both sides of the optical prism. In what follows, several examples of other mounting mechanism are given. In the embodiments shown in FIGS. 20 to 24, a CCD (image pickup element) 22 mounted on a CCD substrate 23 is fixed on an image formation plane in front of the combined reflection and exit surface 15 of the optical prism 101 shown in FIG. 13. In these figures, the same parts as in FIGS. 1 to 19 are indicated by the same reference numerals, and so detailed explanations thereof are omitted.

FIGS. 20(*a*) and 20(*b*) illustrate a further embodiment of the present invention. In this embodiment, CCD substrate-mounting pillar members 161 and 162 are integrally formed outside of an effective region of the combined reflection and exit surface of an optical prism 101 such as one shown in FIG. 13.

FIGS. 20(*a*) and 20(*b*) are schematics illustrative of how the image formation optical prism 101 and the associated CCD substrate 23 are assembled together. FIG. 20(*a*) is a schematic illustrative of the image formation optical prism 101 and CCD substrate 23 are assembled together, and FIG. 20(*b*) is an exploded schematic illustrative of the optical prism 101 and CCD substrate 23.

In the instant embodiment, the two pillar members 161 and 162 for mounting the CCD substrate 23 on the optical prism 101 are provided at opposite positions of the combined reflection and exit surface 15 of the optical prism 101 outside of its effective surface by means of integral molding. The pillar members 161 and 162 are provided at their ends with pins 161*a* and 162*a*. The pin 161*a* is inserted into a mounting hole 23*a* formed in the CCD substrate 23 and the pin 162*a* is inserted into a mounting slot 23*b* formed in the CCD substrate 23. The pin 161*a* and mounting hole 23*a*, and the pin 162*a* and mounting slot 23*b* cooperate with each other for alignment, and the CCD substrate 23 is fixed to the optical prism 101 as by a bonding agent.

Figure 21B:
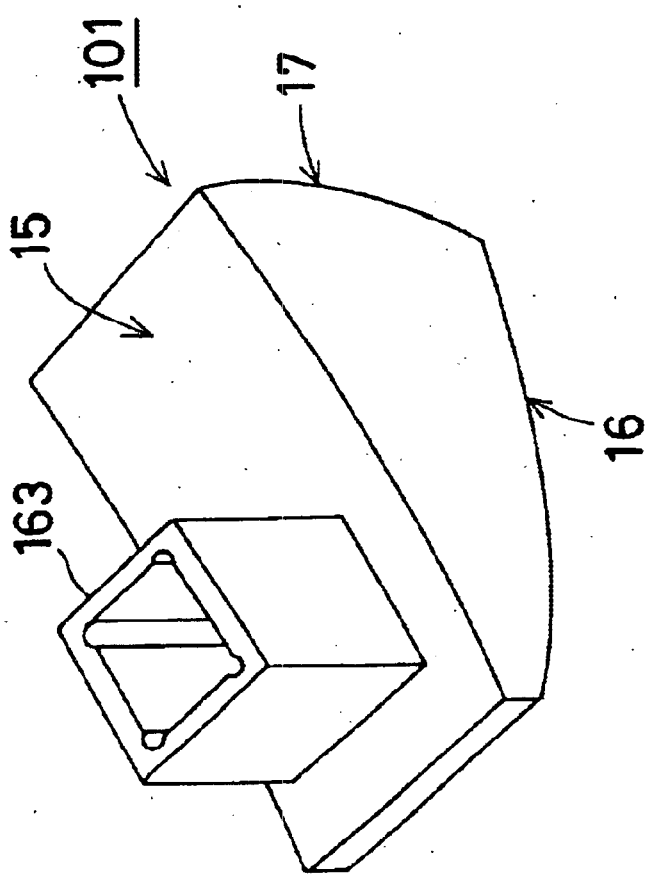
FIGS. 21(*a*) and 21(*b*) are schematics illustrative of an image formation optical prism that is yet another embodiment of the present invention is assembled with an associated CCD substrate.
Figure 21A:
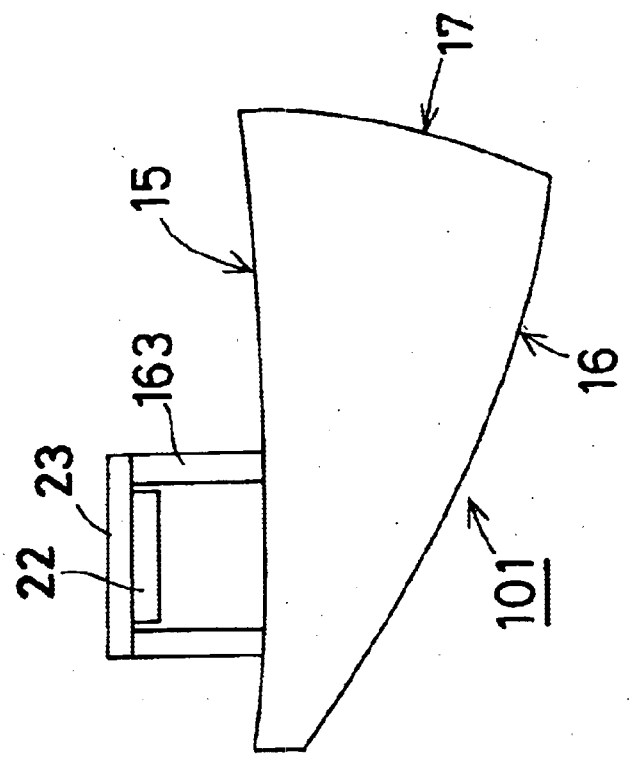

FIGS. 21(*a*) and 21(*b*) show one modification of the FIG. 20 embodiment. In this embodiment, a CCD substrate-mounting column 163 of a rectangular shape in section is integrally formed outside of an effective region of a combined reflection and exit surface 15 of an optical prism 101 such as one shown in FIG. 13.

FIGS. 21(*a*) and 21(*b*) are schematics illustrative of how the image formation optical prism 101 and an associated CCD substrate 23 are assembled together. FIG. 21(*a*) is a schematic illustrate of how the optical prism 101 and CCD substrate 23 are assembled together, and FIG. 21(*b*) is an exploded view of the optical prism 101.

In this embodiment, the column member 163 is formed with the optical prism 101 as an integral piece in such a manner that an area of the combined reflection and exit surface 15 of the optical prism 101 outside of its effective region is surrounded by the column member 63. While a CCD 22 is inserted in the inside of the end of the column member 63, the CCD substrate 23 is positioned and fixed to the end face of the column member 163 as by a bonding agent.

Figure 22A:
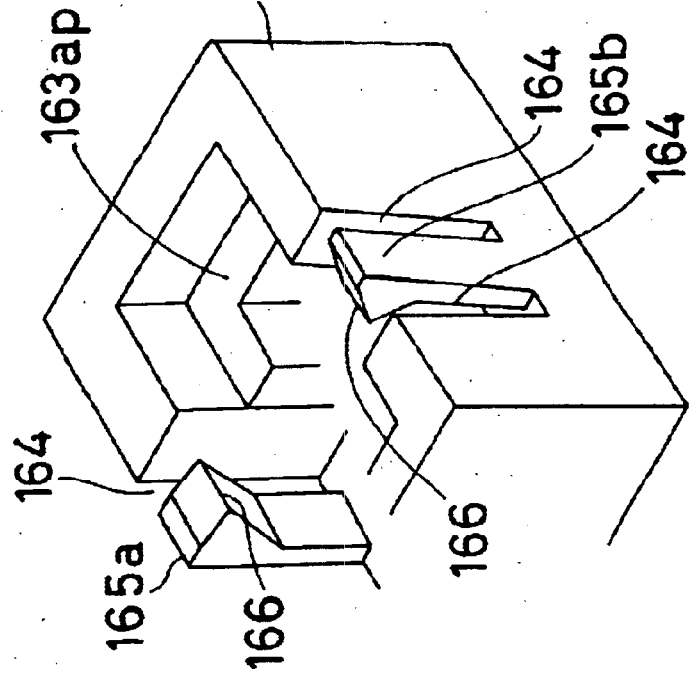
FIGS. 22(*a*) and 22(*b*) illustrate a modification of the embodiment shown in FIGS. 21(*a*) and 21(*b*).
Figure 22B:
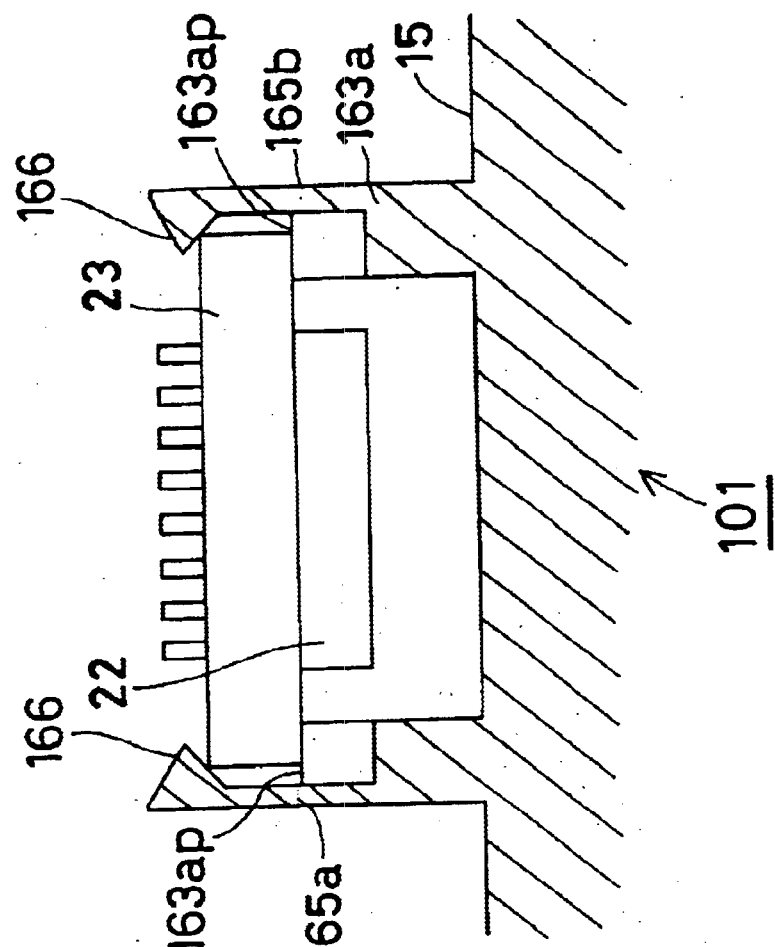

FIGS. 22(*a*) and 22(*b*) illustrate schematically one modification of the FIG. 21 embodiment. In the instant embodiment, a cylindrical column member 163*a* of a rectangular shape in section is integrally formed on an area of a combined reflection and exit surface 15 of an optical prism 101 outside of its effective region, and CCD substrate (33)-mounting resilient pieces 165*a* and 165*b* are provided on the cylindrical column member 163 during molding.

FIG. 22(*a*) and 22(*b*) illustrate schematically the image formation optical prism 101 assembled together with the associated CCD substrate 23. FIG. 22(*a*) is a partly cut-away perspective view of the integrally formed cylindrical column member 163*a*, and FIG. 22(*b*) is a sectional view of the CCD substrate 23 attached to the cylindrical column member 163*a*.

In this embodiment, too, the cylindrical column member 163*a* is integrally formed with the optical prism 101 in such a manner that the area of the combined reflection and exit surface 15 of the optical prism 101 outside of its effective region is surrounded by the column member 163*a*. Two opposite walls of the column member 163*a* are provided with two cutouts 164 to define resilient pieces 165*a* and 165*b* with protuberances 166 formed on the insides of the ends thereof, and the inside of the column member 163*a* is provided with a step 163*ap*. In this arrangement, the opposite resilient pieces 165*a* and 165*b* are first made wide against resiliency to insert the CCD substrate 23 into the cylindrical column member 163*a*. Then, the resilient pieces 165*a* and 165*b* are snapped back to support the CCD substrate 23 from both its sides. In this case, the protuberances 166 at the ends of the resilient pieces 165*a* and 165*b* cooperate with the step 163*ap* on the inside of the cylindrical column member 163*a* to position and fix the CCD substrate 23 in place.

FIGS. 23(*a*), 23(*b*) and 23(*c*) illustrate a further embodiment of the present invention. In the instant embodiment, an alignment embankment 167 is integrally formed on an area of a combined reflection and exit surface 15 of an optical prism 101 such as one shown in FIG. 13 outside of its effective region, so that a prism frame 168 with a CCD substrate 23 attached thereto is positioned and fixed within the embankment.

FIGS. 23(*a*), 23(*b*) and 23(*c*) illustrate schematically the image formation optical prism 101 assembled with the associated CCD substrate 23. FIG. 23(*a*) is an exploded view of the optical prism 101, prism frame 168 and CCD substrate 23. FIGS. 23(*b*) and 23(*c*) are sectional views of the optical prism 101 assembled with the CCD substrate 23; FIG. 23(*b*) is a sectional view of the assembly as taken along one side thereof and FIG. 23(*c*) is a sectional view as taken along an entrance surface 17 of the prism.

In this embodiment, the alignment embankment 167 is integrally formed with the optical prism 101 in such a manner that the area of the combined reflection and exit surface 15 of the optical prism 101 outside of its effective region is surrounded with the embankment 167. The prism frame 168 with the CCD substrate 23 fitted in one opening 168*a* is inserted within the alignment embankment 167, so that the prism frame can be positioned on the optical prism 101, and fixed thereto as by a bonding agent.

FIGS. 24(*a*), 24(*b*) and 24(*c*) illustrate a further embodiment of the invention. In this embodiment, the mounting mechanism such as one shown in FIG. 1 or FIG. 14 is not used, or protrusions, etc. are not integrally formed on both sides of an optical prism; the area of an optical surface of the optical prism outside of its effective region is used for alignment and fixation.

FIGS. 24(*a*), 24(*b*) and 24(*c*) illustrate schematically an image formation optical prism 101 assembled together with an associated CCD substrate 23. FIGS. 24(*a*) and 24(*b*) are sectional schematics of the optical prism 101 assembled together with the CCD substrate 23; FIG. 24(*a*) is a sectional schematic as taken along one side of the assembly and FIG. 24(*b*) is a sectional schematic as taken along an entrance surface 17 of the prism. FIG. 24(*c*) shows a modification of FIGS. 24(*a*) and 24(*b*), and is a sectional schematic of the optical prism 101 assembled together with the CCD substrate 23, as taken along the entrance surface 17 of the prism.

In the embodiment shown in FIGS. 24(*a*) and 24(*b*), protrusions 109L and 109R are integrally formed with the optical prism 101 in such a manner that they bulge out of the left and right sides 106L and 106R of the optical prism 101. A prism frame 169 with the CCD substrate 23 fitted in one opening is provided with extensions 169L and 169R on both sides of the other opening. The extensions 169L and 169R are provided at their ends with pins to be inserted into holes formed in the protrusions 109L and 109R. In this arrangement, the prism frame 169 is attached to the optical prism 101 with the sides 106L and 106R of the optical prism 101 sandwiched between the extensions 169L and 169R of the prism frame 169, and the pins at the ends of the extensions 169L and 169R are inserted into the holes in the protrusions 109L and 109R and fixed thereto as by a bonding agent, so that the prism frame 169 can be positioned on and fixed to the optical prism 101.

In the FIG. 24(*c*) embodiment, protrusions are not provided unlike the embodiment shown in FIGS. 24(*a*) and 24(*b*). In other words, a prism frame 170 with the CCD substrate 23 fitted into one opening is provided with extensions 170L and 170R on both sides of the other opening. The extensions 170L and 170R are provided at their roots with alignment step faces 170L*a* and 170R*b*. When the prism frame 170 is attached to the optical prism 101 with sides 106L and 106R of the optical prism 101 sandwiched between the extensions 170L and 170R of the prism frame 170, the alignment step faces 170L*a* and 170R*a* are in abutment on both faces of a combined reflection and exit surface 15 of the optical prism 101 outside of its effective region. In this case, the faces of contact or the sides,and extensions 170L and 170R are coated as with a bonding agent for alignment and fixation.

In the foregoing embodiments, an image pickup element, etc. are attached to one optical prism. In some cases, however, two optical prisms may be used to construct an image formation optical system.

Figure 25:
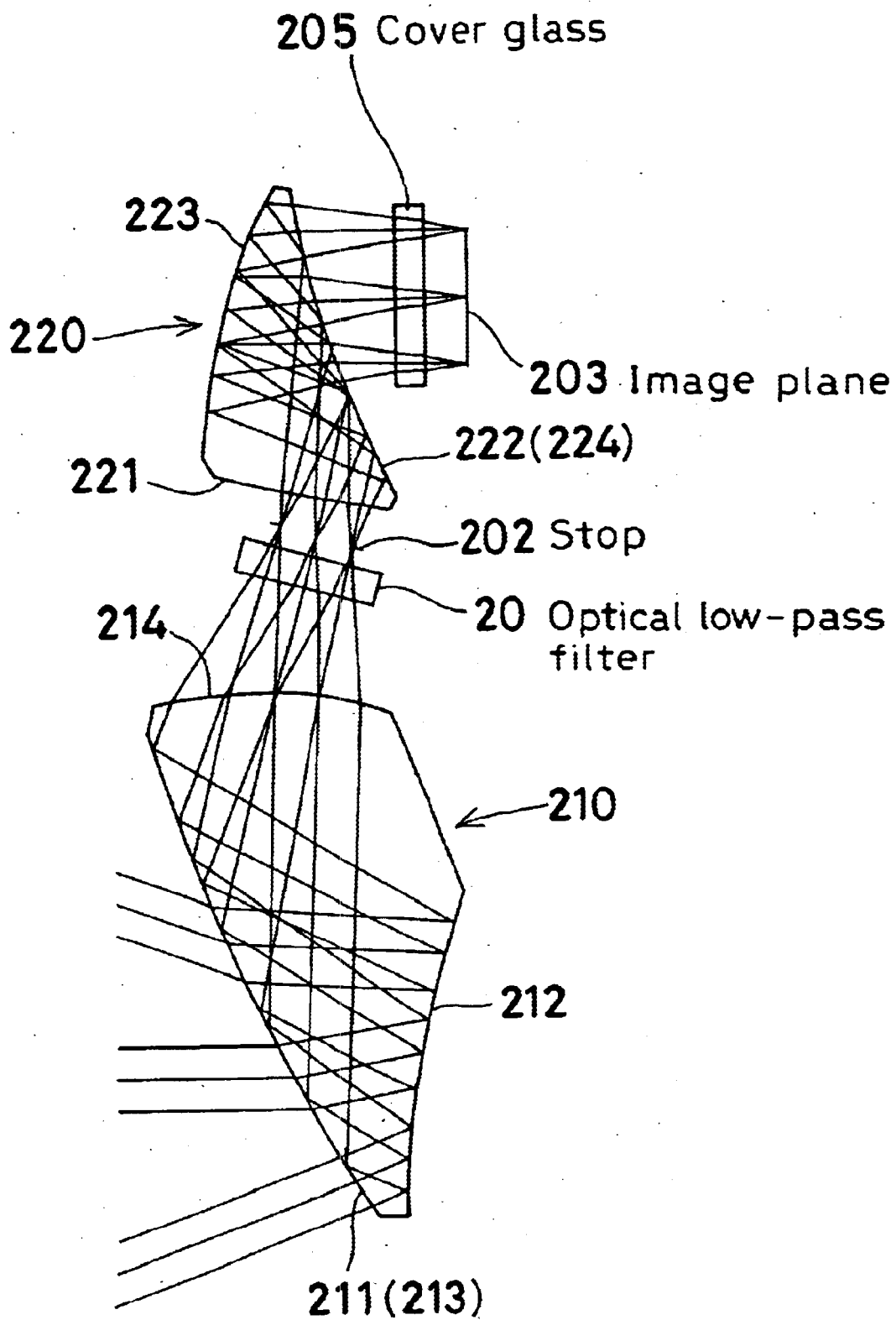
FIG. 25 is a view of an embodiment of an image pickup optical system using two optical prisms.

FIG. 25 shows an embodiment of the image formation optical system comprising two such optical prisms. This optical system consists of, in order from an object side thereof, a first optical prism 210 and a second optical prism 220 with a low-pass filter 20 and a stop 22 located between them. The first optical prism 210 consists of a first transmission surface 211 of positive power, a first reflection surface 212 of negative power, a second reflection surface 213 of positive power and a second transmission surface 214 of positive power, and the second optical prism 220 consists of a first transmission surface 221 of positive power, a first reflection surface 222 of negative power, a second reflection surface 223 of positive power and a second transmission surface 224 of negative power. An image pickup element 22 is located on an image plane 203 of this optical system. Reference numeral 205 stands for a cover glass for protecting an image pickup surface of the image pickup element 22. In this optical system, each of the first transmission surface 211 and second reflection surface 213 of the first prism 210 is an optical acting surface having a combined transmission and reflection action, and so is each of the first reflection surface 222 and second transmission surface 224 of the second prism 220. The optical surfaces 211 to 214 of the optical prism 210, and the optical surfaces 221 to 224 of the optical prism 220 are each constructed of curves surface such as three-dimensional surfaces, spherical surfaces, aspherical surfaces, and anamorphic surfaces. It is then desired that at least one surface of each of the optical prisms 210 and 220 be constructed of a three-dimensional surface that is symmetric with respect to plane and has only one symmetric plane for giving power to a ray bundle and making correction for decentration aberration.

Figure 26A:
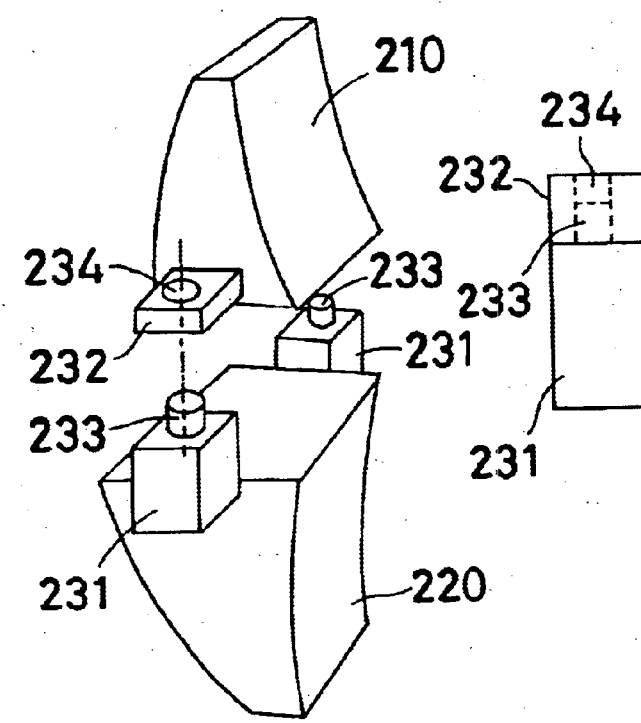
FIG. 26 is a view of an embodiment using two optical prisms according to the present invention.
Figure 26B:
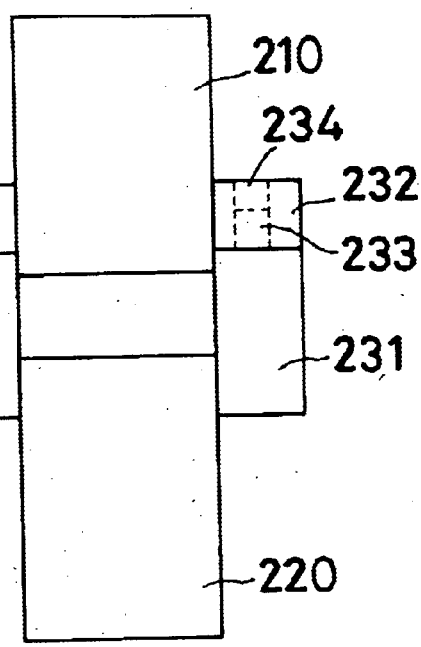

Given below are embodiments of the mounting mechanism for mounting two such optical prisms 210 and 220 together and embodiments of the mounting mechanism for mounting the CCD to the image plane in an integral manner. FIG. 26(*a*) is a perspective view of the two optical prisms 210 and 220 before they are attached together, and FIG. 26(*b*) is a rear view of the optical prisms 210 and 220 after they are attached together. Mounting pieces 232 and 232 are integrally provided on both sides of the optical prism 210 outside of an optical path during molding, and mounting pieces 231 and 231 are integrally provided on both sides of the optical prism 220 outside of an optical path during molding. One mounting piece 231 extends from both sides toward other optical prism 210, and is provided at its end with a protuberance 233 for instance. The other mounting piece 232 is provided with a hole 234 for receiving therein the protuberance 233 on one mounting piece 231. In this arrangement, the protuberances 233 and 233 on the mounting pieces 231 and 231, outside of the optical path, of the optical prism 220 are fitted in the holes 234 and 234 in the mounting pieces 232 and 232, outside of the optical path, of the optical prism 210. Then, the mounting pieces 231 and 232 are integrated together by means such as bonding, screwing or thermal caulking, thereby mechanically integrating the two optical prisms 210 and 220 together. It is thus possible to prevent misalignment of the prisms with respect to the optical axis and keep the inter-prism spacing constant, so that the prisms can be easily assembled together.

Figure 27:
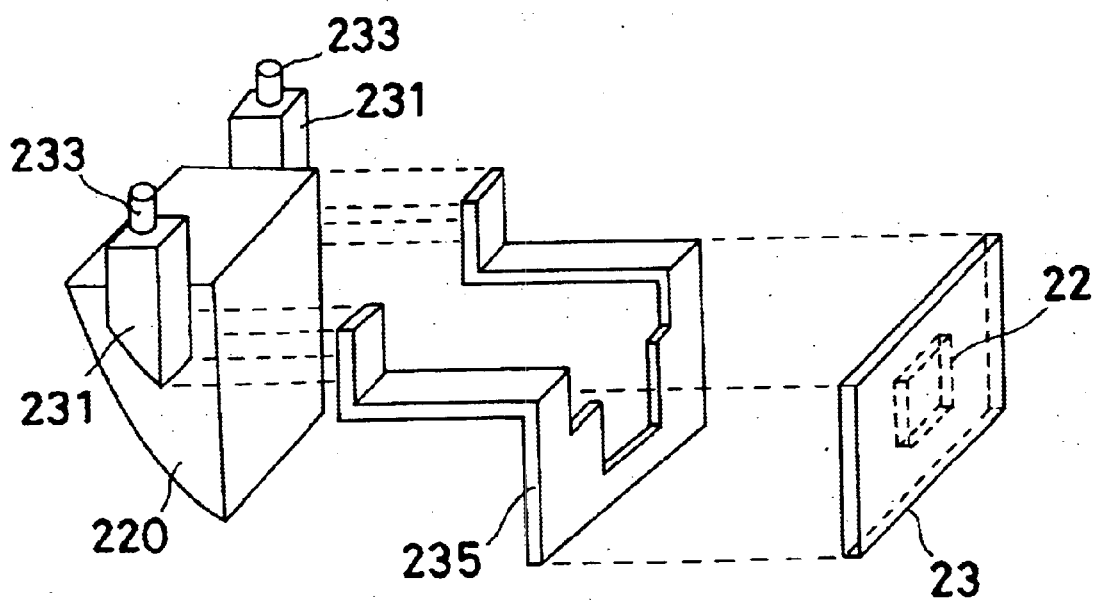
FIG. 27 is a perspective view of an embodiment wherein a CCD is mechanically integrated with an integral structure using such two optical prisms as shown in FIG. 16.

FIG. 27 is a perspective view of a construction embodiment wherein a CCD 22 to be located on an image plane of an image formation optical system is mechanically integrated with an integral structure comprising two optical prisms 210 and 220 such as those shown in FIG. 26. In this embodiment, two such optical prisms are formed as an integral piece. To this end, a fixture 235 is fitted over mounting pieces 231 and 231 integrally formed on both sides of one optical prism 220, and fixed thereto by means such as bonding, screwing, and thermal caulking. Then, a substrate 23 with a CCD 22 supported thereon is similarly fitted over the fixture 235 to mechanically mount the CCD 22 on the image plane of the image formation optical system comprising two optical prisms 210 and 220 in an integral manner. Thus, the optical prisms can be easily assembled together with no misalignment of the prisms with respect to the optical axis and no variation in the inter-prism spacing.

Figure 28:
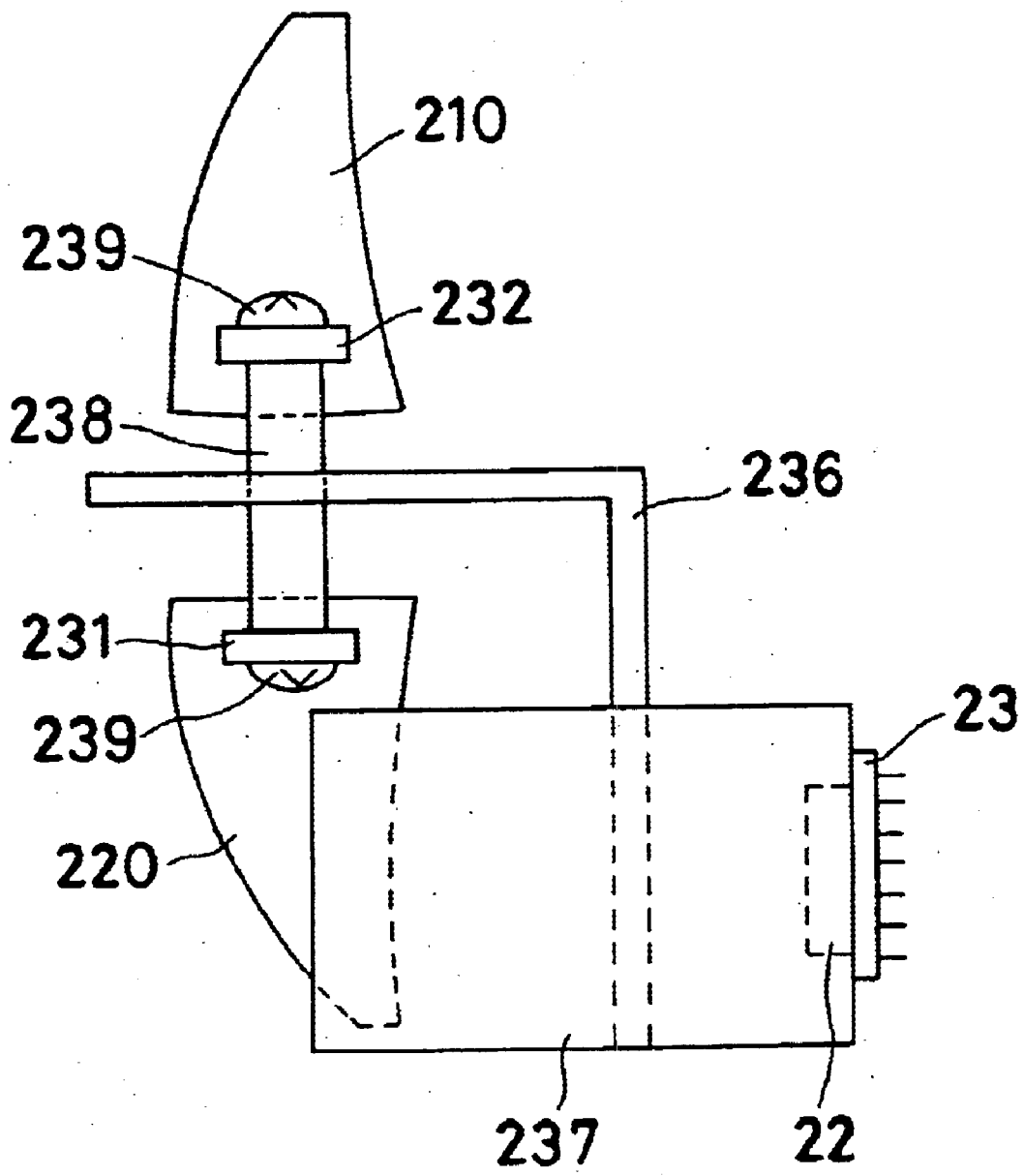
FIG. 28 is a side view of another embodiment of the mechanism for mechanically integrating two optical prisms with a CCD.

FIG. 28 is a sectional view of another embodiment of the mounting mechanism for mechanically integrating two optical prisms 210 and 220 with a CCD 22. A rod spacer 238 is used to keep constant the spacing between mounting pieces 231 and 232 formed on sides of the optical prisms 210 and 220 outside of an optical path by integral molding, and the mounting pieces 231 and 232 are fixed to the rod spacer 238 by screws 239, thereby mechanically integrating the two optical prisms 210 and 220 together. Then, an L-shaped fixture 236 as viewed from its side is fixed to the rod spacer 238, and another fixture 237 is mounted over both sides of the fixture 236. Finally, a substrate 23 with a CCD 22 supported thereon is fixed to the fixture 237 by means such as bonding, screwing, and thermal caulking. In this embodiment, the fixture 237 is fitted over both sides of the optical prism 220 to improve stability upon mounting.

Figure 29:
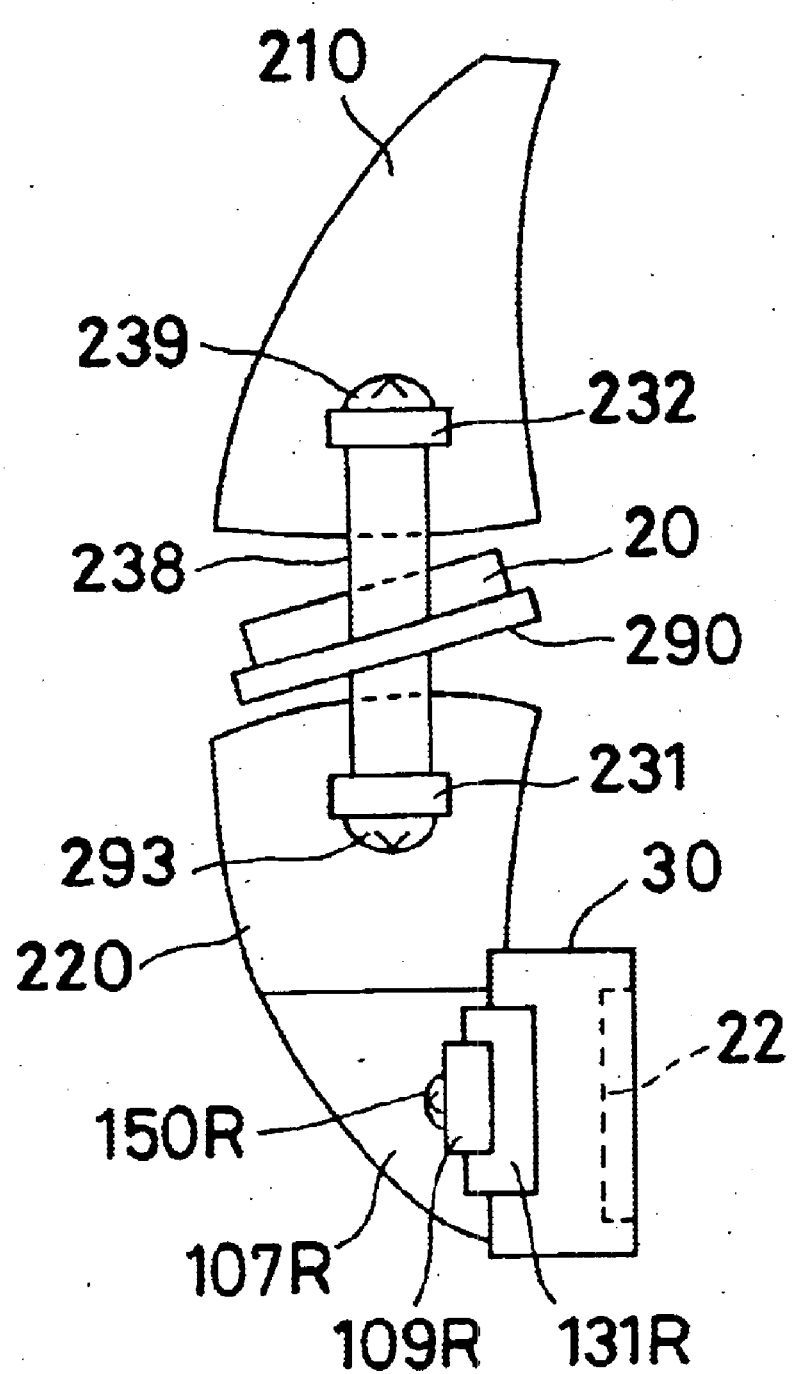
FIG. 29 is a side view of yet another embodiment of the mechanism for mechanically integrating two optical prisms with a CCD.

FIG. 29 is a side view of yet another embodiment of the mounting mechanism for mechanically integrating two optical prisms 210 and 220 with a CCD 22. As in FIG. 28, a rod spacer 238 is used to keep constant the spacing between mounting pieces 231 and 232 formed on sides of the optical prisms 210 and 220 outside of an optical path by means of integral molding, and the mounting pieces 231 and 232 and the rod spacer 238 are fixed by means of screws 239, so that the two optical prisms 210 and 220 can be mechanically integrated together. As in FIG. 14, the relative positions of the optical prism 220 and a prism frame 30 with the CCD 22 supported therein are aligned with each other by joining protrusions 109L and 109R on the optical prism 220 to optical element-mounting portions of the prism frame 30. The rod spacer 238 is mechanically integrated with a fixture 290 for mounting a low-pass filter 20 between the first and second optical prisms 210 and 220. Then, the low-pass filter 20 is positioned on and fixed to the fixture 290 by means such as bonding, screwing, and caulking.

In the foregoing embodiments of the mounting mechanism for the prism frame and optical prisms, for instance, the position of the image pickup element 22 may be controlled within the prism frame along an exit optical axis of the optical prism.

An optical assembly comprising an optical prism and a prism frame according to the present invention may be used for an image pickup device for forming an object image and picking up the image on an image pickup element such as a CCD, especially an image formation optical system used on cameras or endoscopes, as set forth below.

Figure 30:
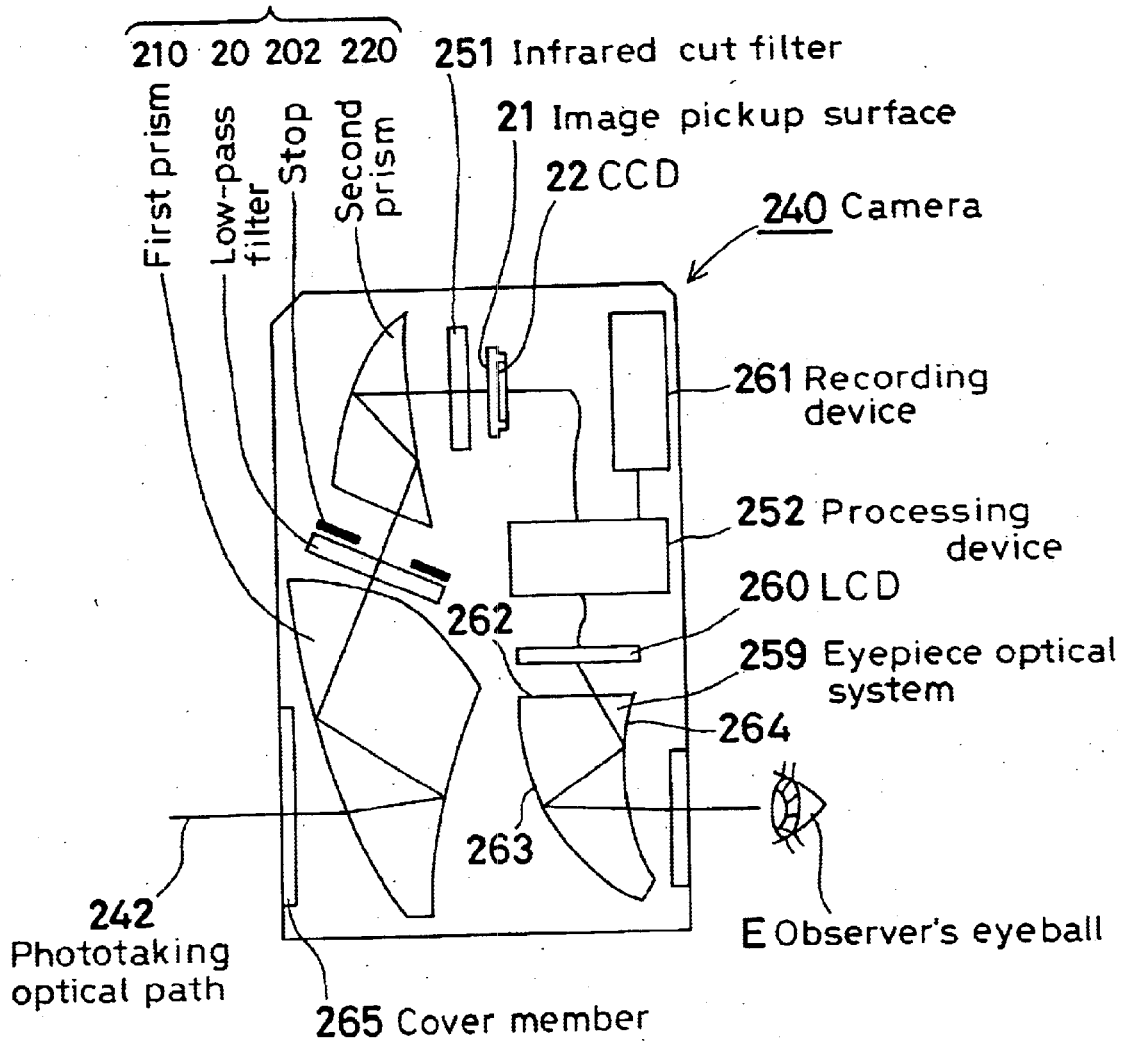
FIG. 30 is a conceptual rendering of an embodiment wherein the optical assembly of the present invention is built in an objective optical system in a phototaking portion of an electronic camera.

FIG. 30 is a conceptual rendering of one embodiment of the optical assembly of the invention wherein it is built in an objective optical system 248 in an phototaking portion of an electronic camera 240. In this embodiment, such an image formation optical system as shown in FIG. 24 is used for the phototaking objective optical system 248 located on a phototaking optical path 242. The image of the object obtained through the phototaking objective optical system is formed on an image pickup surface 21 of a CCD 22 via a filter 251 such as an infrared cut filter. Any one of the foregoing mounting mechanisms is used to attach the low-pass filter 20, filter 251 and CCD 22 to this phototaking objective optical system 248. The object image received on CCD 22 is displayed as an electronic image on a liquid crystal display device (LCD) 260 via processing means 252. The processing means 252 also performs control of recording means 261 for recording the object image as the electronic image. The image displayed on LCD 260 is guided through an eyepiece optical system 250 to an observer's eyeball E. The eyepiece optical system 259 comprises a decentration prism having a form similar to that of the optical prism according to the present invention. In this embodiment, the decentration prism comprises three surfaces, i.e., an entrance surface 262, a reflection surface 263 and a combined reflection and refraction surface 264. At least one of the two surfaces 263 and 264 having a reflection action, and preferably both, are constructed of three-dimensional surfaces symmetric with respect to plane, which give power to a ray bundle and have only one symmetric plane for correcting decentration aberration. Then, the only one symmetric plane is formed on much the same plane as the only one symmetric plane of the three-dimensional surface symmetric with respect to plane that the optical prism 210, and 220 of the phototaking objective optical system 248.

The thus constructed camera 240 can have high performance at low cost because the phototaking objective optical system 248 is constructed of a reduced number of optical members. In addition, all the optical systems can be arranged side by side on the same plane; the thickness of the camera 240 in a direction vertical thereto can be reduced.

While a plane-parallel plate is used for the cover member 265 of the phototaking objective optical system 248, it is understood that a lens having power, too, may be used to this end.

It is here to be noted that the cover member may be omitted; the surface, located nearest to the object side, of the first optical prism 210 in the image formation optical system may be used as an alternative covering member. In this case, however, it is to be noted that the surface of the first optical prism 210 located nearest to the object side functions as the entrance surface thereof, and that the entrance surface is decentered with respect to the optical axis. The entrance surface located in front of the camera makes the operator of camera 24 feel quite unusual as viewed from the subject side, because the camera operator has an illusion of being off a photographic center (usually, the camera operator has a feeling of taking a shot in the vertical direction to the entrance surface as is the case with an ordinary camera). Accordingly, when the surface of the image formation optical system nearest to the object side is a decentration surface as in this embodiment, it is desired to use the cover member 265, because the camera operator can take a shot with the same feeling as in an existing camera; the camera operator feels quite normal.

Figure 31A:
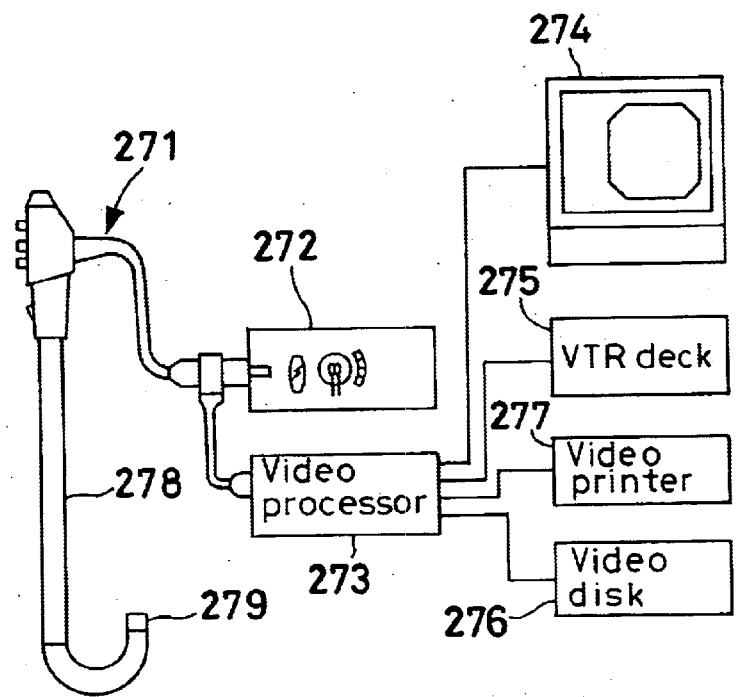
FIGS. 31(a) and 31(b) are conceptual renderings of an embodiment of the optical assembly of the present invention is built in an objective optical system in an observation system of an electronic endoscope.
Figure 31B:
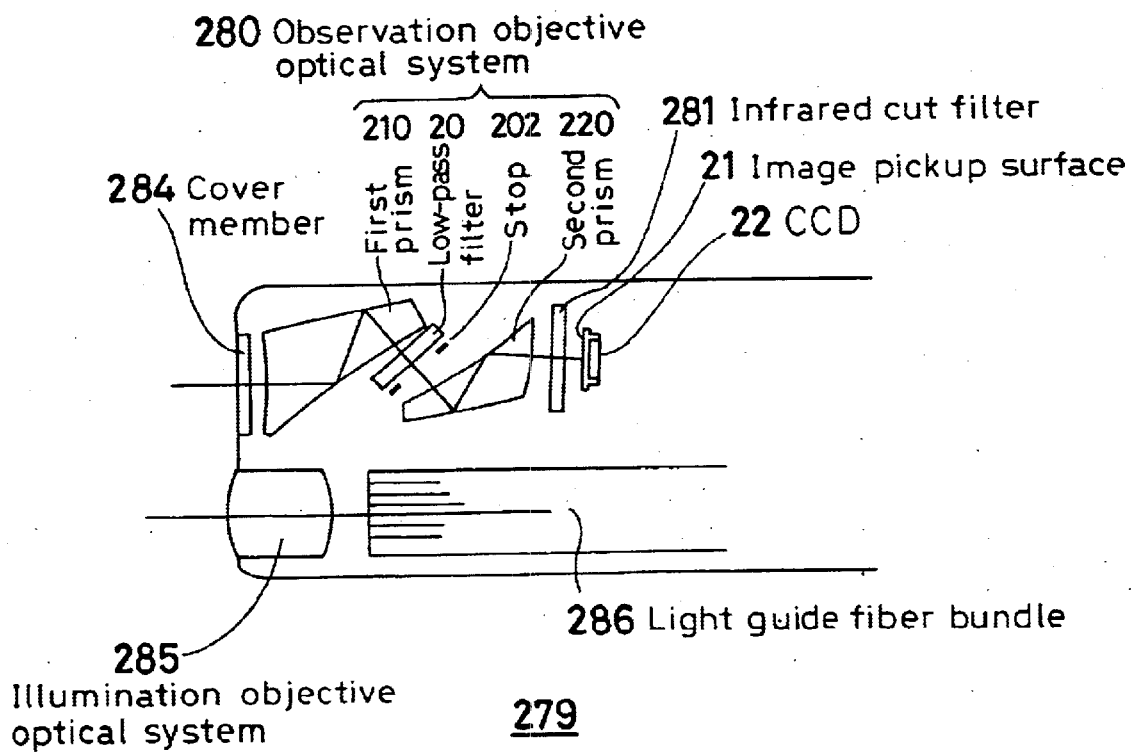

FIGS. 31(a) and 31(b) are conceptual renderings of a construction wherein the optical assembly of the present invention is built in an objective optical system 280 that is an observation optical system in an electronic endoscope. As shown in FIG. 31(a), the electronic endoscope is constructed of an electronic endoscope 271, a light source device 272 for feeding illumination light, a video processor 273 for performing signal processing corresponding the electronic endoscope 271, a monitor 274 for displaying an image signal sent out of the video processor 273, a VTR deck 275 and video disk 276 connected to the video processor 273 for recording an image signal, etc., and a video printer 277 for printing out an image signal in the form of an image. An distal end 279 of an insertion member 278 of the electronic endoscope 271 is constructed as shown in FIG. 31(b). A ray bundle from the illumination light source device 272 passes through a light guide fiber bundle 286 to illuminate an observation site through an illumination objective optical system 285. Then, light from this observation site is formed as an object image by the observation objective optical system 280 via a cover member 284. This object image is formed on an image pickup surface 21 of CCD 22 via a filter 281 such as an infrared cut filter. Then, the object image is converted into an image signal by CCD 22. The image signal is displayed directly on the monitor 274 via the video processor 273 shown in FIG. 31(a), and recorded in the VTR deck 275 and video disk 276. The image signal may also be printed out as an image by the video printer 277.

The thus constructed endoscope can have high performance at low cost because of being constructed of a reduced number of optical member. In addition, since the first and second optical prisms 210 and 220 in the image formation optical system 280 are arranged in the longitudinal direction of the endoscope, the above effect is achievable without detrimental to a reduction in the diameter of the endoscope. In this embodiment, too, a plane-parallel plate is used for the cover member 284. However, it is acceptable to use a lens having power to this end.

Figure 32:
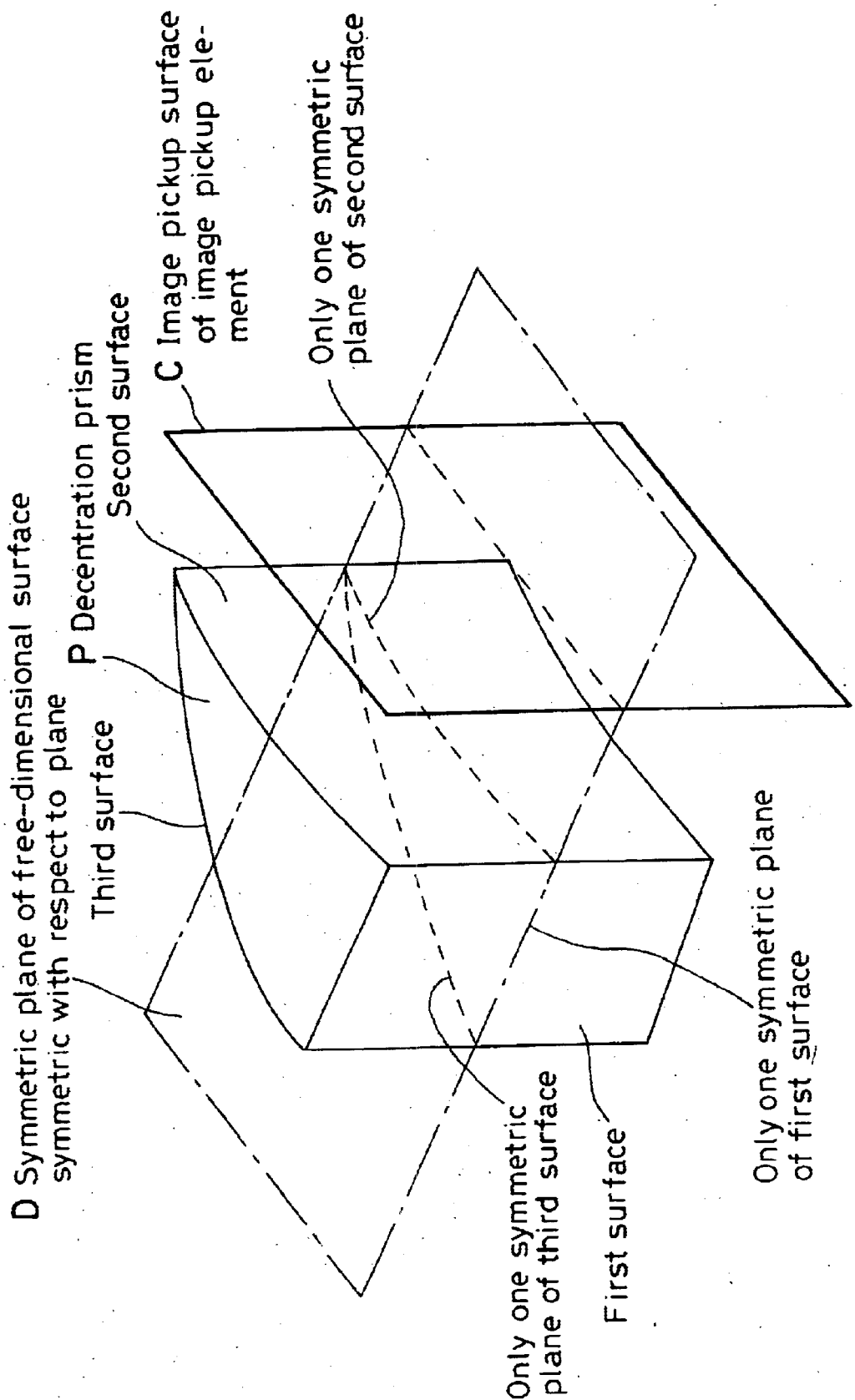
FIG. 32 is a view illustrative of a preferable embodiment wherein the optical prism of the present invention is located in front of an image pickup element such as a CCD, and a filter.
Figure 33A:
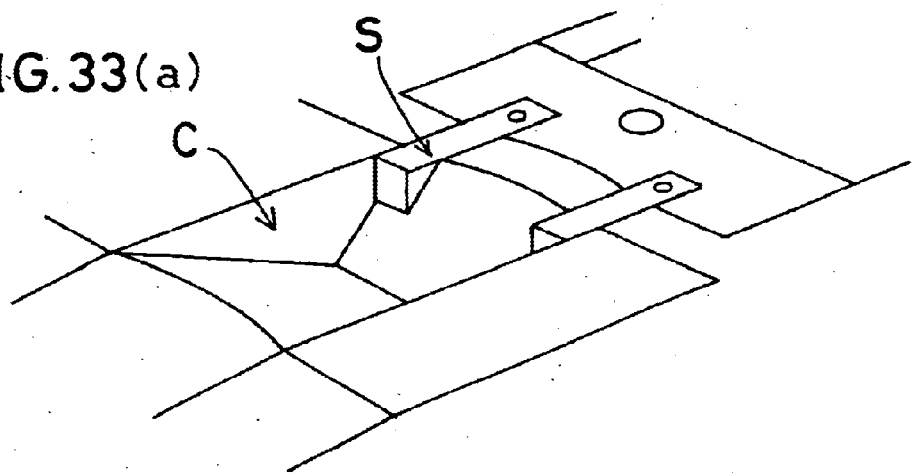
FIGS. 33(a), 33(b) and 33(c) are schematics of illustrative of a mold having a slide mechanism.
Figure 33B:
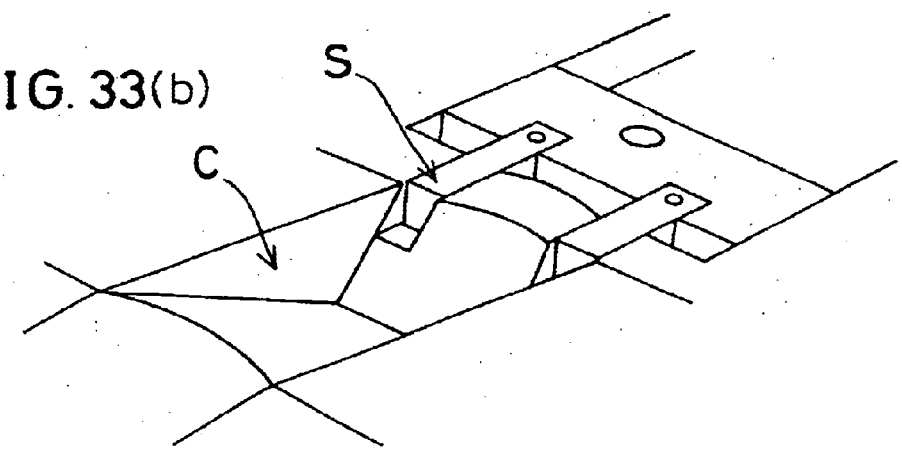
Figure 33C:
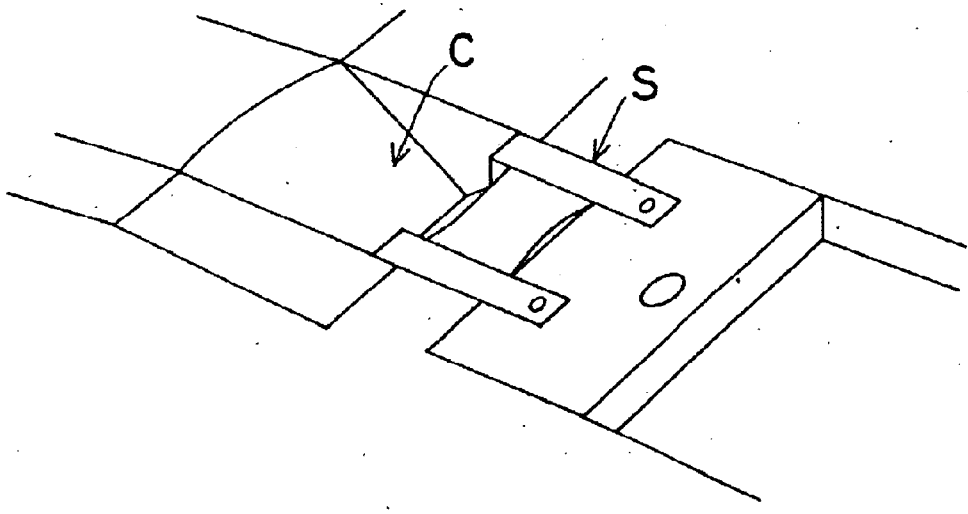
Figure 34A:
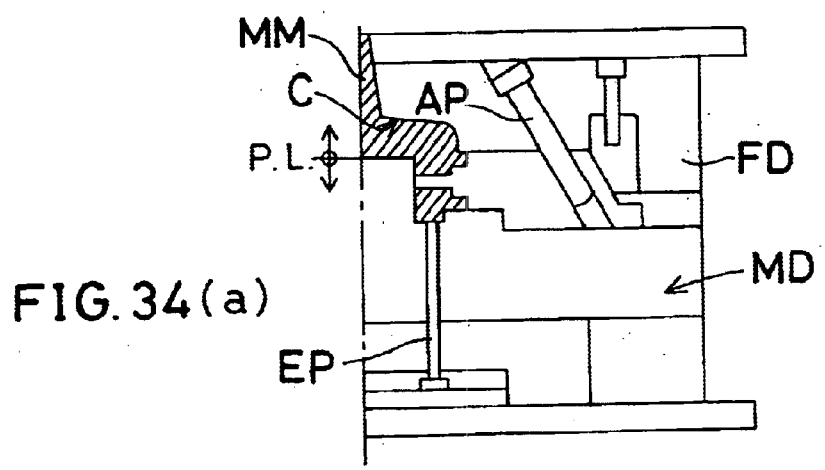
FIGS. 34(a) 34(b) and 34(c) are schematics illustrative of a mechanism for moving a slider in a mold having a slide mechanism.
Figure 34B:
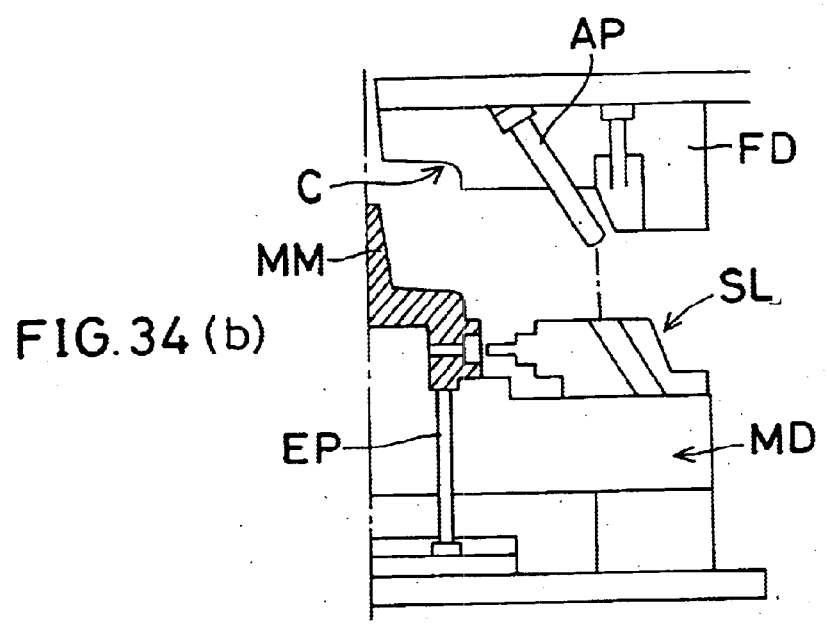
Figure 34C:
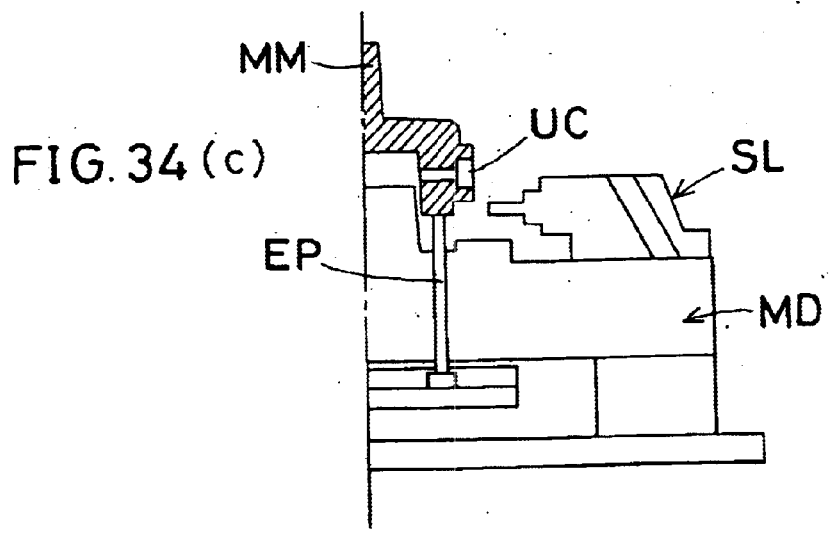

A preferable arrangement wherein the optical prisms 100, 101, 210 and 220 are located in front of an image pickup element such as a CCD, and a filter is shown in FIG. 32. Any one of the optical prisms 100, 101, 210 and 220 of the present invention is used for a decentration prism P in FIG. 32. Preferably for the formation of a beautiful image, it is preferable that when an image pickup surface C of the image pickup element is in a quadrangular form as shown, a symmetric plane D of the three-dimensional surface symmetric with respect to plane, located in the decentration prism P, is parallel with at least one of sides forming the quadrangular image pickup surface C.

When the image pickup surface C is in a square or rectangular form having four internal angles of approximately 90°, it is preferable that the symmetric plane D of the three-dimensional surface symmetric with respect to plane is located parallel with two mutually parallel sides of the image pickup surface C. More preferably, the symmetric plane D is located at a position where the image pickup surface C is symmetric with respect to the horizontal or the vertical. This arrangement can be built in a device with high precision, and is effective of mass fabrication.

When two or all of the optical surfaces forming the decentration prism P, for instance, the first, second and third surfaces, are three-dimensional surfaces with respect to plane, it is preferable in view of both design and aberration performance that the symmetric planes of these two surfaces or all surfaces are located on the same plane as the plane D. It is then preferable that the relation between the symmetric plane D and the image pickup surface C is the same as mentioned above.

The optical prisms used in the foregoing embodiments are of the type that comprises three optical surfaces, one of which is a combined total reflection and transmission action to enable two internal reflections. However, the present invention is not limited to this type prism.

According to the present invention, there can be provided an optical prism which can be used as an internal reflection optical prism for an image formation optical system in an endoscope or the like, and to which a prism frame with a CCD or other image pickup element located on an image plane thereof can be attached by a simple mechanism with high alignment precision, a prism frame, and an optical assembly. There can also be provided an optical prism of this type which can make a sensible tradeoff between the precision of alignment with an image pickup element and ease of fabrication, a prism frame used with this optical prism, and an assembly comprising such an optical prism and prism frame as mentioned above.

It is here to be understood that the optical prism, prism frame and optical assembly according to the present invention may be constructed as set forth below.

(1) An optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said entrance surface and said exit surface having a transmission and internal reflection action, characterized in that:

said optical prism is used in combination with a prism frame designed to be fit therefor, sides of said optical prism in directions intersecting directions of said entrance surface and said exit surface being provided with protrusions for mounting said optical prism on said prism frame.

(2) The optical prism according to (1), characterized in that said protrusions are provided at their given positions with alignment bosses for keeping a relative position to said prism frame in a given relationship.

(3) The optical prism according to (1), characterized in that said optical prism is fabricated by an injection molding process, and said protrusions are formed making use of a slide mechanism applied to said injection molding process.

(4) The optical prism according to (4), characterized in that an effective region on said entrance surface, said exit surface, and an optical surface taking part in said reflections such as a reflection surface is spaced 0.5 to 5.0 mm away from a site formed making use of said slide mechanism.

(5) The optical prism according to (3), characterized in that each of said protrusions formed making use of said slide mechanism is provided with a plurality of mounting faces used for mounting of a given member thereon.

(6) The optical prism according to (3), characterized in that each of said protrusions is provided at a given region with the number of a cavity used for said injection molding.

(7) The optical prism according to (5), characterized in that said plurality of mounting faces are formed parallel with each other.

(8) The optical prism according to (1), characterized in that said optical prism is fabricated by an injection molding process, and a mold parting line for injection molding is set along a virtual plane generally comprising two ridgelines of ridgelines formed by contact of surfaces defining an outside shape of said optical prism, e.g., surfaces functioning as said entrance surface and said exit surface, said two ridgelines lying at positions that do not adjoin to each other and are opposite to each other.

(9) The optical prism according to (8), characterized in that said mold parting line is at an angle with respect to a reference mold parting line for said injection molding, said angle being represented by a natural number.

(10) The optical prism according to (1), characterized in that said optical prism is fabricated by an injection molding process, and a mold parting line for injection molding is set in association with a given site, a resin pouring-gate is formed at a given site corresponding to said mold parting line, and/or a plurality of ejection protrusions are located equidistantly from a center of gravity for ejection force.

(11) The optical prism according to (10), characterized in that said ejection protrusions have substantially equal thickness.

(12) An optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said entrance surface and said exit surface having a transmission and internal reflection action, characterized in that:

a ghost-preventing surface is provided at a given angle with respect to one surface of said entrance surface, said exit surface and an optical surface such as a reflection surface taking part in said reflections, said ghost-preventing surface differing in definition from said one surface.

(13) An optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said entrance surface and said exit surface having a transmission and internal reflection action, characterized in that:

a satin-finished ghost-preventing surface is provided on the same plane as one surface of said entrance surface, said exit surface and an optical surface such as a reflection surface taking part in said reflections, said ghost-preventing surface differing in definition from said one surface.

(14) An optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said entrance surface and said exit surface having a transmission and internal reflection action, characterized in that:

said entrance surface, said exit surface and an optical surface such as a reflection surface taking part in said reflections are coated with aluminum or multi-coated, a specific surface is provided on the same plane of one surface of said optical surfaces, and a coating margin of up to 1 mm in width is provided at a boundary site of said specific surface and said one optical surface.

(15) The optical prism according to (1), characterized in that at least two opposite surfaces of said entrance surface, said exit surface and an optical surface such as a reflection surface taking part in said reflections are substantially equal to each other in size in a widthwise direction intersecting an optical axis of said optical prism.

(16) The optical prism according to (1), characterized in that aid entrance surface, said exit surface and an optical surface such as a reflection surface taking part in said reflections are formed of curved surfaces in such a manner that a ridgeline defined by two adjoining surfaces of said optical surfaces makes a curved line.

(17) A prism frame fit for an optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, and sides of said optical prism in directions intersecting directions of said entrance surface and said exit surface are provided with protrusions for mounting said optical prism on said prism frame, making use of a slide mechanism applied to an injection molding process, characterized in that:

mounting portions are provided, said portions conforming in shape to said protrusions on said optical prism and a step formed on a given surface of said optical surfaces of said optical prism such as said entrance surface, said exit surface and a reflection surface taking part in said reflections.

(18) An optical assembly comprising an optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, and sides of said optical prism in directions intersecting directions of said entrance surface and said exit surface are provided with protrusions for mounting said optical prism on said prism frame, making use of a slide mechanism applied to an injection molding process, and a prism frame wherein a given portion of a shielding member formed in such a manner as to surround a periphery of said exit surface of said optical prism is fitted over said optical prism from said exit surface, characterized in that:

a sealing and/or bonding material is interleaved between a given portion of an internal surface of said shielding member of said prism frame and a given portion on an outer surface of said optical prism.

(19) The optical assembly according to (18), characterized in that said sealing and/or bonding material has an attribute of inhibiting reflection of light.

(20) An optical assembly comprising an optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, and sides of said optical prism in directions intersecting directions of said entrance surface and said exit surface are provided with protrusions for mounting said optical prism on said prism frame, making use of a slide mechanism applied to an injection molding process, and a prism frame that carries an image pickup element for picking up an image formed by light leaving said exit surface of said optical prism and is designed to be fit for said optical prism, characterized in that:

at least one side of said prism frame side and said optical prism side is provided with a shielding member that cooperates with said image pickup element carried on said prism frame and said exit surface of said optical prism to define a substantially closed space.

(21) The optical assembly according to (20), characterized in that said shielding member is provided on said optical prism side.

(22) The optical assembly according to (20), characterized in that said shielding member is provided on said prism frame side.

(23) The optical assembly according to (20), characterized in that said shielding member is provided on said prism frame side and said shielding member is provided on said optical prism side, said shielding members extending from said both sides being joined together at flange portions provided at ends of said extensions.

(24) An optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said entrance surface and said exit surface having a transmission and internal reflection action, characterized in that:

said optical prism is used in combination with a prism frame designed to be fit therefor, sides of said optical prism in directions intersecting directions of said entrance surface and said exit surface being provided with recesses in such a manner that said recesses are not deterrents to an optical path in an effective diameter from said entrance surface to said exit surface.

(25) The optical prism according to (24), characterized in that protuberances extend outwardly of surfaces of suitable portions of said recesses.

(26) The optical prism according to (25), characterized in that said protrusion has an alignment portion for limiting a relative position of said optical prism to a frame member for holding an image pickup element, etc. located on said image pickup surface.

(27) The optical prism according to (26), characterized in that said protrusion comprises at least one or a plurality of plane portions, a given one of which is substantially parallel or vertical to an image pickup element-mounting face formed on said frame member.

(28) The optical prism according to (26), characterized in that said alignment portion comprises an engaging protrusion or recess corresponding to an engaging recess or protrusion formed on said frame member, and said engaging protrusion or recess is provided with a bulging-out portion or indent for preventing disengagement of said engaging recess or protrusion on said frame member side at least in a specific direction.

(29) The optical prism according to (28), characterized in that said bulging-out portion or indent is provided in the form of a dovetail or dovetail groove corresponding to a dovetail groove or dovetail formed as said engaging recess or protrusion on said frame member.

(30) The optical prism according to (28), characterized in that said alignment portion is provided with a receiving face for receiving resilient force upon abutment against a resilient piece formed on said frame member in such a manner that a relative position change between said resilient piece and said alignment portion by resilient force due to self-elastic deformation is limited.

(31) An optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said entrance surface and said exit surface having a transmission and internal reflection action, characterized in that:

said entrance surface, said exit surface and said reflection surface are each constructed in a quadrangular form defined by ridgelines of a periphery thereof.

(32) An optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said entrance surface and said exit surface having a transmission and internal reflection action, characterized in that:

a prism frame or an image pickup element-mounting member is integrally formed on an area of said exit surface outside of an effective region thereof.

(33) An optical assembly comprising an optical prism comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, a prism frame or an image pickup element-mounting member integrally formed on an area of said exit surface outside of an effective region thereof, and an image pickup element mounted directly or through said mounting member for picking up an image formed by light leaving said exit surface of said optical prism.

(34) An optical assembly comprising two optical prisms, each comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said two optical prisms having an image formation capability, characterized in that:

sides of at least one of said optical prisms formed in directions intersecting directions of said entrance surface and said exit surface are provided with protrusions or recesses for mounting said optical prism to a prism frame or the other optical prism.

(35) An optical assembly comprising two optical prisms, each comprising at least three optical surfaces, wherein incident light from an entrance surface suitable for incidence of light from a subject is subjected to at least two internal reflections to turn back an optical path and exit light leaves a given exit surface to form an image of the subject on an image pickup surface located outside of said optical prism, with at least one of said two optical prisms having an image formation capability, characterized in that:

at least one of said optical prisms is integrally provided with a prism frame or an image pickup element-mounting member at an area of an entrance or exit surface thereof outside of an effective region thereof.

What we claim is:

1. An image pickup optical system, comprising:

an image formation optical system configured to form an object image, and an image pickup member adapted to receive said object image formed by said image formation optical system, wherein:

said image formation optical system comprises at least one first prism member, said first prism member comprises, as optical acting surfaces, at least an entrance surface on which a ray bundle strikes, a reflection surface to reflect said ray bundle within said first prism member, and an exit surface through which said ray bundle leaves said first prism member, and at least said reflection surface and one of said entrance surface and said exit surface comprise a combined transmission and reflection surface constructed of the same surface, said reflection surface is constructed in a curved surface form that gives power to said ray bundle, said curved surface being constructed of a rotationally asymmetric curved surface having an action on correction of decentration aberration, and a fixing member configured to fix a position relation between at least said first prism member and said image pickup member, said fixing member being provided so as to prevent a deterioration in a capability of said rotationally asymmetric curved reflection surface of said first prism member of correcting decentration aberration due to a misalignment upon setting.

2. The image pickup optical system according to claim 1 wherein reflection at said combined transmission and reflection surface of said first prism occurs at a total reflection surface.

3. An image pickup optical system, comprising:
an image formation optical system configured to form an object image, and
an image pickup member adapted to receive said object image formed by said image formation optical system, wherein:
  said image formation optical system comprises a plurality of optical elements including at least a first prism member and a second prism member,
  said first prism member comprises, as optical acting surfaces, at least an entrance surface on which a ray bundle strikes, a reflection surface for reflecting said ray bundle within said first prism member, and an exit surface through which said ray bundle leaves said first prism member,
  said reflection surface is constructed in a curved surface form that gives power to said ray bundle, said curved surface being constructed of a rotationally asymmetric curved surface having an action on correction of decentration aberration,
  said second prism member comprises an entrance surface, a reflection surface and an exit surface, at least said reflection surface of said second prism member and one of said entrance surface and said exit surface of said second prism member comprise a combined transmission and reflection surface constructed of the same surface, and
  a fixing member to fix a position relation between at least said first prism member and one other optical element is provided so as to prevent a deterioration in a capability of said rotationally asymmetric curved reflection surface of said first prism member of correcting decentration due to a misalignment upon setting.

4. An image pickup optical system, comprising:
an image formation optical system configured to form an object image, and
an image pickup member adapted to receive said object image formed by said image formation optical system, wherein:
  said image formation optical system comprises a plurality of optical elements including at least a first prism member, and at least one optical element in said plurality of optical elements is fixed to said first prism member and is constructed of a filter,
  said first prism member comprises as optical acting surfaces at least an entrance surface on which a ray bundle strikes, a reflection surface for reflecting said ray bundle within said first prism member, and an exit surface through which said ray bundle leaves said first prism member,
  said reflection surface is constructed in a curved surface form that gives power to said ray bundle, said curved surface being constructed of a rotationally asymmetric curved surface having an action on correction of decentration aberration, and
  a fixing member to fix a position relation between at least said first prism member and one other optical element is provided so as to prevent a deterioration in a capability of said rotationally asymmetric curved reflection surface of said first prism member of correcting decentration due to a misalignment upon setting.

5. An image pickup optical system, comprising:
an image formation optical system configured to form an object image, and
an image pickup member adapted to receive said object image formed by said image formation optical system, wherein:
  said image formation optical system comprises a plurality of optical elements including at least a first prism member, a second prism member and a filter, said filter being located between said first prism member and said second prism member,
  said first prism member comprises as optical acting surfaces at least an entrance surface on which a ray bundle strikes, a reflection surface for reflecting said ray bundle within said first prism member, and an exit surface through which said ray bundle leaves said first prism member,
  said reflection surface is constructed in a curved surface form that gives power to said ray bundle, said curved surface being constructed of a rotationally asymmetric curved surface having an action on correction of decentration aberration, and
  a fixing member to fix a position relation between at least said first prism member and one other optical element provided so as to prevent a deterioration in a capability of said rotationally asymmetric curved reflection surface of said first prism member of correcting decentration due to a misalignment upon setting, and said first prism member, said filter and said second prism member are integrally fixed together by said fixing member.

6. An image pickup optical system, comprising:
an image formation optical system configured to form an object image, and
an image pickup member adapted to receive said object image formed by said image formation optical system, wherein:
  said image formation optical system comprises a plurality of optical elements including at least a first prism member, a second prism member and a stop, said stop being located between said first prism member and said second prism member,
  said first prism member comprises as optical acting surfaces at least an entrance surface on which a ray bundle strikes, a reflection surface for reflecting said ray bundle within said first prism member, and an exit surface through which said ray bundle leaves said first prism member,
  said reflection surface is constructed in a curved surface form that gives power to said ray bundle, said curved surface being constructed of a rotationally asymmetric curved surface having an action on correction of decentration aberration, and
  a fixing member for fixing a position relation between at least said first prism member and one other optical element is provided so as to prevent a deterioration in a capability of said rotationally asymmetric curved reflection surface of said first prism member of correcting decentration due to a misalignment upon setting, and said first prism member, said stop and said second prism member are integrally fixed together by said fixing member.

7. An image pickup optical system, comprising:
an image formation optical system configured to form an object image, and
an image pickup member adapted to receive said object image formed by said image formation optical system, wherein:
  said image formation optical system comprises a plurality of optical elements including at least a first prism member, said first prism member comprises as optical acting surfaces at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, and a fixing member for fixing position relations among at least said first prism member, one other optical element and said image pickup member is provided so as to prevent a deterioration in a capability of said rotationally asymmetric curved reflection surface of said first prism member of correcting decentration aberration due to a misalignment upon setting, wherein a filter is located between said first prism member and at least one optical element fixed to said first prism member, and said first prism member, said filter and said at least one optical element fixed to said first prism member are integrally fixed together by means of said fixing member.

8. An image pickup optical system comprising:

an image formation optical system configured to form an object image, and an image pickup member adapted to receive said object image formed by said image formation optical system, wherein:

said image formation optical system comprises a plurality of optical elements including at least a first prism member, said first prism member comprises, as optical acting surfaces, at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, and a fixing member constructed to fix position relations among at least said first prism member, one other optical element and said image pickup member, is provided so as to prevent a deterioration in a capability of said rotationally asymmetric curved reflection surface of said first prism member of correcting decentration aberration due to a misalignment upon setting, wherein said fixing member comprises a frame structure having an opening, said image pickup member is located at a position different from that of said opening, said opening is brought into contact with the exit surface or a side surface of said first prism member, so that said first prism member and said image pickup member are mutually fixed to each other.

9. The image pickup optical system according to claim 8, wherein said fixing member comprising said frame structure receives therein said image pickup surface of said image pickup member, and a part of said frame structure is provided with an image pickup surface alignment mechanism for fixing a position of said image pickup surface within said frame structure.

10. An image pickup optical system, comprising:

an image formation optical system configured to form an object image, and an image pickup member adapted to receive said object image formed by said image formation optical system, wherein:

said image formation optical system comprises a plurality of optical elements including at least a first prism member, said first prism member comprises as optical acting surfaces at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, and a fixing member to fix a position relation between at least said first prism member and one other optical element is provided so as to prevent a deterioration in a capability of said rotationally asymmetric curved reflection surface of said first prism member of correcting decentration due to a misalignment upon setting, wherein said fixing member fixing together said first prism member and at least one optical element fixed to said first prism member is constructed of a spacer member connected to a side of said first prism member and a side of said at least one optical element fixed to said first prism member.

11. The image pickup optical system according to claim 10 wherein said spacer member comprises a plurality of rod members located with said first prism and said at least one optical element fixed to said first prism sandwiched therebetween.

12. An image pickup optical system, comprising:

an image formation optical system configured to form an object image, and an image pickup member adapted to receive said object image formed by said image formation optical system, wherein:

said image formation optical system comprises at least one first prism member, said first prism member comprises as optical acting surfaces at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, and a fixing member for fixing a position relation between at least said first prism member and said image pickup member is provided so as to prevent a deterioration in a capability of said rotationally asymmetric curved reflection surface of said first prism member of correcting decentration aberration due to a misalignment upon setting, wherein said rotationally asymmetric curved surface of said first prism member is constructed of a three-dimensional surface that is symmetric with respect to a plane and has only one symmetric plane, and said fixing member is constructed such that a position relation of said first prism member to said image pickup member is fixed thereby locating a center of said image pickup surface of said image pickup member on a plane extending from said symmetric surface of said first prism member.

13. An image pickup optical system, comprising:

an image formation optical system configured to form an object image, and an image pickup member adapted to receive said object image formed by said image formation optical system, wherein:

said image formation optical system comprises at least one first prism member, said first prism member comprises as optical acting surfaces at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, and a fixing member for fixing a position relation between at least said first prism member and said image pickup member is provided so as to prevent a deterioration in a capability of said rotationally asymmetric curved reflection surface of said first prism member of correcting decentration aberration due to a misalignment upon setting, wherein said rotationally asymmetric curved surface of said first prism member is constructed of a three-dimensional surface that is symmetric with respect to a plane and has only one symmetric plane, said image pickup member comprises an image pickup surface in a quadrangular form, and said fixing member is constructed such that a position relation of said first prism member to said image pickup member is fixed, thereby making said fixing member parallel with said symmetric plane of said first prism member and at least one side of said quadrangular form forming said image pickup surface of said image pickup member.

14. The image pickup optical system according claim 13, wherein said image pickup surface of said image pickup member is in a quadrangular form, four internal angles of which are approximately 90°, and said fixing member is constructed in such a manner that a position relation of said first prism to said image pickup member is fixed thereby making said fixing member parallel with said only one symmetric plane of said first prism and two sides of said quadrangular form forming said image pickup surface of said image pickup member and sandwiching said fixing member between said two sides.

15. The image pickup optical system according to claim 14, wherein said fixing member is constructed in such a manner that a position relation of said first prism to said image pickup member is fixed thereby making said only one symmetric plane of said first prism coincide with a position where said image pickup surface of said image pickup member is symmetric with respect to the horizontal or the vertical.

16. An image pickup optical system, comprising:

an image formation optical system configured to form an object image;

an image pickup member adapted to receive said object image formed by said image formation optical system; and a holding member constructed and arranged to hold said image pickup member, wherein:

said image formation optical system comprises at least one first prism member, said first prism member comprises as optical acting surfaces at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, said first prism member includes a first coupling mechanism, and said holding member includes a second coupling mechanism, so that said first and second coupling mechanisms are coupled together to position said first prism member and said image pickup member.

17. An image pickup optical system, comprising:

an image formation optical system configured to form an object image, and an image pickup member adapted to receive said object image formed by said image formation optical system, wherein:

said image formation optical system comprises a plurality of optical elements including at least one first prism member, said first prism member comprises, as optical acting surfaces, at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, said first prism member includes a first coupling mechanism, and one of said plurality of optical elements includes a second coupling mechanism, so that said first and second coupling mechanisms are coupled together to position said first prism member and said one of the plurality of optical elements.

18. An image pickup optical system comprising:

an image formation optical system configured to form an object image, and an image pickup member adapted to receive said object image formed by said image formation optical system, wherein:

said image formation optical system comprises a plurality of optical elements including at least one first prism member, said first prism member comprises, as optical acting surfaces, at least an entrance surface on which a ray bundle strikes, a reflection surface for reflecting said ray bundle within said first prism member, and an exit surface through which said ray bundle leaves said first prism member, said reflection surface is constructed in a curved surface form that gives power to said ray bundle, said curved surface being constructed of a rotationally asymmetric curved surface having an action on correction of decentration aberration, said first prism member includes a first coupling mechanism, one of said plurality of optical elements includes a second coupling mechanism, and a spacer member includes a coupling portion configured to couple to said first coupling mechanism and a coupling portion to couple to said second coupling mechanism, so that said first prism member and said one of the plurality of optical elements are positioned via said spacer member.

19. A camera device comprising an image pickup optical system as recited in any one of claims 16, 17 and 18, wherein said image formation optical system is constructed of a phototaking optical system adapted to form an object image for phototaking, and said image pickup member constructed of an image pickup element for phototaking said object image.

20. The camera device according to claim 19, wherein said image pickup element is constructed of an electronic image pickup element, and which further includes recording means for recording said object image received on said electronic image pickup element and a display element for displaying said object image so that said object image can be observed.

21. An endoscope device comprising an image pickup optical system as recited in any one of claims 16, 17 and 18, and further including:

an illumination optical system, and an observation system, wherein said image formation optical system is constructed of an objective optical system adapted to form an object image at an observation site, said illumination optical system is configured to illuminate said observation site, and said observation system is configured to observe said object image.

* * * * *